(12) United States Patent
Okumura et al.

(10) Patent No.: US 7,738,054 B2
(45) Date of Patent: Jun. 15, 2010

(54) LIQUID CRYSTAL DISPLAY DEVICE

(75) Inventors: Takamitsu Okumura, Minami-ashigara (JP); Osamu Iwasaki, Minami-ashigara (JP); Toshiaki Endo, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 136 days.

(21) Appl. No.: 12/035,155

(22) Filed: Feb. 21, 2008

(65) Prior Publication Data

US 2008/0198300 A1 Aug. 21, 2008

(30) Foreign Application Priority Data

Feb. 21, 2007 (JP) .............................. 2007-041526

(51) Int. Cl.
*G02F 1/1335* (2006.01)
(52) U.S. Cl. .............................. 349/68; 349/70; 349/61; 349/104; 349/106; 349/108
(58) Field of Classification Search ................... 349/68, 349/70, 71, 61, 104, 106, 108, 166, 112, 349/164, 62
See application file for complete search history.

(56) References Cited

U.S. PATENT DOCUMENTS

| | | | |
|---|---|---|---|
| 5,993,020 A | 11/1999 | Koike | |
| 6,050,704 A * | 4/2000 | Park | 362/260 |
| 6,426,590 B1 * | 7/2002 | Chung et al. | 313/496 |
| 7,306,357 B2 * | 12/2007 | Han et al. | 362/610 |
| 2006/0077686 A1 * | 4/2006 | Han et al. | 362/610 |
| 2008/0042150 A1 * | 2/2008 | Yamaguchi | 257/88 |
| 2008/0198300 A1 * | 8/2008 | Okumura et al. | 349/68 |

FOREIGN PATENT DOCUMENTS

| | | |
|---|---|---|
| EP | 1742096 A1 | 1/2007 |
| JP | 7-36037 A | 2/1995 |
| JP | 7-253577 A | 10/1995 |
| JP | 2003-207770 A | 7/2003 |
| JP | 2004-085592 A | 3/2004 |
| JP | 2005-183139 A | 7/2005 |
| JP | 2006-47975 A | 2/2006 |

* cited by examiner

*Primary Examiner*—Brian M Healy
(74) *Attorney, Agent, or Firm*—Sughrue Mion, PLLC

(57) ABSTRACT

The liquid crystal display device with a simple configuration is capable of emitting light with a desired color temperature, achieving high light use efficiency, and displaying high quality images. The liquid crystal display device includes a planar lighting device and a liquid crystal display panel. The planar lighting device includes a light source having LED chips for emitting blue light, a transparent light guide plate having a light entrance plane admitting light emitted by the light source and a light exit plane emitting planar light, and a fluorescent member disposed between the light emission plane and the light entrance plane and having one or more fluorescent substance coated areas for emitting white light by converting blue light from the light source into white light and one or more blue light passing areas passing blue light as blue light. The liquid crystal display panel essentially includes red, green and blue filters.

20 Claims, 25 Drawing Sheets

(A)

(B)

(C)

(D)

LIQUID CRYSTAL DISPLAY DEVICE

The entire contents of documents cited in this specification are incorporated herein by reference.

BACKGROUND OF THE INVENTION

The present invention relates to a liquid crystal display device comprising a planar lighting device and a liquid crystal display panel, the former comprising a light guide plate that emits illuminating light through a light exit plane by diffusing light emitted by a light source.

There is known a liquid crystal display device comprising a liquid crystal display panel and a backlight unit or a planar lighting device for illuminating the liquid crystal display panel by radiating light from behind the liquid crystal display panel. The backlight unit is configured using a light guide plate for irradiating the liquid crystal display panel by diffusing light emitted by an illuminating light source and optical members such as a prism sheet and a diffusion sheet.

Backlight units currently used in liquid crystal display devices such as large liquid crystal televisions are predominantly of a type called direct illumination type having no light guide plate but comprising optical members such as a diffusion plate disposed immediately above the illuminating light source. This type of backlight unit comprises a light source constituted by cold cathode tubes provided on the rear side of the liquid crystal display panel whereas white reflection surfaces inside the backlight unit secure uniform light amount distribution and a necessary brightness. To achieve a uniform light amount distribution with the direct illumination type backlight unit, however, the backlight unit needs to have a given thickness, say about 30 mm, in a direction perpendicular to the liquid crystal display panel. While demands of still thinner backlight units are expected to grow in the future, achieving a further reduction of thickness to say 10 mm or less with a direct illumination type backlight unit is deemed difficult in view of uneven light amount distribution expected to accompany that type.

Thus, there has been proposed a backlight unit of a type using a light guide plate that is formed of a transparent resin containing scattering particles for diffusing light (see JP 07-36037 A, for example).

JP 07-36037 A, for example, discloses a light diffusion light guide light source device comprising a light diffusion light guide member having at least one light entrance plane region and at least one light extraction plane region and light source means for admitting light through the light entrance plane region, the light diffusion light guide member having a region that has a tendency to decrease in thickness with the increasing distance from the light entrance plane.

In the planar lighting device mentioned above, light emitted by the light source and admitted through the light entrance plane into the light diffusion light guide member receives a single or a multiple scattering effect at a given rate as the light propagates through the inside of the light diffusion light guide member. Moreover, a significant proportion of light that reaches both end planes of the light diffusion light guide member or a surface of a reflector is reflected and returned back into the diffusion light guide member.

The above composite process produces light beam that is emitted through the light exit plane highly efficiently with a directivity to travel obliquely forward as viewed from the light source. Briefly, light radiated by the light source is emitted through the light extraction plane of the light diffusion light guide member.

Thus, the prior art literature mentioned above purportedly states that a light guide plate containing scattering particles mixed therein is capable of emitting uniform light with a high light emission efficiency.

As regards the light guide plate used in the planar lighting device, there have been disclosed a light guide plate in the form of a flat plate and a light guide plate composed of a portion shaped to have a region with a tendency to grow thinner with the increasing distance from the light entrance plane attached to the other portion, as well as the light guide plate mentioned above that is shaped to have a region with a tendency to grow thinner with the increasing distance from the light entrance plane.

Resides fluorescent tubes such as cold cathode tubes, light emitting diodes (hereinafter referred to also as "LEDs") may also be used to provide a light source for supplying light into the light guide plate of the planar lighting devices as mentioned above (see JP 2005-183139 A and 2006-47975 A).

Use of LEDs, which are capable of emitting light having a high directivity, to provide a light source enables light admitted into the light guide plate to be guided deeper into the light guide plate and hence a larger planar lighting device to be designed. Another advantage is that LEDs help achieve a simple configuration of the power supply.

JP 2005-183139 A discloses a liquid crystal display device comprising color compensation means that performs color compensation through subtractive color mixing. The color compensation means is located somewhere between a white light source and a display surface of the liquid crystal display element, say either between the light entrance plane of the light guide plate and the light source, or between the radiating plane of the light guide plate and the liquid crystal display element, or in both of these locations. Note that the white light source used therein is of a type to produce white light through additive color mixing using a first light source for emitting monochromatic blue light and a second light source for emitting monochromatic red light in such a manner as to blend blue light emitted by the first light source, green light produced from the monochromatic blue light through wavelength conversion, and red light emitted by the second light source.

JP 2006-47975A discloses a color image display device comprising light shutters, a color filter having at least three component colors of red, green, and blue corresponding to the light shutters, and a backlight for transmitted lighting. The backlight has LEDs provided therein. Now, let any wavelength occurring at 5 nm increments in a visible range of 380 nm to 780 nm be $\lambda_n$ nm, the spectral transmittance [%] of a red pixel of the color filter at the wavelength $\lambda_n$ nm be $T^R(\lambda_n)$, and the relative luminescence intensity normalized by the entire luminescence intensity at the wavelength $\lambda_n$ nm of light emitted by the backlight be $I(\lambda_n)$. Then $I(620-680) \times TR(620-680) \geq 1.1$ holds in the above color image display device.

JP 07-253577 A discloses a color display device comprising light shutters for controlling transmitted light amount, color filters having three component colors of red, green and blue, and a light source. The light source is a single monochromatic white light source having therein synthesized monochromatic luminescence properties of the three colors and produces light having peak wavelengths that coincide with the peak wavelengths of the respective component colors in the transmitted wavelength ranges and having a spectroscopic property characterized by relatively narrow ranges. The three-color light transmitted through the color filter form a triangle on the chromatic coordinates having a greater area than the triangle that shows the transmittance characteristics of the color filters.

JP 2003-207770 A discloses a color liquid crystal display device using blue, green and red light emission diodes as a color light source for the backlight together with blue, green and red color filters. The blue light emission diode has a peak wavelength in a range of 430 nm to 480 nm, the green light emission diode has a peak wavelength in a range of 520 nm to 570 nm, and the red light emission diode has a peak wavelength in a range of 620 nm to 660 nm. The color filter has a spectral transmittance of 80% or more at the peak wavelengths of the blue, green and red light emission diodes.

JP 2004-85592 A discloses a liquid crystal display device using a color filter having red, green and blue pixels, wherein the transmittance at a wavelength at which the transmittance in a wavelength range located on the shorter-wavelength side of the wavelength at which the transmittance of the green pixel peaks coincides with the transmittance in a wavelength range located on the longer-wavelength side of the wavelength at which the transmittance of the blue pixel peaks is 10% or less, whereas the transmittance of the green pixel at the peak wavelength is 60% or more and the transmittance of the blue pixel at the peak wavelength is 50% or more.

SUMMARY OF THE INVENTION

Meanwhile, to produce white light using an LED light source, one may employ a method that uses three different LEDs each emitting light of which the center wavelengths represent red, green, and blue, respectively. By this method, red light, green light, and blue light emitted by the respective LEDs are blended to produce white light. One may alternatively use a method whereby the LEDs that emit light having a center wavelength in a range of blue or violet have a phosphor layer on their light emission faces such that blue light or violet light emitted by the LEDs is converted into white light through the phosphor layer.

The method using the three different LEDs having the center wavelengths in ranges for red, green, and blue, respectively, is advantageous in that light representing a desired color can be emitted through the light emission face by adjusting the wavelengths and the luminescence intensities of the light emitted by the respective LEDs. However, the method presents some problems: control is made difficult by the fact that the properties such as temperature characteristics vary among the three different LEDs; the driving method used is complicated. Another problem is the difficulty encountered in raising the light use efficiency and reducing the costs of the device.

In contrast, a light source having a configuration combining a monochromatic LED and a phosphor, a configuration, in particular, wherein a yellow phosphor is applied to the light emission face of an LED that emits blue light, can be manufactured at low costs.

However, such light source has its share of problems: light produced by a blue LED having a phosphor applied thereto has a low color temperature and it is difficult to adjust the color temperature without lowering the light use efficiency. Accordingly, light emitted through the light exit plane of a planar lighting device has a low color temperature, and the adjustment is difficult.

JP 2005-183139 A proposes a planar lighting device wherein a blue LED and a phosphor are used together to provide a simulated white light source and, in addition, a red LED is used to increase color saturation.

While use of a red LED may improve color rendering for red, the color temperature of light emitted by such light source cannot be thereby increased.

JP 2006-47975 A, JP 07-253577 A, JP 2003-207770 A, and JP 2004-85592 A propose a liquid crystal display device that uses a color filter to increase color rendering or color reproducibility of emitted light.

While color rendering of light emitted from the liquid crystal display device may be improved also by providing a color filter and transmitting light through the color filter as described, this fails to increase the color temperature of light emitted by the light source.

Further, the shape as disclosed in JP 07-36037 A having a tendency to decrease in thickness with the increasing distance from a position at which light from the light source enters or the flat plate shape also poses a problem that a limited distance that light is capable of traveling confines the extent to which the dimensions of the planar lighting device can be increased.

Still further, to achieve increased dimensions with the planar lighting device using the light guide plates disclosed in JP 07-36037 A, light needs to travel a longer distance from the light source, which in turn requires the light guide plate itself to be made thicker. Such problems make it impossible to increase the dimensions and reduce the thickness and weight of a planar lighting device.

An object of the present invention is to provide a liquid crystal display device that eliminates the problems encountered by the above prior art and is capable of emitting light having a desired color temperature and displaying high quality images with a simple configuration.

Another object of the present invention is to provide a liquid crystal display device capable of emitting light having a high color reproducibility and displaying high quality images in addition to the above object.

Still another object of the present invention is to provide a thin, lightweight liquid crystal display device capable of emitting uniform illuminating light free from brightness unevenness and permitting increase in dimensions in addition to the above objects.

Yet another object of the present invention is to provide a liquid crystal display device capable of efficiently using light emitted by a light source, emitting light having a higher brightness through a light exit plane, and displaying high quality images in addition to the above object.

To solve the above problems, the present invention provides a liquid crystal display device comprising:

a planar lighting device comprising:
at least one light source having one or more LED chips emitting blue light through a light emission face;
a transparent light guide plate comprising at least one light entrance plane for admitting light emitted by the light source and a light exit plane for emitting light admitted from the light entrance plane as planar light;
a fluorescent member disposed between the light emission face of the at least one light source and the light entrance plane of the transparent light guide plate and comprising one or more fluorescent substance coated areas for emitting white light by converting the blue light emitted through the light emission face into the white light and one or more blue light passing areas for emitting the blue light emitted through the light emission face as the blue light;
wherein the planar lighting device emits light through a light emission plane of the light exit plane of the light guide plate; and a liquid crystal display panel disposed on the light emission plane of the planar lighting device and including a color filter comprising at least a red filter with a red color component, a green filter with a green color component, and a blue filter with a blue color component.

The color filter satisfies conditions that a difference between a wavelength at which a spectral transmittance of the blue filter peaks and a wavelength at which an intensity of the light emitted by the light source peaks is 20 nm or less, and that either $0 \leq P_{BG} \leq 0.5$ and $60 \leq W_B \leq 100$ or $0 \leq P_{BG} \leq 0.2$ and $60 \leq W_G \leq 100$ or both hold, where $P_{BG}$ denotes a spectral transmittance at a wavelength at which the spectral transmittance of the blue filter and a spectral transmittance of the green filter are identical, $P_{GR}$ denotes a spectral transmittance at a wavelength at which the spectral transmittance of the green filter and a spectral transmittance of the red filter are identical, $W_B$ denotes a full-width at half-maximum [nm] of the spectral transmittance of the blue filter, and $W_G$ denotes a full-width at half-maximum of the spectral transmittance of the green filter.

Further, the liquid crystal display device preferably comprises an auxiliary light source including at least one auxiliary LED chip disposed adjacent the one or more LED chips of the at least one light source and emitting light having a wavelength different from a wavelength of each LED chip of the at least one light source.

Further, each LED chip of the at least one light source and each auxiliary LED chip of the auxiliary light source are preferably disposed in a repeated pattern.

Each auxiliary LED chip of the auxiliary light source is preferably formed of an LED chip emitting light having a peak wavelength of 380 nm inclusive to 780 nm inclusive and a full-width at half-maximum of 5 nm inclusive to 20 nm inclusive.

Further, $0.05 \leq ls \leq lm \leq 0.5$ preferably holds where lm denotes an amount of the light emitted by each LED chip of the at least one light source and ls denotes an amount of the light emitted by each auxiliary LED chip of the auxiliary light source.

The one or more blue light passing areas are preferably formed of a transparent film or one or more apertures.

Preferably, each of the at least one light source comprises a plurality of LED chips and a base for supporting the plurality of LED chips, and the plurality of LED chips are disposed in a row on a surface of the base facing the light entrance plane of the transparent light guide plate.

Further, the fluorescent member preferably has two or more of the blue light passing areas formed for the light emission face of each LED chip.

Preferably, each light source has LED chips, and the fluorescent member is a sheet member common to the LED chips. Also, preferably, the fluorescent member is provided for each of the LED chips Further, the fluorescent member preferably satisfies $0.05 \leq Sap/Sa \leq 0.40$, where Sa is a whole area of the fluorescent member and Sap is a sum of all of the one or more blue light passing areas.

The fluorescent member is preferably disposed in contact with the light emission faces and/or with the light entrance plane.

Preferably, the transparent light guide plate has the at least one light entrance plane formed at one or more ends of the transparent light guide plate neighboring the light exit plane and has a shape growing in thickness vertical to the light exit plane as a distance from the at least one light entrance plane increases. Alternatively, the transparent light guide plate preferably has a configuration comprising a light exit plane for emitting planar light, at least one light entrance plane formed at one or more ends of the transparent light guide plate neighboring the light exit plane for admitting light traveling in a direction substantially perpendicular to the light exit plane and then in a direction parallel to the light exit plane, and inclined planes located on the opposite side from the light exit plane and inclined in such a manner as to be farther from the light exit plane with the increasing distance from the at least one light entrance plane.

Preferably, the light guide plate contains numerous scattering particles therein and satisfies following inequalities:

$$1.1 \leq \Phi \cdot N_p \cdot L_G K_C \leq 8.2$$

$$0.005 \leq K_C \leq 0.1$$

where $\Phi$ denotes a scattering cross section of the scattering particles, $N_p$ denotes a density of the scattering particles, $K_C$ denotes a compensation coefficient, and $L_G$ denotes a length in an incident direction of the light from the at least one light entrance plane to a position where a thickness of the transparent light guide plate is greatest.

Preferably, the one or more LED chips have a light emission face longer than a length of an effective cross section of the light entrance plane passing through an end of the light exit plane at which the light entrance plane is formed and lying in a direction substantially perpendicular to the light exit plane, and the LED chips are disposed such that the light emission face is opposite the light entrance plane of the transparent light guide plate and tilted a given angle with respect to a direction substantially perpendicular to the light exit plane.

Preferably, the light entrance plane of the transparent light guide plate is a plane substantially perpendicular to the light exit plane and the effective cross section of the light entrance plane is that substantially perpendicular plane. It is also preferable that the light entrance plane of the light guide plate is a plane inclined with respect to a direction substantially perpendicular to the light exit plane such that the light entrance plane faces and is parallel to the light emission face of the light source and wherein an effective cross section of the light entrance plane is a cross section lying in a plane passing through a center of the light entrance plane and substantially perpendicular to the light exit plane.

Further, an inclination angle of the light emission face of each light source with respect to a direction substantially perpendicular to the light exit plane is preferably 15° to 90°.

Further, the liquid crystal display device preferably comprises light guide reflection plates for guiding light emitted by the light source to the light entrance plane, disposed on a side of the light entrance plane of the transparent light guide plate closer to the light exit plane and on a side of the light entrance plane opposite from the light exit plane. More preferably, the light guide reflection plates comprise a first light guide reflection plate attached to an end of the light exit plane of the transparent light guide plate and a second light guide reflection plate attached to an end of a plane of the light guide plate opposite from the light exit plane and comprising an extension extending farther outward from an end of the plane of the transparent light guide plate opposite from the light exit plane.

The transparent light guide plate preferably has a configuration such that the light exit plane is rectangular and the at least one light entrance plane of the transparent light guide plate comprises a first light entrance plane and a second light entrance plane each formed on two opposite sides of the light exit plane. Preferably, the transparent light guide plate is thinnest at the first light entrance plane and the second light entrance plane and thickest at a midpoint of a line connecting the first light entrance plane and the second light entrance plane.

Alternatively, the transparent light guide plate preferably has a configuration comprising a light exit plane for emitting planar light therethrough, at least one lateral plane formed at one or more ends of the light exit plane and inclined by an inclination angle of greater than 90° with respect to the light exit plane, inclined planes located on the opposite side from the light exit plane and inclined in such a manner as to be farther from the light exit plane with the increasing distance from the at least one light entrance plane, and at least one light entrance plane formed between the lateral plane and the inclined plane for admitting light therethrough.

According to the present invention, part of the light supplied by an LED can be emitted as blue light by providing blue light passing areas in a fluorescent member that converts blue light emitted by the LED into white light. This makes it possible to provide a liquid crystal display device capable of emitting light having a high color temperature and a high color reproducibility, and displaying high quality images.

Further, since the color temperature can be adjusted merely by forming the blue light passing areas in the fluorescent member, easy adjustment is possible and the configuration of the device can be simplified.

Further, the color reproducibility can be increased, images can be displayed with a higher quality, and the light use efficiency can be increased by using a color filter that satisfies conditions that the difference between a wavelength at which the transmittance of a blue filter peaks and a wavelength at which the intensity of light emitted by the light source peaks is 20 nm or less, and that either $0 \leq P_{BG} \leq 0.5$ and $60 \leq W_B \leq 100$ or $0 \leq P_{GR} \leq 0.2$ and $60 \leq W_G \leq 100$ or both hold.

Still further, light admitted through the light entrance plane can be allowed to travel deeper into the light guide plate according to the present invention by providing the light guide plate having a shape of which the thickness in a direction perpendicular to the light exit plane grows with the increasing distance from the light entrance plane of the light guide plate, enabling a thin design to be achieved with a large light exit plane.

Further, light can be admitted with a high efficiency by disposing a light emission face of the light source tilted a given angle with respect to a direction perpendicular to the light exit plane, also when using the light source with the light emission face longer than the length of the light entrance plane in the effective cross section. To be brief, a high light use efficiency is achieved. Further still, the amount of light emitted through the light emission face can be increased by increasing the area of the light emission face.

Thus, according to the present invention, light with a high brightness or a high illuminance can be efficiently emitted through the light exit plane while achieving a thin design of the device.

BRIEF DESCRIPTION OF THE DRAWINGS

These and other objects, features, and advantages of the present invention will be apparent from the following detailed description and accompanying drawings in which;

FIG. 7A is a top plan view, FIG. 7B is a front view, and FIG. 7C is an elevation.

FIG. 15R is a top plan view, FIG. 15B is a front view, and FIG. 15C is an elevation.

DETAILED DESCRIPTION OF THE INVENTION

Now, preferred embodiments of the liquid crystal display device according to the present invention will be described in detail by referring to the accompanying drawings.

Figure 1:
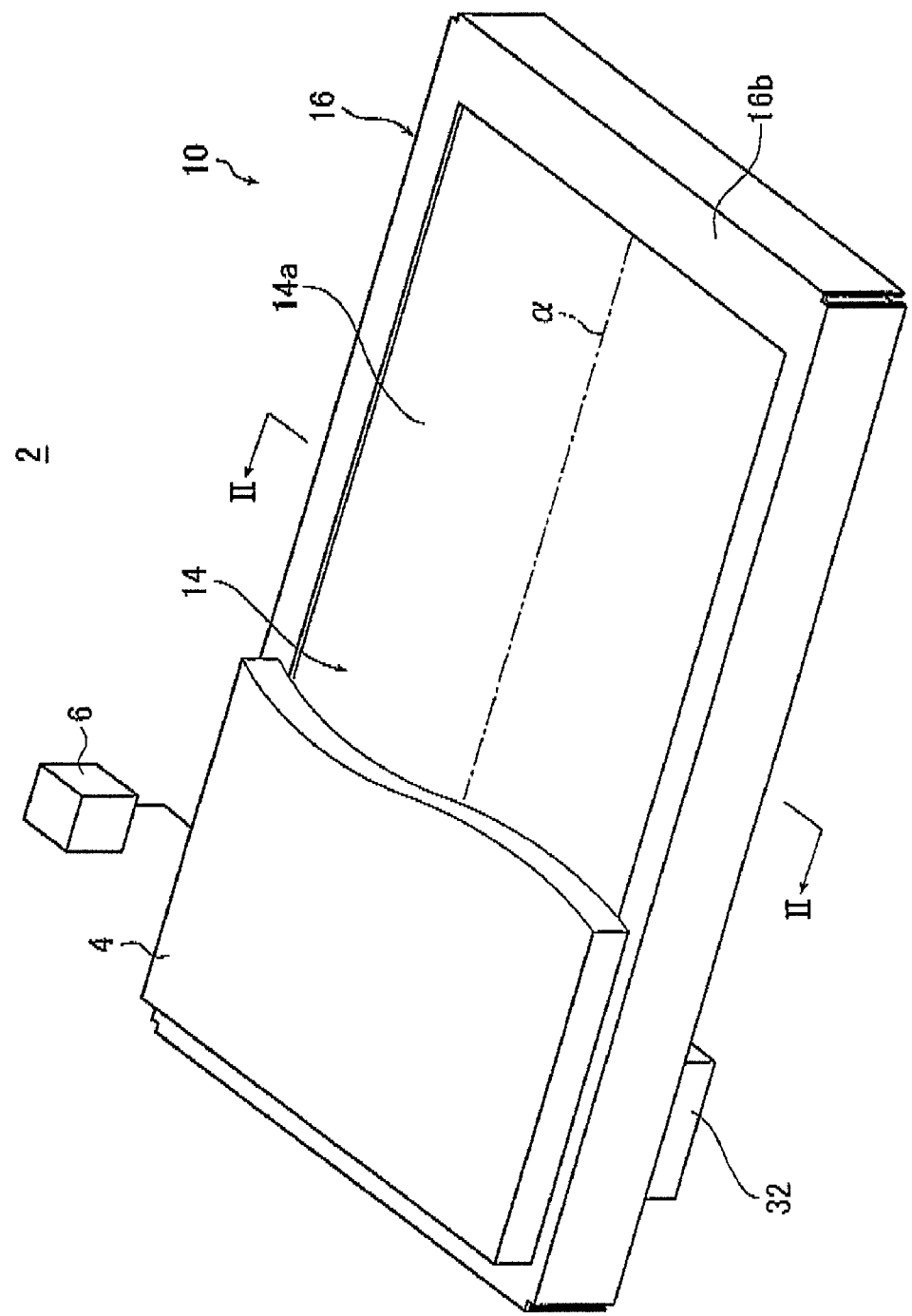
FIG. 1 is a perspective view schematically illustrating an embodiment of the liquid crystal display device according to the present invention.
Figure 2:
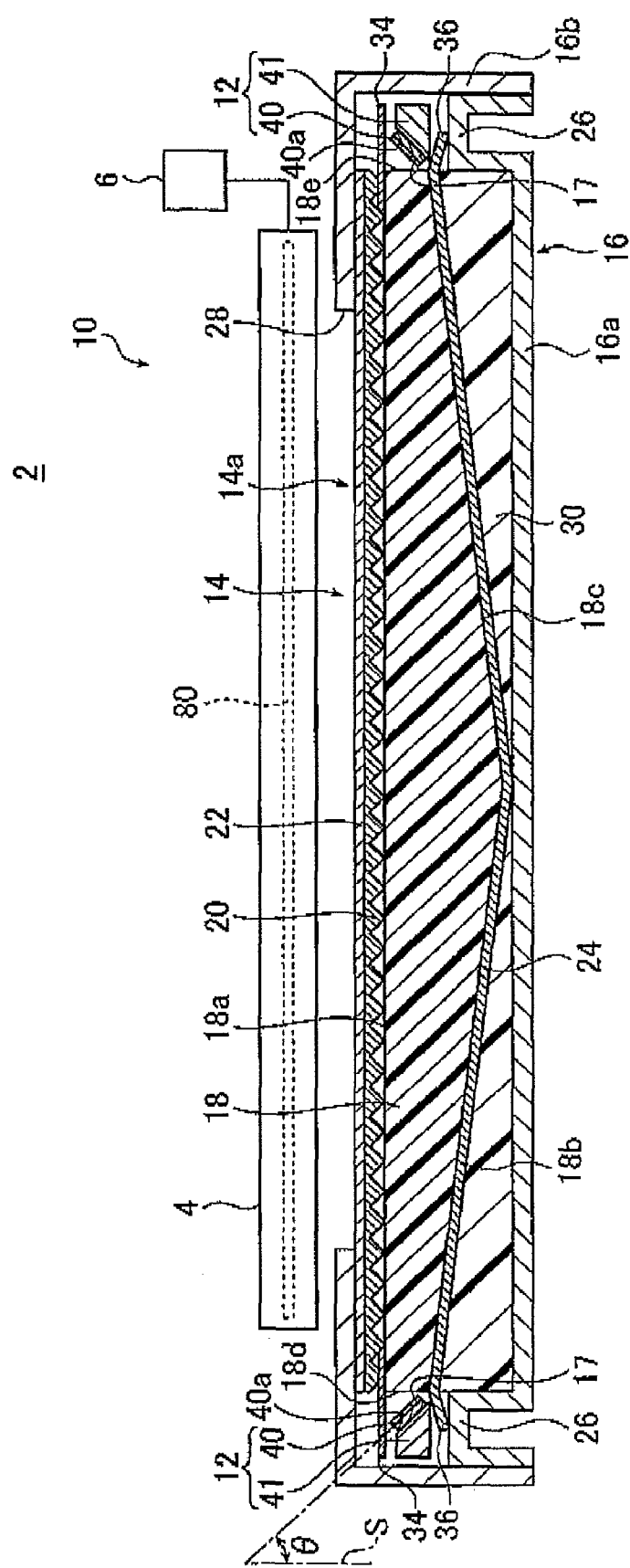
FIG. 2 is a sectional view of the liquid crystal display device illustrated in FIG. 1 taken along a line II-II.
Figure 5:
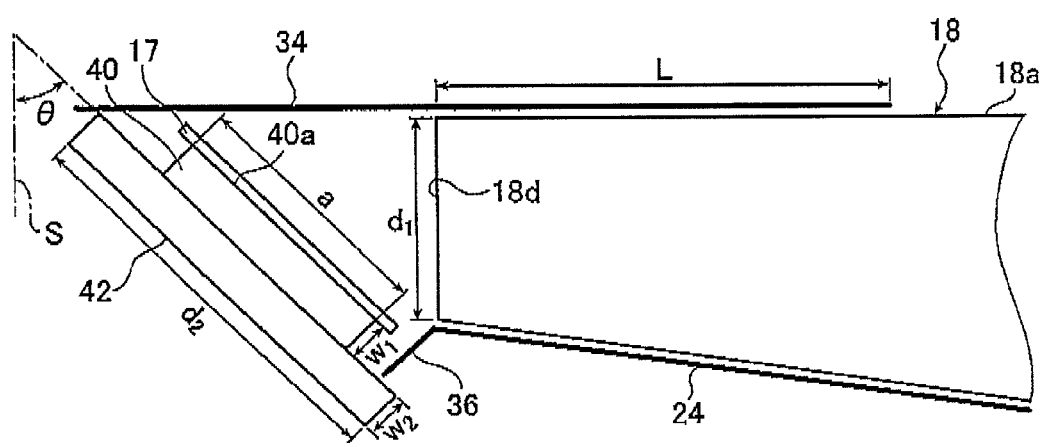
FIG. 5 is an enlarged sectional view illustrating part of a planar lighting device of FIG. 2 enlarged.

FIG. 1 is a perspective view illustrating an embodiment of the inventive liquid crystal display device. FIG. 2 is a sectional view of the liquid crystal display device illustrated in FIG. 1 taken along the line II-II, FIG. 5 is an enlarged sectional view illustrating part of the liquid crystal display device of FIG. 2 enlarged.

As illustrated in FIGS. 1 and 2, a liquid crystal display device 2 comprises a planar lighting device 10, a liquid crystal display panel 4 disposed on the side of the planar lighting device 10 closer to a light exit plane, and a drive unit 6 for driving the liquid crystal display panel 4. FIG. 1 omits part of the liquid crystal display panel 4 to better illustrate the structure of the planar lighting device.

The liquid crystal display panel 4 comprises a liquid crystal cell layer (not shown) and a color filter 80. In the liquid crystal cell layer, liquid crystal cells are arranged regularly. Upon application of an electric field, the liquid crystal molecules, previously aligned in a given direction, change their orientation. This in turn changes the refractive indices in the liquid crystal cells in such a manner as to enable switching between passing and shutting of light in a selectable manner. The color filter 80 is disposed on the side of the liquid crystal cell layer closer to the display surface, i.e., the surface through which light admitted into the liquid crystal cell is emitted.

In the liquid crystal display panel 4, an electric field is selectively applied to the liquid crystal cells in the liquid crystal cell layer to change the orientation of the liquid crystal molecules such that the refractive index is changed in the liquid crystal cells, thereby switching between passing and shutting of light to select light that is to be transmitted through the color filter 80. Thus, the liquid crystal display panel 4 displays characters, figures, images, etc. on its surface.

Now, the color filter 80 of the liquid crystal display panel 4 will be described.

Figure 3:
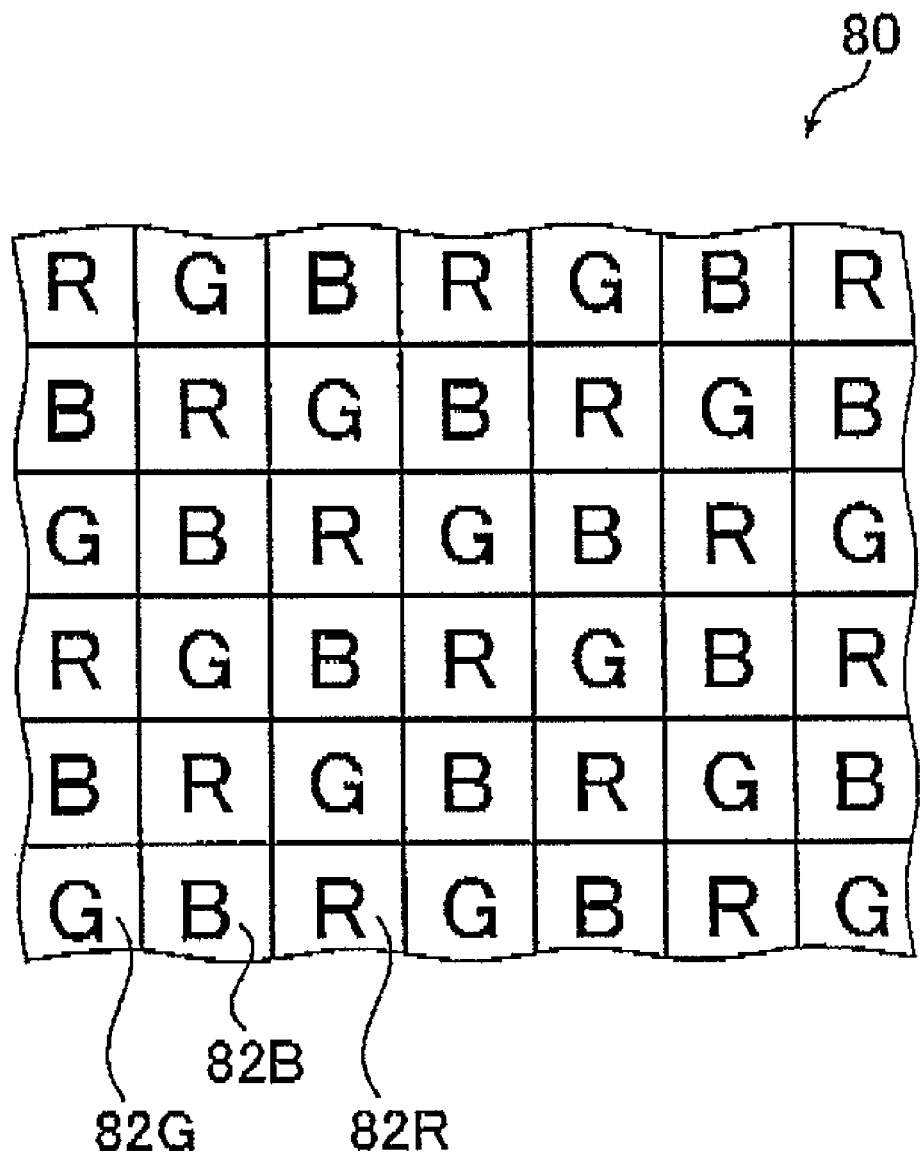
FIG. 3 is an enlarged front view illustrating part of a color filter enlarged.

FIG. 3 is an enlarged front view illustrating part of the color filter enlarged.

The color filter 80 comprises red filters 82R for transmitting a red light component, green filters 82G for transmitting a green light component, and blue filters 82S for transmitting a blue light component. The color filter 80 is provided inside the liquid crystal display panel 4.

As illustrated in FIG. 3, the red filters 82R, the green filters 82G, and the blue filters 82S constituting the color filter 80 are arranged in order according to given rules. More specifically, one red filter 82R, one green filter 82G, and one blue filter 82S are provided for each pixel of the liquid crystal display panel 4. For each filter is provided one liquid crystal cell described above.

In the embodiment under discussion, the color filter 80 is divided into lattice-like sections. One red filter 82R, one green filter 82G, and one blue filter 82B are disposed in the respective sections in this order. Thus, every three sections having the three colors make up one pixel of the liquid crystal display panel.

Figure 4:
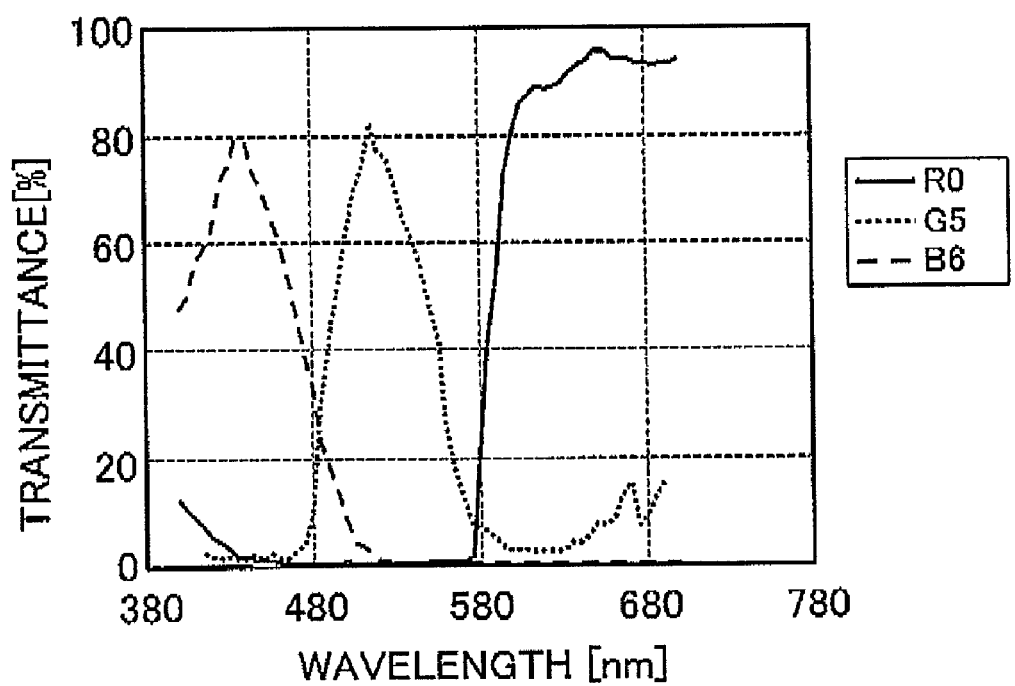
FIG. 4 is a graph illustrating an example of transmittance characteristics of a red filter, a green filter, and a blue filter forming the color filter.

FIG. 4 illustrates examples of transmittance characteristics of the red filters 82R, the green filters 82G, and the blue filters 82B constituting the color filter 80. FIG. 4 shows transmittance [%] on the vertical axis plotted against wavelength [nm] on the horizontal axis. Note that FIG. 4 shows transmittance characteristics observed where R0 is used for the red filter 82R, G5 for the green filter and B6 for the blue filter.

As illustrated in FIG. 4, the filters for the different colors have different transmittance characteristics and each have a spectral transmittance that is high in a wavelength area for the corresponding color and low in the other range.

Specifically, the red filter 82R is a film having transmittance characteristics that exhibit a high spectral transmittance for light falling in a wavelength range of not less than 600 nm, which is a range for red light component, and low spectral transmittance for light falling in the other wavelength range.

The green filter 82G is a film having transmittance characteristics that exhibit a high spectral transmittance for light falling in a wavelength range of 500 nm inclusive to 570 nm inclusive, which is a range for green light component, and a low spectral transmittance for light falling in the other wavelength ranges. The blue filter 82B is a film having transmittance characteristics that exhibit a high spectral transmittance for light falling in a wavelength range of 420 nm inclusive to 500 nm inclusive, preferably 420 nm inclusive to 490 nm inclusive, which is a range for blue light component, and a low spectral transmittance for light falling in the other wavelength ranges.

Thus, the red filter 82R has a spectral transmittance peaking, in a wavelength range of not less than 600 nm; the green filter 82G has a spectral transmittance peaking in a wavelength range of 500 nm inclusive to 570 nm inclusive; and the blue filter 82B has a spectral transmittance peaking in a wavelength range of 420 nm inclusive to 500 nm inclusive.

While, in the embodiment under discussion, the filters for the different colors are provided in equal proportions, the present invention is not limited to such arrangement: the filters may be provided in different proportions according to the color. The order in which the filters are arranged is also not limited and may be any appropriate order desired.

Light transmitted through the red filter 82R becomes red light, light transmitted through the green filter 82G becomes green light, and light transmitted through the blue filter 82B becomes blue light as they are emitted through the color filter 80.

The drive unit 6 controls the transmittance of light transmitted through the liquid crystal display panel by applying a voltage to transparent electrodes provided in the liquid crystal display panel to change the orientation of the liquid crystal molecules inside the liquid crystal cells. In other words, the drive unit 6 controls the selection between shutting light and allowing light to pass for it to be transmitted through the filters for the different colors located in the individual positions. Thus, images and the like are displayed on the liquid crystal display panel 4 by selecting between shutting light and emitting light for it to be transmitted through the filters fox the different colors located in the individual positions.

Now, a planar lighting device 10 will be described.

The planar lighting device 10 is a lighting device to irradiate the whole surface of the liquid crystal display panel 4 from behind the liquid crystal display panel 4 and has substantially a light exit plane having substantially a same shape as an image display surface of the liquid crystal display panel 4.

As illustrated in attached drawings, the planar lighting device 10 comprises light sources 12, a main body 14 of the lighting device, the fluorescent members 17 disposed between the light sources 12 and the main body 14 of the lighting device, and a housing 16 accommodating the light sources 12, the main body 14 of the lighting device, and the fluorescent members 17. The housing 16 comprises a main body 16*a* and a frame member 16*b* as will be described.

The light sources 12 will be first described.

Figure 6A:
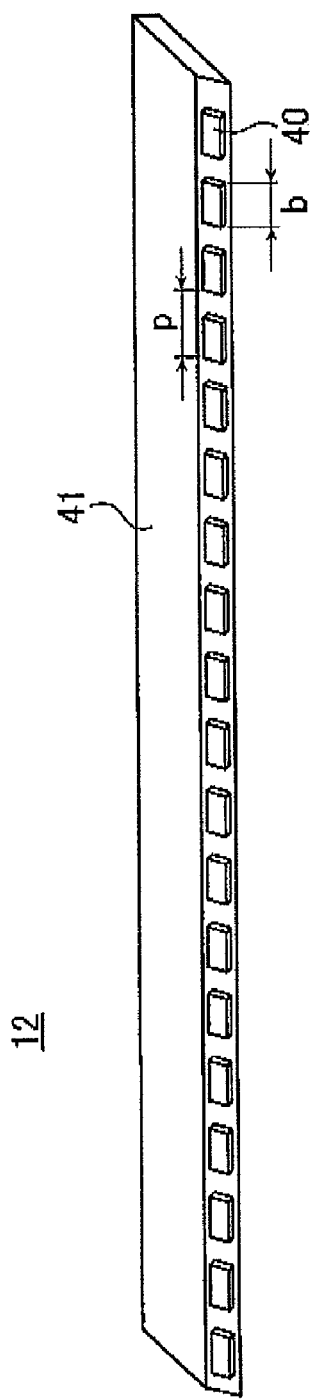
FIG. 6A is a perspective view schematically illustrating a configuration of a light source for the planar lighting device of FIGS. 1 and 2.
Figure 6B:
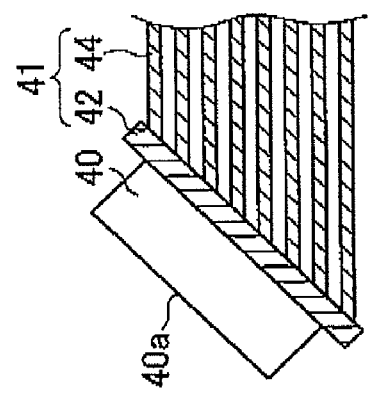
FIG. 6B is a sectional view of the light source illustrated in FIG. 6A.
Figure 6C:
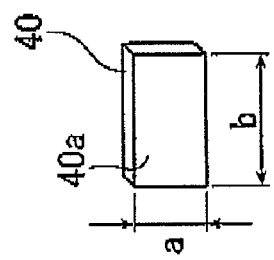
FIG. 6C is a perspective view schematically illustrating one LED of the light source of FIG. 6A enlarged.

FIG. 5 is an enlarged sectional view illustrating part of the planar lighting device of FIG. 2 near the light source 12 enlarged. FIG. 6A is a perspective view schematically illustrating the light source 12 of the planar lighting device 10 of FIGS. 1 and 2; FIG. 6B is a sectional view of the light source 12 illustrated in FIG. 6A; and FIG. 6C is a perspective view schematically illustrating only one LED chip, as enlarged, of the light source 12 of FIG. 6A.

As illustrated in FIG. 6A, the light source 12 comprises chips 40 of light emitting diodes (referred to as "LED chips" below) and a light source mount 41.

The LED chip 40 is a chip of a light emitting diode that emits blue light and has a light emission face 40*a* with a given area through which blue light is emitted. The LED chip 40 is exemplified by a GaN base light emitting diode and an InGaN base light emitting diode. In the present invention, blue light denotes light having a peak wavelength in a range of 420 nm inclusive to 500 nm inclusive, as emitted. Light emitting diodes used in the present invention for emission of blue light preferably has a peak wavelength in a range of 450 nm inclusive to 480 nm inclusive, as emitted.

As illustrated in FIG. 6B, the light source mount 41 comprises an array base 42 and fins 44. The LED chips 40 are arranged in a single row at given intervals on the array base 42. Specifically, two or more LED chips 40 are arrayed along the longitudinal length of a first light entrance plane 18*d* or a second light entrance plane 18*e* of a light guide plate 18 to be described or parallel to a line in which a light exit plane 18*a* and the first light entrance plane 18*d* meet or a line in which the light exit plane 18*a* and the second light entrance plane 18*e* meet.

The array base 42 is a plate-like member disposed such that one side thereof faces a lateral end face of the light guide plate 18 where the light guide plate is thinnest: the array base 42 is disposed to face the first light entrance plane 18*d* or the second light entrance plane 18*e* defining the lateral end face of the light guide plate 18. The array base 42 carries the LED chips 40 on the side thereof facing the light entrance plane of the light guide plate 18.

The array base 42 according to the embodiment under discussion is formed of a metal having a good heat conductance, as exemplified by copper and aluminum. The array base 42 also acts as a heat sink to absorb heat generated by the LED chips 40 and release the heat to the outside.

The fins 44 are plate-like members formed of a metal having a good heat conductance, as exemplified by copper and aluminum. The fins 44 are connected to the array base 42 on the side thereof opposite from the LED chips 40 and spaced a given distance from adjacent fins 44.

A plurality of fins 44 provided in the light source mount 41 secure a large surface area and a high heat dissipation efficiency, increasing the efficiency with which the LED chips 40 are cooled.

The heat sink may be not only of air-cooled type but also of water-cooled type.

While the embodiment under discussion uses the array base 42 of the light source mount 41 as heat sink, a plate-like member without a heat-releasing function may be used to form the array base, where the LED chips need not be cooled, in place of the array base having a function of a heat sink.

As illustrated in FIG. 6C, the LED chips 40 of the embodiment under discussion each have a rectangular shape such that the sides perpendicular to the direction in which the LED chips 40 are arrayed are shorter than the sides lying in the direction in which the LED chips 40 are arrayed or, in other words, the sides lying in the direction of thickness of the light guide plate 18 to be described, i.e., the direction perpendicular to the light exit plane 18*a*, are the shorter sides. Expressed otherwise, the LED chips 40 each have a shape defined by "b">"a" where "a" denotes the length of the sides perpendicular to the light exit plane 18*a* of the light guide plate 18 and "b" denotes the length of the sides in the direction of the array. Further, a distance "q" by which the arrayed LED chips 40 are spaced apart from each other satisfies "q">"b." Thus, the relation between the length "a" of the sides of the LED chips 40 perpendicular to the light exit plane 18*a* of the light guide plate 18, the length "b" of the sides in the direction of the array, and the distance "q" of the LED chips 40 by which the arrayed LED chips 40 are spaced apart from each other preferably satisfies "q">"b">"a."

Providing the LED chips 40 each in the form of a rectangle ensures generation of light in a great quantity with a thin design. A thin design of the light source, in turn, enables a thin design of a planar lighting device to be achieved.

While the LED chips 40 each preferably have a rectangular shape with the shorter sides lying in the direction of the thickness of the light guide plate 18 for a thinner design of the LED array or the light source, the present invention is not limited thereto, allowing the LED chips to have any shape as appropriate such as a square, a circle, a polygon, and an ellipse.

As illustrated in FIGS. 2 and 5, the LED chips 40 and the array bases 42 are disposed at a given angle with respect to the direction perpendicular to the light exit plane 18*a* of the light guide plate 18 to be described. Thus, the LED chips 40 are disposed such that their light emission faces 40*a* are tilted a given angle with respect to the direction perpendicular to the light exit plane 18*a* of the light guide plate 18 to be described.

This will be described later in detail.

The light emission faces 40*a* of the LED chips 40 are provided with the fluorescent member 17.

Figure 7A:
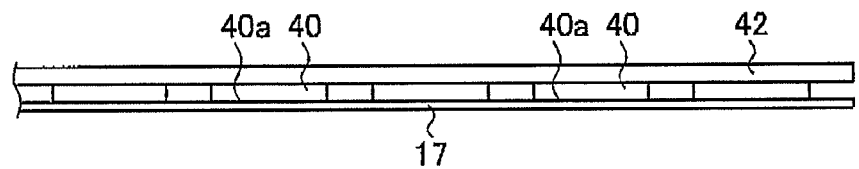
FIGS. 7A to 7C illustrate part of a fluorescent member and the light source of the planar lighting device of FIG. 2.
Figures 7B, 7C:
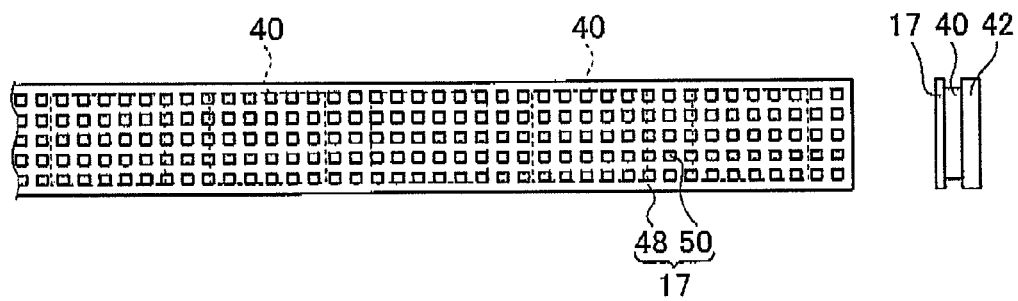

FIGS. 7A to 7C illustrate part of the fluorescent member and the light source of the planar lighting device of FIG. 2. FIG. 7A is a top plan view, FIG. 7B is a front view, and FIG. 7C is an elevation.

As illustrated in FIGS. 7A to 7C, the fluorescent member 17 is a sheet member disposed on and in contact with the light emission faces 40*a* of the LED chips 40 of the light sources 12. More specifically, the fluorescent member 17 is in contact with the light emission faces 40*a* of the LED chips 40 of the light source 12 where the fluorescent member 17 is located opposite the light emission faces 40*a*. The fluorescent member 17 may be mounted by any method. For example, it may be bonded to the light emission faces 40*a* with a bonding material, or secured to the light emission faces 40*a* with, for example, fixing members such that the fluorescent member 17 is in contact with the light emission faces 40*a*.

The fluorescent member 17 is a sheet member having dimensions sufficient to lie over the light emission faces 40*a* of all the LED chips 40 disposed on the array base 42. The fluorescent member 17 comprises a fluorescent substance coated area 48 and apertures 50. Expressed otherwise, the fluorescent member 17 is basically formed with the fluorescent substance coated area 48 having rectangular apertures 50 formed therein at given intervals. Thus, the other part of the fluorescent member 17 than the apertures 50 is the fluorescent substance coated area 48 formed of the fluorescent substance.

The fluorescent substance coated area 48 is formed of a YAG (yttrium aluminum garnet) base fluorescent substance. When blue light emitted by the LED chips 40 is transmitted through the fluorescent substance coated area 48, the YAG base fluorescent substance generates fluorescence.

Thus, when blue light emitted by the LED chips 40 is transmitted through the fluorescent substance coated area 48, the blue light emitted by the LED chips 40 and the light radiated as the YAG base fluorescent substance generates fluorescence blend to produce white light. Thus, the light emitted by the LED chips 40 and transmitted through the fluorescent substance coated area 48 is converted from blue light into white light. Expressed otherwise, the fluorescent substance coated area 48 converts blue light that it transmits into white light.

The apertures 50 are rectangular apertures formed, as described above, in the sheet fluorescent member 17 at regular intervals in a matrix form. The apertures 50 pass blue color emitted by the LED chips 40 as blue color. Thus, light emitted by the LED chips 40 and passed through the apertures 50 come out unchanged therethrough as blue light.

Thus, the fluorescent member 17 comprises two regions: a region provided by the fluorescent substance coated area 48 to convert blue light into white light and the other region provided by the apertures 50 to pass blue light as blue light.

The fluorescent member 17 comprising the fluorescent substance coated area 48 and the apertures 50 may be fabricated, for example, by applying a fluorescent substance onto the whole area of a transparent sheet to form the fluorescent substance coated area over the whole area of the transparent sheet, and then cutting out apertures.

By another method, the apertures may be first cut out from a transparent sheet, thereafter applying a fluorescent substance onto the transparent sheet to form the fluorescent substance coated area.

As illustrated in FIG. 2, the main body 14 of the lighting device basically comprises the light guide plate 18, a prism sheet 20, a diffusion sheet 22, a reflection plate 24, upper light guide reflection plates 34, and lower light guide reflection plates 36.

These optical components forming the main body 14 of the lighting device will now be described in detail below.

First, the light guide plate 18 will be described.

As illustrated in FIG. 2, the light guide plate 18 comprises the light exit plane 18*a*, which is flat and substantially rectangular; two light entrance planes, the first light entrance plane 18*d* and the second light entrance plane 18*e*, formed on both sides of the light exit plane 18*a* and substantially perpendicular to the light exit plane 18*a*; and the two inclined planes, i.e., a first inclined plane 18*b* and a second inclined plane 18*c* located on the opposite side from the light exit plane 18*a* and inclined a given angle with respect to the light exit plane 18*a* so as to be symmetrical to each other with respect to a bisector α (see FIG. 1) parallel to the first light entrance plane 18*d* and the second the light entrance plane 18*e* and bisecting the light exit plane 18*a*. The first inclined plane 18*b* and the second inclined plane 18*c* are so inclined as to be distanced farther from the light exit plane 18*a* with the increasing distance from the first light entrance plane 18*d* or the second light entrance plane 18*e*: expressed otherwise, the thickness of the light guide plate 18 in the direction perpendicular to the light exit plane increases from the first light entrance plane 18*d* or the second the light entrance plane 18*e* toward the center of the light guide plate. Thus, the light guide plate 18 is thinnest at both sides thereof, i.e., at the first light entrance plane 18*d* and the second light entrance plane 18*e*, and thickest at the center, i.e., on the bisector α, where the first inclined plane 18*b* and the second inclined plane 18*c* meet. Yet otherwise expressed, the light guide plate 18 has a shape such that the thickness of the light guide plate 18 in the direction perpendicular to the light exit plane increases with the increasing distance from the first light entrance plane 18*d* or the second light entrance plane 18*e*. The inclination angle of the first inclined plane 18*b* and the second inclined plane 18*c* with respect to the light exit plane 18*a* is not specifically limited.

The light sources 12 mentioned above are disposed opposite the first light entrance plane 18*d* and the second light entrance plane 18*e* of the light guide plate 18, respectively. Thus, the planar lighting device 10 has the two light sources 12 disposed in such a manner as to sandwich the light guide plate 18. In other words, the light guide plate 18 is placed between the two light sources 12 arranged opposite each other with a given distance between them.

The shape of the light guide plate growing thicker in the direction perpendicular to the light exit plane 18*a* with the increasing distance from the first light entrance plane 18*d* or the second light entrance plane 18*e* allows the light admitted through the light entrance plane to travel farther from the light entrance planes and, hence, enables a larger light exit plane to be achieved. Moreover, since the light entering through the light entrance plane is allowed to purposively travel a long distance from the light entrance plane, a thinner design of the light guide plate is made possible.

In the light guide plate 18 illustrated in FIG. 2, light entering through the first light entrance plane 18*d* and the second light entrance plane 18*e* is scattered by scatterers contained inside the light guide plate 18 as will be described later in detail as it travels through the inside of the light guide plate 18*t* and, directly or after being reflected by the first inclined plane 18*b* or the second inclined plane 18*c*, exits through the light exit plane 18*a*. Some light can in the process leak through the first inclined plane 18*b* and the second inclined plane 18*c*. However, it is then reflected by the reflection plate 24 covering the first inclined plane 18*b* and the second inclined plane 18*c* to enter the light guide plate 18 again.

The light guide plate 18 is formed of a transparent resin into which scattering particles are kneaded and dispersed. Transparent resin materials that may be used to form the light guide plate 18 include optically transparent resins such as PET (polyethylene terephthalate), PP (polypropylene), PC (polycarbonate), PMMA (polymethyl methacrylate), benzyl methacrylate, MS resins, and COP (cycloolefin polymer). The scattering particles kneaded and dispersed into the light guide plate 18 may be formed, for example, of TOSPEARL (trademark), silicone, silica, zirconia, or a derivative polymer. The light guide plate 18 containing the scattering particles is capable of emitting uniform illuminating light through the light exit plane with a greatly reduced level of brightness unevenness. The light guide plate 18 so formed may be manufactured using an extrusion molding method or an injection molding method.

Now, let $\Phi$ be the scattering cross section of scattering particles contained in the light guide plate 18; $L_G$ the length in the incident direction from the first light entrance plane 18d or the second light entrance plane 18e of the light guide plate 18 to a position where the thickness of the light guide plate 18 in the direction perpendicular to the light exit plane 18a is greatest, said incident direction, when expressed otherwise, being the direction parallel to the direction in which light entering the light guide plate travels and perpendicular to the line in which the light exit plane and the light entrance planes, i.e., the first light entrance plane and the second light entrance plane, meet, the length $L_G$ being, in the embodiment under discussion, a half of the length of the light guide plate in the incident direction, which in the embodiment under discussion is the direction perpendicular to the first light entrance plane 18d of the light guide plate 18, as also referred to as "direction of the optical axis" below, or, still otherwise expressed, the length as far as the bisector $\alpha$; $N_p$ the density of the scattering particles contained in the light guide plate 18, said density denoting the number of particles in unit volume; and a compensation coefficient $K_C$. Then the value $\Phi \cdot N_p \cdot L_G \cdot K_C$ is preferably not less than 1.1 and not greater than 8.2; the compensation coefficient $K_C$ is preferably not less than 0.005 and not greater than 0.1. The light guide plate 18, containing scattering particles satisfying the above relation, is capable of emitting uniform illuminating light through the light exit plane 18a with a greatly reduced level of brightness unevenness.

When parallel rays of light are caused to enter an isotropic medium, a transmittance T is generally expressed according to the Lambert-Beer law by the following expression (1):

$$T = I/I_o = \exp(-\rho \cdot x) \tag{1}$$

where x is a distance, $I_o$ an intensity of incident light, I an intensity of outgoing light, and $\rho$ an attenuation constant.

The above attenuation constant $\rho$ can be expressed using the scattering cross section of particles $\Phi$ and the number of particles $N_p$ in unit volume contained in the medium as follows:

$$\rho = \Phi \cdot N_p \tag{2}$$

Accordingly, the light extraction efficiency $E_{out}$ is expressed by the following expression (3) where $L_G$ is the length of the light guide plate in the direction parallel to the direction in which light travels in the light guide plate from the light entrance planes of the light guide plate as far as the thickest position or a half of the length of the light guide plate in the direction of the optical axis. Said half of the length of the light guide plate in the direction of the optical axis denoted by $L_G$ is the length of the light guide plate 18 in the direction perpendicular to the light entrance planes of the light guide plate 18 from one of the light entrance planes of the light guide plate 18 to the center of the light guide plate 18.

The light extraction efficiency $E_{out}$ is a ratio of light reaching the position spaced apart from the light entrance plane of the light guide plate by the length $L_G$ in the direction of the optical axis to the incident light. In the case of the light guide plate 18 illustrated in FIG. 2, for example, the light extraction efficiency $E_{out}$ is a ratio of light reaching the center of the light guide plate or, light traveling half the length of the light guide plate in the direction of the optical axis to the light incident on either end plane.

$$E_{out} \propto \exp(-\Phi \cdot N_p \cdot L_G) \tag{3}$$

The expression (3) applies to a space of limited dimensions. Introducing the compensation coefficient $K_C$ therein to correct the relation with the expression (1), the light extraction efficiency $E_{out}$ is expressed by the following expression (4). The compensation coefficient $K_C$ is a dimensionless compensation coefficient empirically obtained where light propagates through an optical medium of limited dimensions.

$$E_{out} = \exp(-\Phi \cdot N_p \cdot L_G \cdot K_C) \tag{4}$$

According to the expression (4), when $\Phi \cdot N_p \cdot L_G \cdot K_C$ is 3.5, the light extraction efficiency $E_{out}$ is 3%. When $\Phi \cdot N_p \cdot L_G \cdot K_C$ is 4.7, the light extraction efficiency $E_{out}$ is 1%.

The results show that the light extraction efficiency $E_{out}$ decreases as $\Phi \cdot N_p \cdot L_G \cdot K_C$ increases. The light extraction efficiency $E_{out}$ decreases in such a manner presumably because light is scattered increasingly as it travels in the direction of the optical axis of the light guide plate.

It follows, therefore, that the greater the value $\Phi \cdot N_p \cdot L_G \cdot K_C$ is, the more preferable it is as a property for the light guide plate. When $\Phi \cdot N_p \cdot L_G \cdot K_C$ is great, light exiting through a plane opposite the light entrance plane can be reduced whereas light emitted through the light exit plane can be increased. Expressed otherwise, when $\Phi \cdot N_p \cdot L_G \cdot K_C$ is great, the ratio of light emitted through the light exit plane to the light incident on the light entrance planes can be increased. That ratio is also referred to as "light use efficiency" below. Specifically, a light use efficiency as high as 50% or more is achieved when $\Phi \cdot N_p \cdot L_G \cdot K_C$ is 1.1 or greater.

While light emitted through the light exit plane 18a of the light guide plate 18 increasingly exhibits illuminance unevenness as $\Phi \cdot N_p \cdot L_G \cdot K_C$ increases, the illuminance unevenness can be held to under a given, tolerable level by holding the value $\Phi \cdot N_p \cdot L_G \cdot K_C$ to 8.2 or less. Note that illuminance and brightness can be treated substantially equally. Thus, it is assumed that brightness and illuminance possess similar tendencies in the present invention.

Thus, the value $\Phi \cdot N_p \cdot L_G \cdot K_C$ of the inventive light guide plate 18 is preferably not less than 1.1 and not greater than 8.2, and more preferably not less than 2.0 and not greater than 8.0. Still more preferably, the value $\Phi \cdot N_p \cdot L_G \cdot K_C$ is not less than 3.0 and, most preferably, not less than 4.7.

The compensation coefficient $K_C$ is preferably not less than 0.005 and not greater than 0.1, thus $0.005 \leq K_C \leq 0.1$.

Now, the light guide plate 18 will be described in greater detail by referring to specific examples.

A computer simulation was conducted to obtain light use efficiencies for different light guide plates given different values of $\Omega \cdot N_p \cdot L_G \cdot K_C$ by varying the scattering cross section $\Phi$, the particle density $N_p$, the length $L_G$, which is a half of the length of the light guide plate in the direction of the optical axis, and the compensation coefficient $K_C$. Further, illuminance unevenness was evaluated. The illuminance unevenness (%) was defined as $[(I_{Max} - I_{Min})/I_{Ave}] \times 100$, where $I_{Max}$ was a maximum illuminance of light emitted through the light exit plane of the light guide plate, $I_{Min}$ a minimum illuminance, and $I_{Ave}$ an average illuminance.

The measurement results are shown in Table 1. In Table 1, judgments "O" indicate cases where the light use efficiency is 50% or more and the illuminance unevenness is 150% or less whereas judgments "X" indicate cases where the light use efficiency is less than 50% or the illuminance unevenness is more than 150%.

TABLE 1

|  | $\Phi$ [m²] | $N_P$ [pcs/m³] | $L_G$ [m] | $K_C$ | $\Phi \cdot N_P \cdot L_G \cdot K_C$ | Light use efficiency [%] | Illuminance unevenness [%] | Judgment |
| --- | --- | --- | --- | --- | --- | --- | --- | --- |
| Example 1 | $2.0 \times 10^{-12}$ | $2.2 \times 10^{14}$ | 0.3 | 0.03 | 3.51 | 81.6 | 84 | ○ |
| Example 2 | $2.0 \times 10^{-12}$ | $4.3 \times 10^{14}$ | 0.3 | 0.02 | 6.21 | 84.7 | 149 | ○ |
| Example 3 | $2.0 \times 10^{-12}$ | $8.6 \times 10^{14}$ | 0.1 | 0.02 | 3.86 | 82.8 | 82 | ○ |
| Example 4 | $1.1 \times 10^{-10}$ | $1.5 \times 10^{13}$ | 0.3 | 0.008 | 3.91 | 83.0 | 105 | ○ |
| Example 5 | $1.1 \times 10^{-10}$ | $2.0 \times 10^{13}$ | 0.3 | 0.007 | 4.98 | 84.3 | 142 | ○ |
| Example 6 | $1.1 \times 10^{-10}$ | $3.5 \times 10^{13}$ | 0.1 | 0.007 | 2.86 | 79.2 | 47 | ○ |
| Comparative example 1 | $2.0 \times 10^{-12}$ | $2.2 \times 10^{13}$ | 0.3 | 0.05 | 0.66 | 29.1 | 51 | X |
| Comparative example 2 | $1.1 \times 10^{-12}$ | $2.5 \times 10^{12}$ | 0.3 | 0.01 | 0.99 | 43.4 | 59 | X |
| Comparative example 3 | $4.8 \times 10^{-18}$ | $8.6 \times 10^{17}$ | 0.1 | 15.2 | 6.26 | 84.8 | 201 | X |
| Comparative example 4 | $4.8 \times 10^{-18}$ | $1.7 \times 10^{18}$ | 0.1 | 13.9 | 11.5 | 84.9 | 225 | X |

Figure 8:
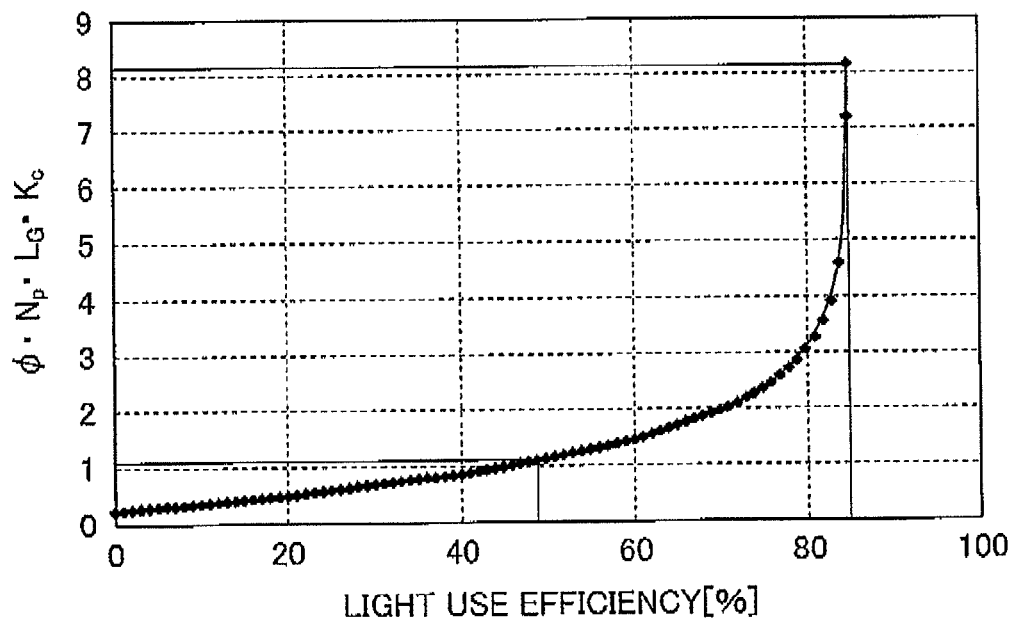
FIG. 8 is a graph illustrating measurements of a relationship between $\Phi \cdot N_p \cdot L_G \cdot K_C$ and light use efficiency.

FIG. 8 illustrates a relation between $\Phi \cdot N_p \cdot L_G \cdot K_C$ and light use efficiency, i.e., the ratio of light emitted through the light exit plane 18a to light incident on the light entrance planes.

Table 1 and FIG. 8 show that given $\Phi \cdot N_p \cdot L_G \cdot K_C$ of 1.1 or more, a high light use efficiency, specifically 50% or more, is achieved whereas given $\Phi \cdot N_p \cdot L_G \cdot K_C$ of 8.2 or less, illuminance unevenness can be held to 150% or less.

It is also shown that given $K_C$ of 0.005 or more, a high light use efficiency is achieved, and given $K_C$ of 0.1 or less, illuminance unevenness observed in light emitted from the light guide plate can be reduced to a low level.

Next, light guide plates varying in particle density $N_p$ of the particles kneaded or dispersed therein were fabricated to measure brightness distributions of light emitted at different positions in the light exit plane of the individual light guide plates. In these examples, the conditions including scattering cross section $\Phi$, length $L_G$, which is a half of the length of the light guide plate in the direction of its optical axis, compensation coefficient $K_C$, and shape of the light guide plate, but excluding particle density $N_p$, were respectively set to fixed values as the measurements were made. In the embodiment under discussion, therefore, the value $\Phi \cdot N_p \cdot L_G \cdot K_C$ changes in proportion as the particle density $N_p$ changes.

Figure 9:
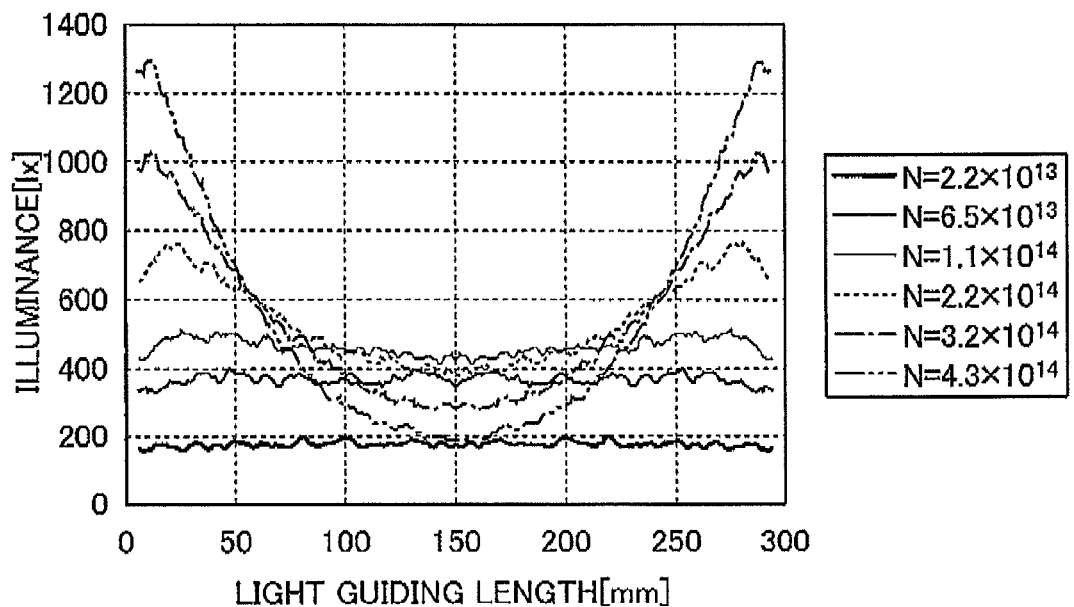
FIG. 9 is a graph illustrating measurements of illuminance of light emitted from different light guide plates having different particle densities.

FIG. 9 shows the measurements of the distribution of illuminance observed in the light emitted through the light exit plane of the individual light guide plates having different particle densities. FIG. 9 shows the illuminance [lx] on the vertical axis plotted against a light guiding length, which is the distance [mm] from one of the light entrance planes of the light guide plate on the horizontal axis.

Illuminance unevenness was calculated from $[(I_{max}-I_{Min})/I_{Ave}]\times 100[\%]$, where $I_{Max}$ is a maximum illuminance in the measured distribution of light emitted from areas of the light exit plane close to the lateral ends thereof, $I_{Min}$ is a minimum illuminance, and $I_{Ave}$ is an average illuminance.

Figure 10:
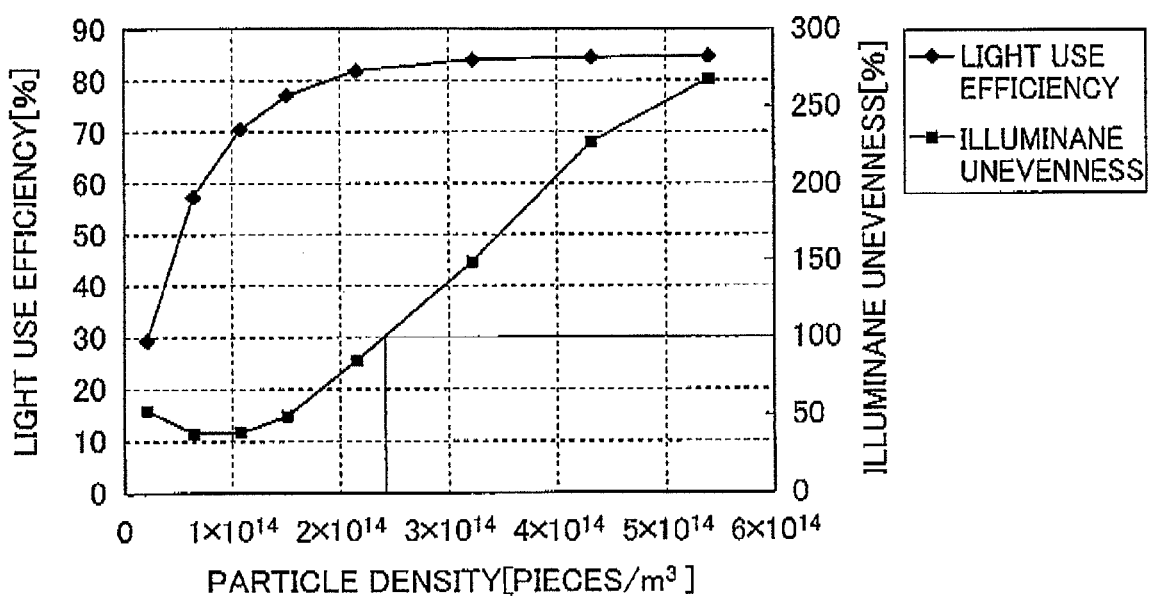
FIG. 10 is a graph illustrating a relationship between light use efficiency and illuminance unevenness on the one hand and particle density on the other.

FIG. 10 illustrates a relation between the calculated illuminance unevenness and particle density. FIG. 10 shows the illuminance unevenness [%] on the vertical axis plotted against the particle density [pieces/m³] on the horizontal axis. Also shown in FIG. 10 is a relation between light use efficiency and particle density, the particle density being likewise indicated on the horizontal axis and the light use efficiency [%] on the vertical axis.

As shown in FIGS. 9 and 10, increasing the particle density or, consequently, increasing $\Phi \cdot N_p \cdot L_G \cdot K_C$, results in an enhanced light use efficiency but then illuminance unevenness also increases. The graphs also show that reducing the particle density or, consequently, reducing $\Phi \cdot N_p \cdot L_G \cdot K_C$, results in lowered light use efficiency but then illuminance unevenness decreases.

$\Phi \cdot N_p \cdot L_G \cdot K_C$ of not less than 1.1 and not greater than 8.2 yields a light use efficiency of 50% or more and illuminance unevenness of 150% or less. Illuminance unevenness, when reduced to 150% or less, is inconspicuous.

Thus, it will be understood that $\Phi \cdot N_p \cdot L_G \cdot K_C$ of not less than 1.1 and not greater than 8.2 yields light use efficiency above a certain level and a reduced illuminance unevenness.

The shape of the light guide plate is not limited to the above shapes and may be any shape, provided that thickness of the light guide plate increases with the increasing distance from either light entrance plane.

For example, prism arrays may be formed on the first inclined plane 18b and the second inclined plane 18c in the direction parallel to the first light entrance plane 18d and the second light entrance plane 18e. Instead of the prism arrays, optical elements similar to prisms may be provided and arranged regularly. For example, elements having lens effects such as lenticular lenses, concave lenses, convex lenses, or optical elements in pyramidal shape may be formed on the inclined planes of the light guide plate.

The shape of the light guide plate is not limited to the shape of the embodiment under discussion. For example, the light guide plate may have a shape obtained by cutting the light guide plate illustrated in FIG. 2 in half, i.e., a shape having only one light entrance plane and growing thicker with the increasing distance from the light entrance plane. According to this alternative, the light entrance plane is constituted by one light entrance plane formed on one side of the light exit plane, whereas the inclined plane is constituted by one inclined plane so inclined as to be farther from the light exit plane with the increasing distance from the light entrance plane toward the opposite end face such that the light guide plate is thinnest at the light entrance plane and thickest at the opposite end face. In another alternative, the four lateral sides of the light guide plate may all be light entrance planes, with light sources each provided adjacent the four sides of the light guide plate, and the thickness of the light guide plate increases from the four light entrance planes toward the center of the light guide plate, thus representing a shape of a quadrangular pyramid on the side opposite from the light exit plane; expressed otherwise, the light entrance plane for this light guide plate is constituted by four light entrance planes formed on the four sides of the light exit plane whereas the inclined plane of this light guide plate is constituted by four inclined planes inclined in such a manner as to be farther from the light exit plane with the increasing distance from the four light entrance planes toward the center such that the light guide plate is thinnest at the light entrance planes and thickest in the position where the four inclined planes meet.

The light guide plate given such a shape is also capable of allowing light to travel a long distance from the light entrance plane, while keeping a thin design. Thus, the light guide plate can be provided with a reduced thickness and a larger light exit plane.

Again, with the light guide plate having the above shape, the value $\Phi \cdot N_p \cdot L_G \cdot K_C$ is preferably in the range of not less than 1.1 and not greater than 8.2 where $L_G$ is the length in the incident direction from the light entrance plane to the position where the thickness of the light guide plate in the direction perpendicular to the light exit plane is thickest. When $\Phi \cdot N_p \cdot L_G \cdot K_C$ satisfies the above range, light with a reduced illuminance unevenness and a high light use efficiency can be emitted through the light exit plane.

Next, the prism sheet 20 will be described.

As illustrated in FIG. 2, one prism sheet 20 is provided between the light guide plate 18 and a diffusion film 22. Thus, the prism sheet 20 is disposed opposite the light exit plane 18a of the light guide plate 18. The prism sheet 20 is an optical member formed by arranging elongate prisms parallel to each other on a transparent sheet. The prism sheet 20 helps condense light emitted through the light exit plane 18a of the light guide plate 18 and thus improve the brightness. The prism sheet 20 is disposed such that the vertexes of the prisms face the light exit plane 18a of the light guide plate 18, or face downward in FIG. 2. Alternatively, a second prism sheet having an identical structure may be placed on the prism sheet 20 such that the prisms of the second prism sheet cross the prisms of the prism sheet 20. Alternatively, the prism sheet may have a configuration such that numerous prisms each with a shape of a triangular pyramid or a quadrangular pyramid are arranged on the surface of a transparent sheet.

Next, the diffusion film 22 will be described.

The diffusion film 22 is provided on the side of the prism sheet 20 opposite from the light guide plate 18. Thus, on the light exit plane 18a of the light guide plate 18 are superposed the prism sheet 20 and the diffusion film 22 in this order from the light exit plane 18a.

The diffusion film 22 is formed of a material in the form of film given a light diffusing property. The material in the form of film may be formed, for example, of an optically transparent resin such as PET (polyethylene terephthalate), PP (polypropylene), PC (polycarbonate), PMMA (polymethyl methacrylate), benzyl methacrylate, MS resin, or COP (cycloolefin polymer).

The method of forming the diffusion film 22 is not limited specifically. For example, a surface of the material in the form of film may be machined to form an asperity thereon or roughened by grinding thereby to provide a light diffusing property. The diffusion film may be alternatively formed by coating its surface with a material that diffuses light as exemplified by silica; pigments such as titanium oxide and zinc oxide; a resin; and beads of glass, zirconia, etc., together with a binder, or by kneading the above pigments or beads having a light diffusing property into the above transparent resin. Materials having a high reflectance and a low light-absorbing property such as metals as exemplified by Ag and Al may also be used to form the diffusion film 22.

In the present invention, a diffusion film of a matte type or a coating type may be used as the diffusion film 22.

While the diffusion film 22 is placed on the prism sheet 20 in the example illustrated in FIG. 2, the position of the diffusion film 22 is not limited specifically; it may also be placed between the light guide plate 18 and the prism sheet 20.

Next, the reflection plate 24 of the main body of the lighting device will be described.

The reflection plate 24 is provided to reflect light leaking through the first inclined plane 18b and the second inclined plane 18c of the light guide plate 18 back into the light guide plate 18 and helps enhance the light use efficiency. The reflection plate 24 is shaped according to the contour of the first inclined plane 18b and the second inclined plane 18c of the light guide plate 18 to cover the first inclined plane 18b and the second inclined plane 18c.

In the embodiment under discussion, the reflection plate 24 is shaped to contour the cross-sectionally triangular shape formed by the first inclined plane 18b and the second inclined plane 18c as illustrated in FIG. 2.

The reflection plate 24 may be formed of any material as desired, provided that it is capable of reflecting light leaking through the inclined planes of the light guide plate 18. The reflection plate 24 may be formed, for example, of a resin sheet produced by kneading, for example, PET or PP (polypropylene) with a filler and then drawing the resultant mixture to form voids therein for increased reflectance; a sheet with a specular surface formed by, for example, depositing aluminum vapor on the surface of a transparent or white resin sheet; a metal foil such as an aluminum foil or a resin sheet carrying a metal foil; or a thin sheet metal having a sufficient reflective property on the surface.

The upper light guide reflection plates 34 are disposed between the light guide plate 18 and the prism sheet 20, i.e., on the side of the light guide plate 18 closer to the light exit plane 18a, covering the light sources 12 and the end portions of the light exit plane 18a, i.e., the end portion thereof closer to the first light entrance plane 18d and the end portion thereof closer to the second light entrance plane 18e. Thus, the upper light guide reflection plates 34 are disposed to cover an area extending from part of the light exit plane 18a of the light guide plate 18 as far as part of the array bases 42 of the light sources 12 in a direction parallel to the direction of the optical axis. Briefly, two upper light guide reflection plates 34 are disposed respectively on both end portions of the light guide plate 18.

The lower light guide reflection plates 36 are disposed on the side of the light guide plate 18 opposite from the light exit plane 18a, i.e., on the same side as the first inclined plane 18b and the second inclined plane 18c, covering part of the light sources 12. The ends of the lower light guide reflection plates 36 closer to the center of the light guide plate 18 are connected to the reflection plate 24.

The upper light guide reflection plates 34 and the lower light guide reflection plates 36 may be formed of any of the above-mentioned materials used to form the reflection plate 24.

The upper light guide reflection plates 34 thus provided prevents light emitted from the light sources 12 from leaking toward the light exit plane 18a instead of entering the light guide plate 18.

Thus, light emitted from the LED chips 40 of the light sources 12 is efficiently admitted through the first light entrance plane 18d and the second light entrance plane 18e of the light guide plate 18, increasing the light use efficiency.

Likewise, the lower light guide reflection plates 36 also prevent light emitted from the light sources 12 from leaking toward the first inclined plane 18b and the second inclined plane 18c of the light guide plate 18 instead of entering the light guide plate 18.

Accordingly, light emitted by the LED chips 40 of the light sources 12 is efficiently admitted through the first light entrance plane 18d and the second light entrance plane 18e of the light guide plate 18, increasing the light use efficiency.

The shapes and the widths of the upper light guide reflection plates 34 and the lower light guide reflection plates 36 are not limited specifically, provided that light emitted by the light sources 12 is reflected and directed toward the first light entrance plane 18d or the second light entrance plane 18e such that light emitted by the light sources 12 can be admitted through the first light entrance plane 18d or the second light entrance plane 18e and then guided toward the center of the light guide plate 18.

Now, the housing 16 will be described.

The housing 16 is provided to accommodate and support the light sources 12 and the main body 14 of the lighting device and basically comprises the housing member 16a and the frame member 16b.

The housing member 16a is open on the upper side and so configured that the main body 14 of the lighting device is placed in the housing member 16a from above to be accommodated and supported therein such that the housing member 16a covers the four lateral faces of the main body 14 of the lighting device. The four lateral faces are each formed into turnup members 26 each having an inverted U shape.

The frame member 16b has a rectangular opening 28 on the upper side thereof smaller than the rectangular light emission plane (opening) 14a of the main body 14 of the lighting device and is open on the underside. The frame member 16b is placed from above the light emission plane 14a of the main body 14 of the lighting device and secured to the housing member 16a so as to cover the main body 14 of the lighting device and the housing member 16a accommodating the main body 14 of the lighting device, including the four lateral faces of the housing member 16a.

The inner faces of the turnup members 26 engage and support the lateral faces of the light guide plate 18, the reflection plate 24, and the light guide plate support members 30 to be described. Further, the outer faces of the turnup members 26 engage the frame member 16b.

The turnup members 26 of the housing member 16a and the frame member 16b may be connected by any known method such as a method using bolts and nuts, a method using bonds, or a method using welding. The housing 16 is configured basically as described above.

The inventive planar lighting device 10 further comprises the light guide plate support members 30 between the housing member 16a and the reflection plate 24. The light guide plate support members 30, formed of a resin such as polycarbonate, are in contact with the housing member 16a and the reflection plate 24.

The housing member 16a is provided on its bottom side with a power supply holder 32 illustrated in FIG. 1 to house a power supply unit, not shown, for the light sources 12.

This is how the inventive planar lighting device 10 is basically configured.

Thus, in the liquid crystal display device 2, where the fluorescent members 17 are provided for the light emission faces 40a of the blue light emitting LED chips 40 of the planar lighting device 10, light emitted by the individual LED chips 40 is transmitted through the fluorescent members 17 and, after being transmitted through the color filter 80, strikes the first light entrance plane 18d or the second light entrance plane 18e of the light guide plate 18, and exits through the light exit plane 18a. Light transmitted through the red filter 82R, the green filter 82G, and the blue filter 82B of the color filter 80 is blended before exiting through the light exit plane 18a of the light guide plate 18 as white light with a high color temperature and excellent color rendering properties.

Further, light emitted through the light exit plane 18a is transmitted through optical members such as the prism sheet 20 and the diffusion film 22 before being emitted through the light emission plane 14a.

Thus, light emitted through the light exit plane 18a of the light guide plate 18 is transmitted through the optical member 20 and emitted through the light emission plane or opening 14a of the main body 14 of the lighting device to illuminate the liquid crystal display panel 4.

In the liquid crystal display panel 4, the drive unit 6 switches the state of the individual liquid crystal cells to selectively allow light to be transmitted through the color filter 80 such that the liquid crystal display panel 4 displays characters, figures, images, etc. on its surface.

The planar lighting device 10 is capable of emitting light having a high color temperature through the light exit plane of the light guide plate, the main body of the lighting device, or the planar lighting device by providing apertures 50 in part of the fluorescent members 17 formed of the fluorescent substance coated area 48 that converts blue light into white light so that part of the blue light emitted through the light emission faces 40a of the LED chips 40 is emitted as blue light. More specifically, the fluorescent member provided between the light entrance planes of the light guide plate, i.e., the first light entrance plane and the second light entrance plane, on the one hand and the light emission faces of the LEDs on the other, has apertures partly formed in the fluorescent member to allow the light emitted by the LEDs passing through the partly formed apertures to pass unchanged as blue light and convert the light transmitted through the fluorescent substance coated area into white light, thereby achieving emission of light having a high color temperature through the light exit plane. Blue light and white light, after being transmitted through the fluorescent member, blend as they are transmitted through the light guide plate.

Thus, the planar lighting device 10, capable of emitting light having a high color temperature through its light exit plane, ensures that the liquid crystal display panel displays images and the like of high quality.

The ratio of white light and blue light obtained through the fluorescent member 17 can be easily adjusted by varying the ratio of the apertures 50 formed in the fluorescent member 17. The color temperature can therefore be adjusted easily. Thus, light having a desired color temperature can be emitted with a simple adjustment through the light exit plane of the light guide plate, the main body of the lighting device, or the planar lighting device. Such adjustment of color temperature is easier than controlling the color temperature by adjusting the thickness of the fluorescent substance coated on the fluorescent member.

The fluorescent member 17 preferably satisfies $0.05 \leq Sap/Sa \leq 0.40$, where Sa is the whole area of the fluorescent member 17 and Sap is the sum of the areas of the apertures 50, i.e., the sum of the blue light passing areas.

When Sap/Sa is 0.05 or greater, a color temperature of 7000 K or higher is obtained and when Sap/Sa is 0.40 or less, a color temperature of 35000 K or lower is obtained.

Now, description will be made in detail referring to some specific examples.

In the specific example now to be described below, the brightness distribution and the color temperature of light emitted through the light emission plane 14a of the planar lighting device 10 were measured, varying the ratio Sap/Sa of the sum Sap of the blue light passing areas to the whole area Sa of the fluorescent member 17. While, in the embodiment under discussion, the variation in color temperature occurring as Sap/Sa was changed was measured by measuring light emitted through the light exit plane of the planar lighting device 10, substantially the same measurements should be obtained when light emitted through the image display surface of the liquid crystal display device is measured.

Figure 11:
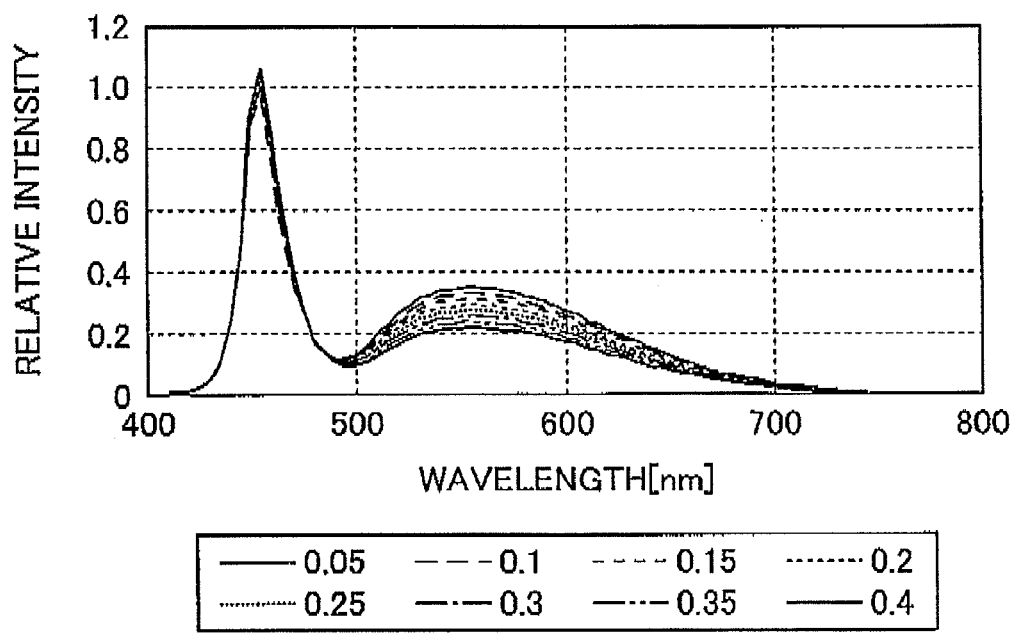
FIG. 11 is a graph illustrating measurements of wavelength distributions observed in light emitted through the light exit plane of the inventive planar lighting device as Sap/Sa was varied.

FIG. 11 is a graph illustrating the measurements of waveform distribution or spectra of light emitted through the light exit plane of the planar lighting device as the ratio of the sum Sap of the blue light passing areas to the whole area Sa of the fluorescent member 17, i.e., Sap/Sa, was varied among 0.05, 0.1, 0.15, 0.2, 0.25, 0.3, 0.35 and 0.4. FIG. 11 indicates the relative intensity on the vertical axis and the wavelength [nm] on the horizontal axis.

Figure 12:
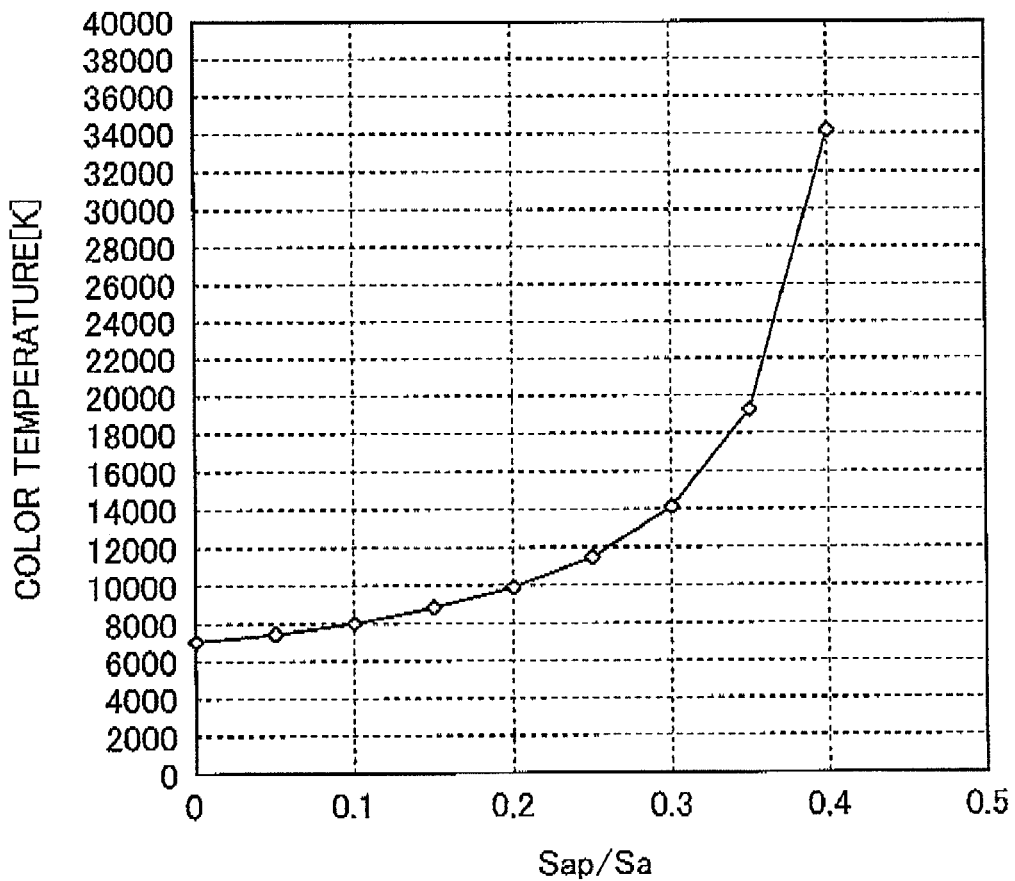
FIG. 12 is a graph illustrating a relationship between the ratio of the sum Sap of the areas of blue light passing areas to the whole area Sa of the fluorescent member on the one hand and the color temperature of light emitted through the light exit plane on the other.

FIG. 12 is a graph illustrating a relation between the ratio Sap/Sa of the sum Sap of the blue light passing areas to the whole area Sa of the fluorescent member 17 on the one hand and the color temperature of the light emitted through the light exit plane on the other. In FIG. 12, the vertical axis indicates the color temperature [K] and the horizontal axis indicates the ratio Sap/Sa of the sum Sap of the blue light passing areas to the whole area Sa of the fluorescent member 17.

FIG. 12 shows that the color temperature of light emitted through the light exit plane can be raised by providing the apertures.

FIG. 12 further shows that various color temperatures can be obtained by changing Sap/Sa. According to the embodiment under discussion, any color temperature in a range of about 7000 K inclusive to 34000 K inclusive can be obtained by adjusting the ratio of the sum of the areas of the apertures to the whole area of the fluorescent member within a range of $0.05 \leq Sap/Sa \leq 0.40$. This means that the color temperature can be adjusted merely by adjusting the dimensions of the apertures.

FIG. 11 also shows that the color tint of the light emitted through the light exit plane can be adjusted by adjusting the ratio of the areas of the apertures to the whole area of the fluorescent member.

The foregoing clearly shows the effects achieved by the present invention.

While, according to the embodiment described above, the fluorescent member is overlaid on the light emission faces 40a of the LED chips 40 of the light sources 12, the present invention is not limited to such configuration. The fluorescent member may be located in any position desired between the light emission faces of the LEDs and the light entrance planes, i.e., the first light entrance plane and the second light entrance plane, of the light guide plate.

Figure 13:
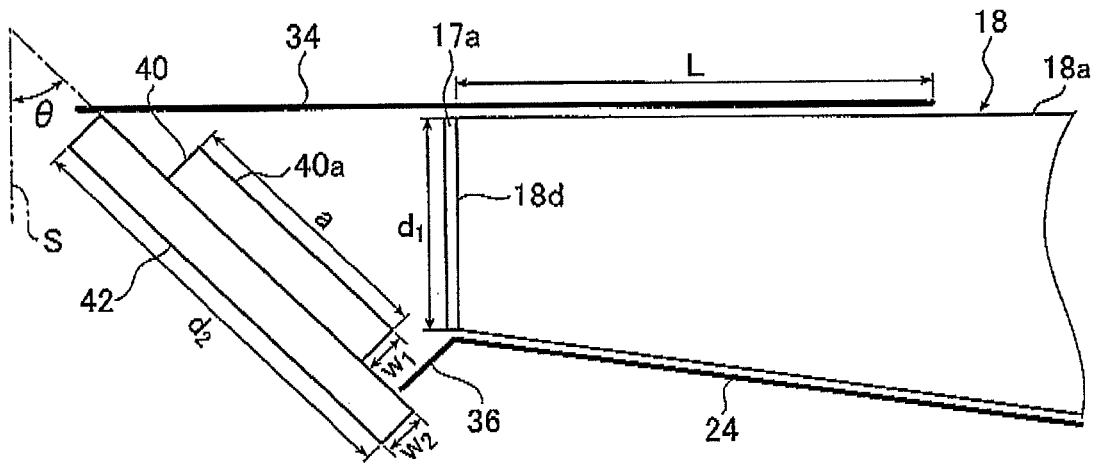
FIG. 13 is a sectional view schematically illustrating a configuration of another embodiment of the planar lighting device used in the present invention.

FIG. 13 is an enlarged sectional view illustrating another embodiment of the planar lighting device used in the inventive liquid crystal display device.

Since the planar lighting device according to the embodiment under discussion is symmetrical with respect to the bisector earlier described, FIG. 13 only illustrates one side of the light guide plate, i.e., the side on which the first light entrance plane 18d is located, omitting the other side, i.e., the side on which the second light entrance plane 18e is located. The side on which the second light entrance plane 18e is located has substantially the same configuration. The same applies to the other examples of the planar lighting device to be described.

In the planar lighting device illustrated in FIG. 13, the fluorescent member 17a is disposed in contact with the first light entrance plane 18d of the light guide plate 18. Thus, the fluorescent member 17a is disposed in such a manner as to cover the whole area of the first light entrance plane of the light guide plate 18 through which light is admitted.

The fluorescent member 17a preferably has a larger area than or the same area as the first light entrance plane 18d. The fluorescent member 17a having an area equal to or larger than the first light entrance plane 18d prevents light emitted by the LED chips 40 from entering the first light entrance plane 18d of the light guide plate 18 without passing through the fluorescent member 17a.

Where the fluorescent member 17a is provided directly on the first light entrance plane 18d of the light guide plate 18 as illustrated in FIG. 13, the fluorescent member 17a may be provided by directly applying the fluorescent substance to the first light entrance plane 18d of the light guide plate 18 to form the fluorescent substance coated area and the apertures without using the transparent sheet.

While the apertures 50 of the fluorescent member 17 of the embodiment under discussion are rectangular, the apertures 50 may have various other shapes as well.

Figure 14A:
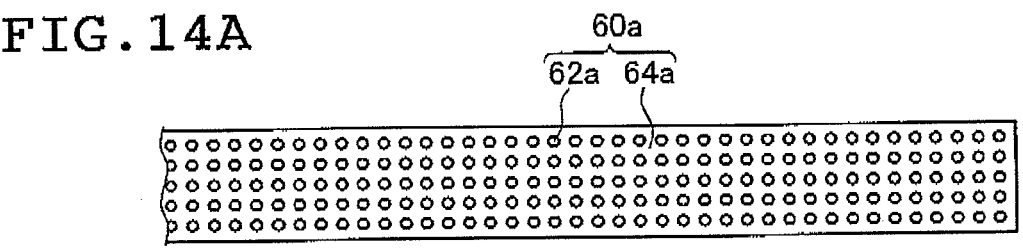
FIGS. 14A to 14C are front views illustrating other examples of the fluorescent member.
Figure 14B:
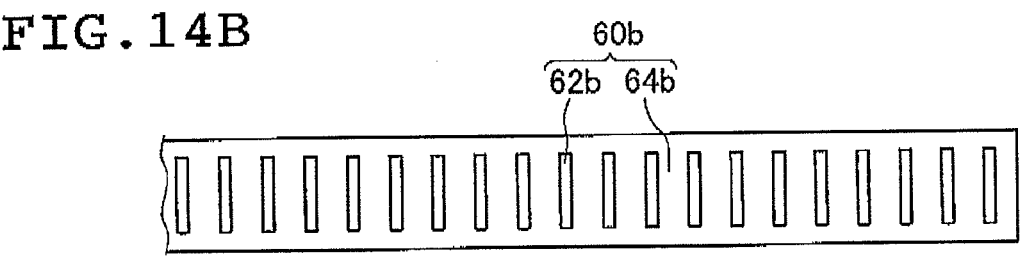
Figure 14C:
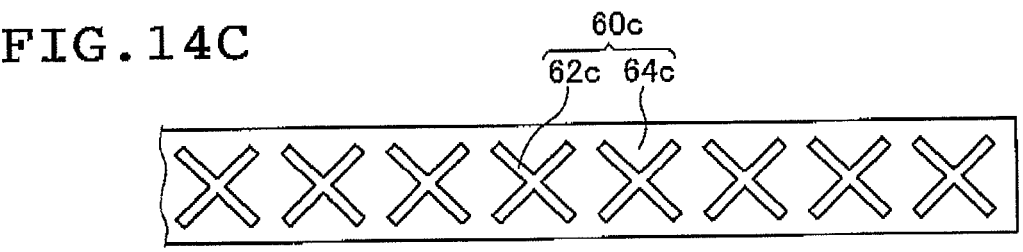

FIGS. 14A to 14C illustrate other examples of the fluorescent member.

For example, circular apertures 62a may be formed in a fluorescent member 60a, the other part of the fluorescent member 60a than the apertures 62a being a fluorescent substance coated area 64a, as illustrated in FIG. 14A. The apertures need not necessarily be circular and may be, for example, elliptical, polygonal, or shaped like a star.

Alternatively, bar-shaped apertures 62b may be formed in a fluorescent member 60b so as to be parallel to one side of the light emission face and provided at regular intervals, the other part of the fluorescent member 60b than the apertures 62b being a fluorescent substance coated area 64b, as illustrated in FIG. 14B.

In yet another example, X-shaped apertures 62c may be formed in a fluorescent member 60c, the other part of the fluorescent member 60c than the apertures 62c being a fluorescent substance coated area 64c, as illustrated in FIG. 14C.

Thus, while the shape of the apertures is not limited specifically, a plurality of apertures are preferably provided for the light emission face of each LED chip. Providing a plurality of apertures for the light emission face of each LED chip makes it easier to blend blue light and white light produced as light emitted by the LED chip is transmitted through the fluorescent member. Thus, light free from uneven coloration or with a reduced level of uneven coloration and with a high color temperature can be emitted through the light exit plane.

Each aperture preferably has an area measuring not smaller than 0.1 mm$^2$ and not greater than 0.5 mm$^2$. Apertures each having an area of not smaller than 0.1 mm$^2$ ensure formation of apertures in the fluorescent member and emission of blue light through the apertures. Apertures each having an area measuring not greater than 0.5 mm$^2$ ensures that light transmitted through the fluorescent member is blended efficiently and surely and that light free from uneven coloration or with a reduced level of uneven coloration and with a high color temperature can be emitted through the light exit plane.

While, according to the embodiment under discussion, apertures are formed in part of the fluorescent member to provide the blue light passing areas through which blue light is passed unchanged as blue light, the present invention is not limited to such configuration. The fluorescent substance may be selectively applied to the transparent sheet in such a manner as to form a fluorescent substance coated area coated with the fluorescent substance and transparent areas without coating of the fluorescent substance, the transparent areas providing the blue light passing areas for passing blue light unchanged as blue light.

While, according to the embodiment described above, one common sheet of the fluorescent member 17a is provided to cover the LED chips, the present invention is not limited to such configuration. An individual, separate piece of the fluorescent member may be provided for each light emission face of the LED chip.

Figure 15A:
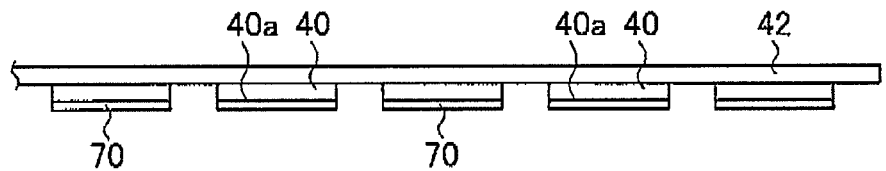
FIGS. 15A to 15C illustrate part of another example of the fluorescent member and the light source.
Figure 15B:
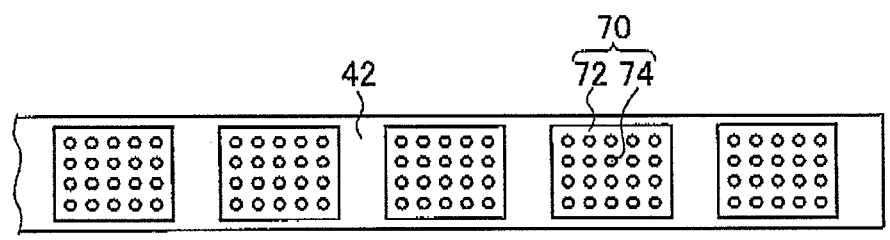
Figure 15C:
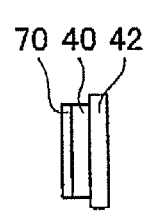

FIGS. 15A to 15C illustrate part of another example of the fluorescent member and the light source of the planar lighting device: FIG. 15A is a top plan view, FIG. 15B is a front view, and FIG. 15C is an elevation.

Each fluorescent member 70 illustrated in FIGS. 15A to 15C is provided separately for each LED chip 40, in contact with the light emission face 40a of each LED chip 40. In the embodiment under discussion, each fluorescent member 70 is bonded to the corresponding light emission face 40a.

The fluorescent member 70 comprises a fluorescent substance coated area 72 and apertures 74 and is so provided as to cover the whole light emission face 40a of the LED chip 40. The fluorescent member 70 comprises the fluorescent substance coated area 72 formed of applied fluorescent substance and the apertures 74, circular apertures each having a given diameter and provided at regular intervals. That is, the fluorescent member 70, like the foregoing examples, comprises the fluorescent substance coated area 72, or an area through which blue color emitted by the LED chip 40 is converted into white light, and blue light passing areas, i.e., apertures through which blue light is passed unchanged as blue light.

When the fluorescent member 70 is so disposed as to cover the whole light emission face 40a of the LED chip 40, light emitted from the light emission face 40a is transmitted or passed through the fluorescent substance coated area 72 or the apertures 74 of the fluorescent member 70 even with the configuration in which the fluorescent member 70 is separately provided for each LED chip 40 as described above.

Figure 16A:
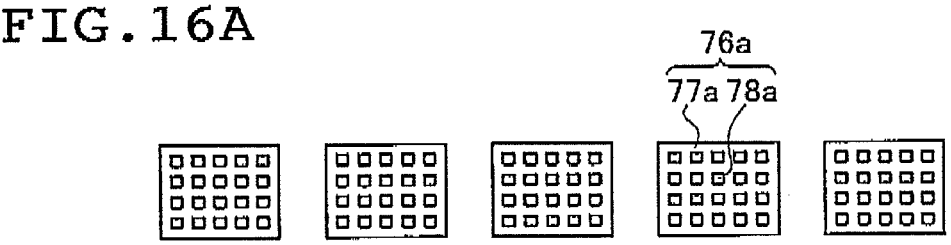
FIGS. 16A to 16C are front views of other examples of the fluorescent member.

Thus, as with the foregoing examples, part of light emitted from the LED chips 40 can be admitted into the light guide plate as blue light and light having a high color temperature can be emitted through the light exit plane with a simple configuration.

Where the fluorescent member is separately provided for each LED chip, the shape of the apertures is also not limited specifically. The apertures 74 may each be circular as illustrated in FIG. 15B, or apertures 78a formed in a fluorescent member 76a may be rectangular as illustrated in FIG. 16A. In the fluorescent member 76a, the area of the surface thereof other than a plurality of apertures 78a is a fluorescent substance coated area 77a.

Figure 16B:
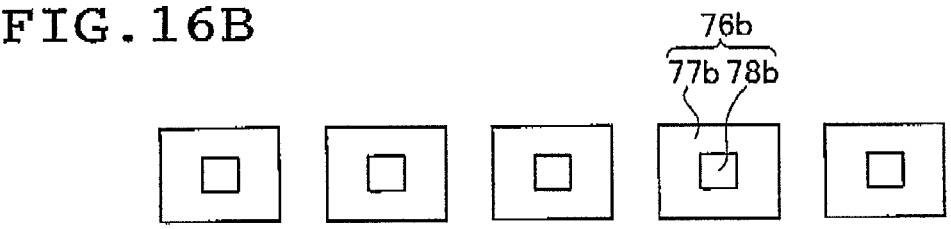
Figure 16C:
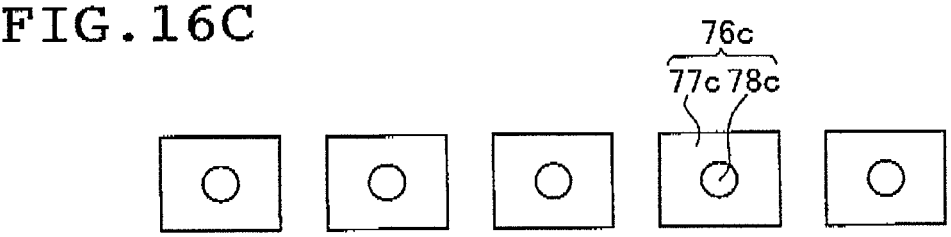

While a plurality of apertures are preferably provided for the light emission face 40a of each LED chip 40 because then the fluorescent member is capable of efficiently blending the colors of emitted light and allows light free from uneven coloration to be emitted through the light exit plane, a single aperture 78b may be provided for each light emission face 40a, as illustrated in FIG. 16B. That is to say, one aperture 78b, centrally located in the illustrated example, may be provided per one fluorescent member 76b. The shape of the apertures is also not specifically limited in this case: while FIG. 16B illustrates an example where the apertures 78b are rectangular, apertures 78c of a fluorescent member 76c are circular as illustrated in FIG. 16C. Other possible alternative shapes include an ellipse, a star-like shape, a polygon and a shape comparable to the letter X. In the fluorescent member 76b as illustrated in FIG. 16B, the peripheral area of the surface thereof other than the one apertures 78b is a fluorescent substance coated area 77b; in the fluorescent member 76c as illustrated in FIG. 16C, the peripheral area of the surface thereof other than the one apertures 78c is a fluorescent substance coated area 77c.

Where the fluorescent member 70 is provided in contact with the light emission face of the LED as in the embodiment under discussion, the fluorescent substance may be applied directly onto the light emission face to form the fluorescent substance coated area and the apertures.

This configuration not only prevents misalignment or dislocation of the fluorescent member 70 but also reduces the number of components required because the fluorescent member is formed without using the transparent sheet, thus simplifying the configuration of the device.

The color filter 80 of the liquid crystal display panel 4 is preferably such that the difference between a wavelength at which the spectral transmittance of the blue filter 82B peaks and a wavelength at which the intensity of light emitted by the LED 40 peaks in the emission spectrum, i.e., the major peak wavelength in the wavelength spectrum of light emitted by the LED 40 of the light source 12, is 20 nm or less, and that $0 \leq P_{BG} \leq 0.5$ and $60 \leq W_B \leq 100$ hold, where $P_{BG}$ denotes a spectral transmittance at a wavelength at which the spectral transmittance of the blue filter 82B and the spectral transmittance of the green filter 82G coincide, i.e., a spectral transmittance corresponding to the intersection of transmittance characteristics $T_B(\lambda)$ of the blue filter 82B and transmittance characteristics $T_G(\lambda)$ of the green filter 82G, whereas $W_B$ denotes a full-width at half-maximum [nm] of the spectral transmittance of the blue filter 82B. The term full-width at half-maximum herein is a value determined by the wavelength dependence of the transmittance of the color filter and denotes a wavelength range between the points where the intensity is half of the maximum.

Thus, when the wavelength at which the spectral transmittance of the blue filter of the color filter peaks, $P_{BG}$, and $W_B$ satisfy the above ranges, it is made possible to prevent lowering of color saturation of images or the like displayed on the display surface of the liquid crystal display device, i.e., the liquid crystal display panel, ensure increased color reproducibility and, moreover, enhance light use efficiency.

Alternatively, the color filter 80 is preferably such that the difference between a wavelength at which the spectral transmittance of the blue filter 82B peaks and a wavelength at which the intensity of light emitted by the LED 40 peaks in the emission spectrum is 20 nm or less, and that $0 \leq P_{GR} \leq 0.2$ and $60 \leq W_G \leq 100$ hold, where $P_{GR}$ denotes a spectral transmittance at a wavelength at which the spectral transmittance of the green filter 82G and the spectral transmittance of the red filter 82R coincide, i.e., a spectral transmittance corresponding to an intersection of the transmittance characteristics $T_G(\lambda)$ of the green filter 82G and transmittance characteristics $T_R(\lambda)$ of the red filter 82R, whereas $W_G$ denotes a full-width at half-maximum [nm] of the spectral transmittance of the green filter 82G.

Thus, when the wavelength at which the spectral transmittance of the blue filter of the color filter peaks, $P_{GR}$ and $W_G$ satisfy the above ranges, it is made possible to prevent lowering of color saturation of images and the like displayed on the display surface of the liquid crystal display device, i.e., the liquid crystal display panel, ensure increased color reproducibility and, moreover, enhance light use efficiency.

More preferably, the difference between the wavelength at which the spectral transmittance of the blue filter 82B peaks and the wavelength at which the intensity of light emitted by the LED 40 peaks in the emission spectrum is 20 nm or less, and $P_{BG}$, $W_B$, $P_{GR}$, and $W_G$ satisfy all of $0 \leq P_{BG} \leq 0.5$, $60 \leq W_B \leq 100$, $0 \leq P_{GR} \leq 0.2$ and $60 \leq W_G \leq 100$.

Thus, when the color filter satisfies the above ranges, it is made possible to prevent lowering of color saturation of images and the like displayed on the display surface of the liquid crystal display device, i.e., the liquid crystal display panel, ensure increased color reproducibility and, moreover, enhance light use efficiency.

Figure 17:
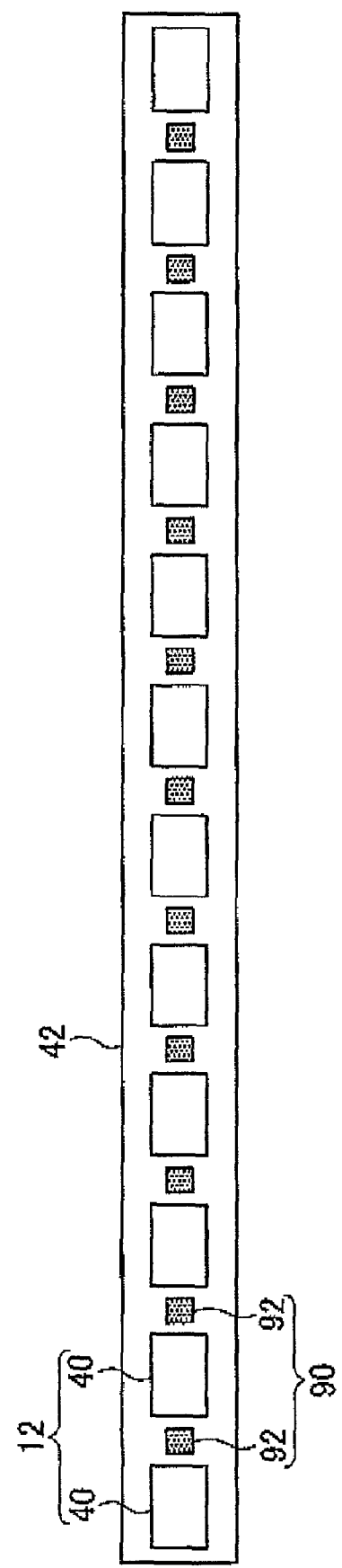
FIG. 17 is a front view schematically illustrating a light source and an auxiliary light source.

The planar lighting device used in the present invention preferably has an auxiliary light source adjacent the light source. FIG. 17 is a front view schematically illustrating a configuration of the light source and the auxiliary light source.

An auxiliary light source 90 comprises auxiliary LED chips 92, each of which is placed near the adjacent LED chips 40 of the light source 12. Thus, the LED chips 40 and the auxiliary LED chips 92 are arranged alternately on the surface of the array base 42 facing the light guide plate 18. The auxiliary LED chips 92 are carried by the array base 42.

The auxiliary LED chips 92 may be formed with LEDs of various colors such as red LEDs for emitting red light, green LEDs for emitting green light, and blue LEDs for emitting blue light. In the present invention, red light denotes light having an emission spectrum of which the intensity peaks in a wavelength range of 600 nm inclusive to 700 nm inclusive; green light denotes light having an emission spectrum of which the intensity peaks in a wavelength range of 500 nm inclusive to 580 nm inclusive.

Thus, color reproducibility of light emitted through the light exit plane can be increased also by providing the auxiliary light source and emitting light therefrom.

Light emitted by the auxiliary light source preferably has a different wavelength from light emitted by the light source. Thus, color reproducibility of light emitted from the main body of the lighting device can be increased by causing the auxiliary light source to emit light having a different wavelength from light emitted by the light source.

While various LEDs may be used to provide the auxiliary LED chips, the auxiliary LED chips are preferably formed using LED chips that emits light having a peak wavelength, i.e., a maximum wavelength or a center wavelength in a range of 380 nm inclusive to 780 nm inclusive, i.e., a visible light range, and having a full-width at half-maximum in a range of 5 nm inclusive to 20 nm inclusive. When LED chips satisfying the above ranges are used, color reproducibility of emitted light can be efficiently increased.

Further, one auxiliary LED chip 90 need not necessarily be provided for one LED chip 40: two or more auxiliary LED chips 92 may be provided for one LED chip 40 or, conversely, one auxiliary LED chip 92 may be provided for two or more LED chips 40.

Where two or more auxiliary LED chips are provided, auxiliary LED chips of one kind emitting light having a same wavelength spectrum may be used or auxiliary LED chips of different kinds emitting different light, or emitting light having different wavelength spectra may be used. For example, the red LEDs and the green LEDs mentioned above may be used to form the auxiliary light source.

Let the amount of light emitted by the LED chips of the light source be lm and the amount of light emitted by the auxiliary LED chips of the auxiliary light source be ls, then $0.05 \leq ls/lm \leq 0.5$ preferably holds.

When ls/lm is in the above range, light emitted by the auxiliary light source does not cause color unevenness in the light emitted through the light exit plane. Thus, a high light reproducibility is achieved. Adjustment, moreover, can be thereby simplified.

Where the auxiliary light source is provided, the fluorescent member 70 is preferably provided separately for each LED chip 40 (see FIG. 15).

Where the fluorescent member is provided separately for each LED chip, light emitted by the auxiliary light source directly strikes the light entrance plane of the light guide plate. This enhances light use efficiency.

The color filter may be separately provided for each light emission face of the LED chips of the light source and the LED chips of the auxiliary light source.

Now, the color filter that may be suitably used in the present invention will be described in more detail below referring to specific embodiments.

A color filter B0 and a color filter B2 were used as the blue filter 82B.

First, the spectral transmittance intensity was measured in a case where a color filter G0 was used as the blue filter 82G and in another case where a color filter G2 was used as the blue filter 82G. The color filter G0 has a spectral transmittance peaking at a wavelength of 460 nm and the color filter G2 has a spectral transmittance peaking at a wavelength of 435 nm. The light source used was an LED chip that emits light of which the intensity peaks at a wavelength of 440 nm, i.e., an LED chip having an emission spectrum of which the intensity peaks at that wavelength.

Figure 18A:
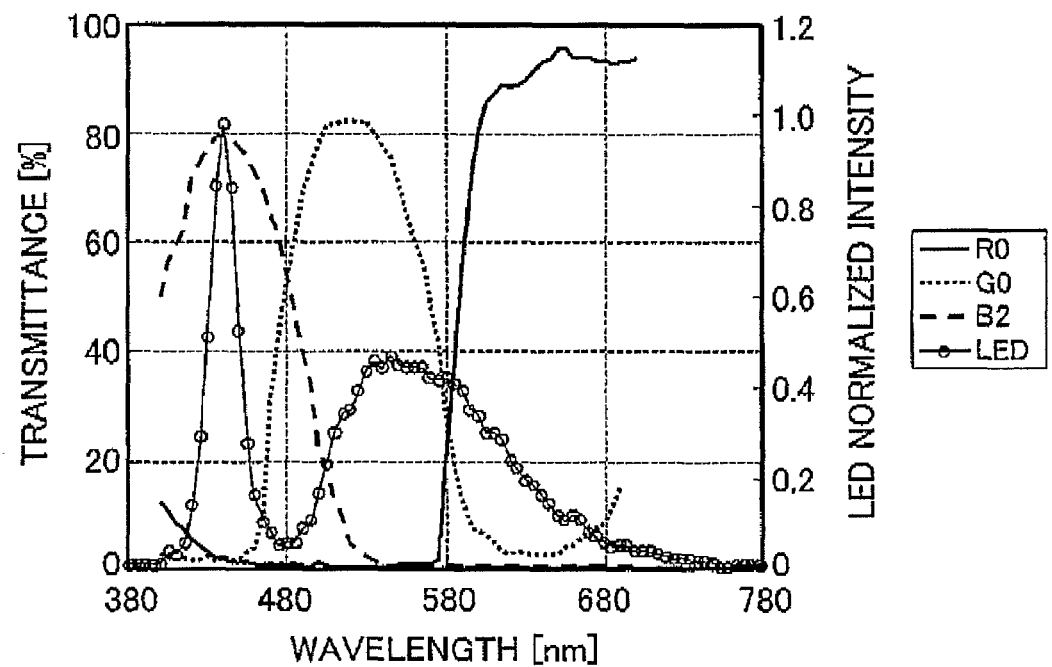
FIGS. 18A and 18B are graphs each illustrating examples of the color filters.
Figure 18B:
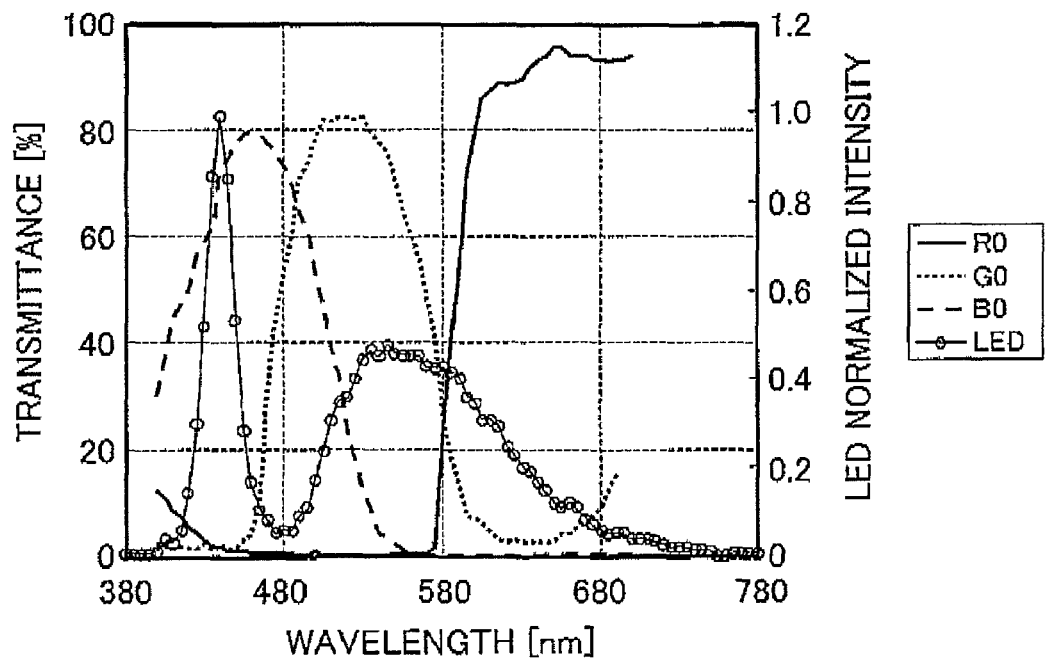

FIGS. 18A and 18B are graphs illustrating examples of color filter characteristics. FIGS. 18A and 18B indicate transmittance [%] on the vertical axis and wavelength [nm] on the horizontal axis.

Where the filter used as the blue filter 82B has transmittance characteristics as illustrated in FIG. 18A such that the difference between a wavelength at which the spectral transmittance peaks, i.e., a wavelength at which the spectral transmittance is highest, and a wavelength at which the emission spectrum of light emitted by the LED 40 of the light source 12 peaks is significantly small 5 nm, then the wavelength of the blue filter 82B at which the spectral transmittance peaks is different from the wavelength at which the intensity of light emitted by the LED 40 peaks in the emission spectrum. In other words, a higher light use efficiency and a higher color reproducibility are achieved than where a filter having transmittance characteristics peaking at a wavelength different by 20 nm from the peak length of light emitted by the LED 40. Further, even where the difference in peak wavelength amounts to 20 nm, a light use efficiency above a certain level achieving an improvement over the prior art is secured and a color reproducibility above a certain level achieving an improvement over the prior art is secured as well.

Specifically, the NTSC (National Television System Commitee) rate was 64% with a liquid crystal display device using the color filter of FIG. 18B, whereas the NTSC rate was 64% with a liquid crystal display device using the color filter having a same configuration as that of which the characteristics are illustrated in FIG. 18A except that a filter having a same peak wavelength as that at which the intensity of light emitted by the LED 40 peaks in the emission spectrum was used for the blue filter 82B. Thus, a high color reproducibility and a high light use efficiency are achieved where the difference between a wavelength at which the spectral transmittance peaks and a wavelength at which the intensity of the light emitted by the LED 40 peaks in the emission spectrum is held to within 20 nm or where, more preferably, both of these peak wavelengths coincide.

Next, the color temperature and the NTSC rate of the light emitted through the light exit plane of the liquid crystal display device were measured by varying the light source configuration, the color filter configuration, and the auxiliary light source.

Figure 19A:
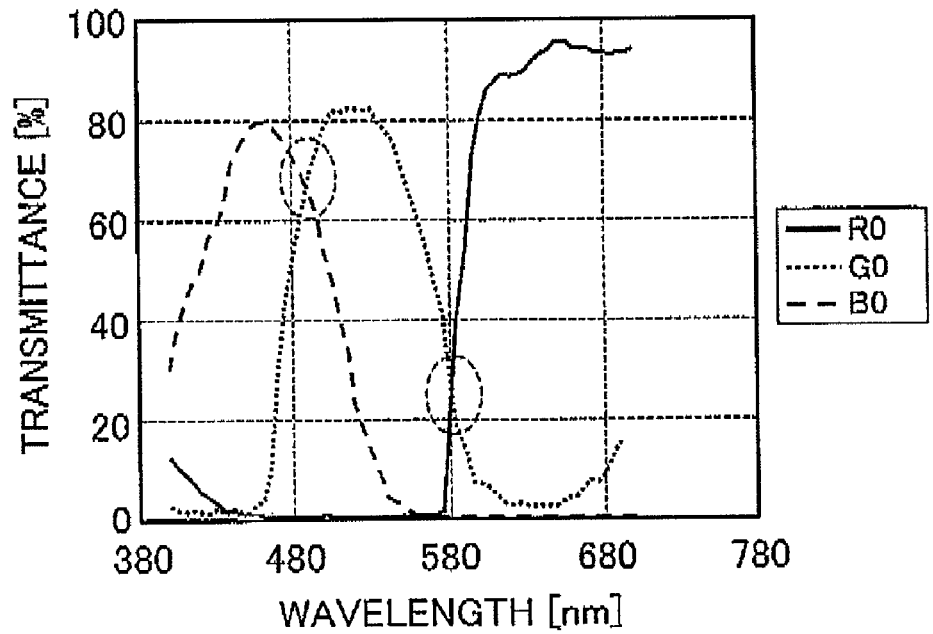
FIGS. 19A and 19D illustrate spectral transmittances of filters for different colors.
Figure 19B:
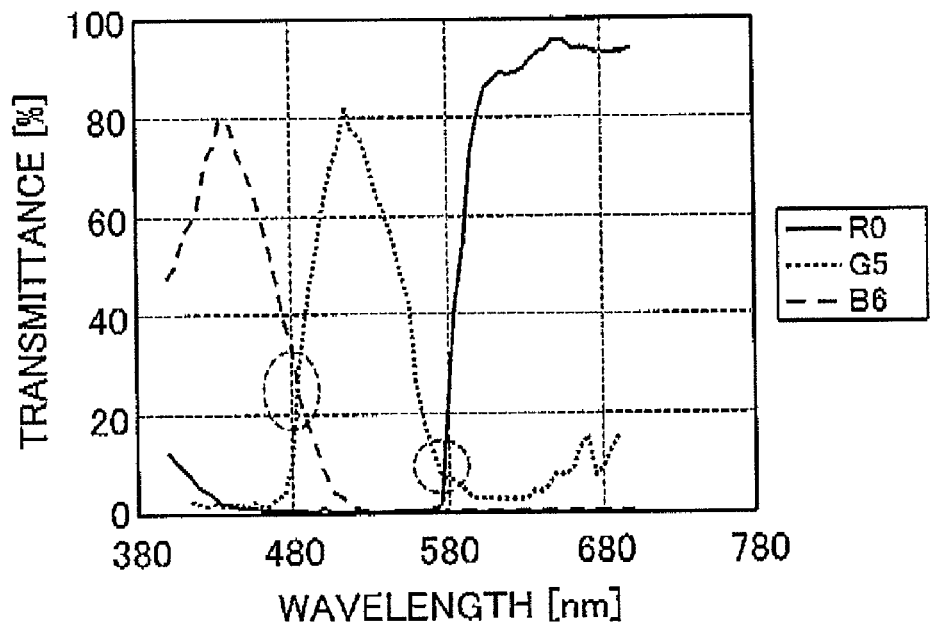
Figure 21:
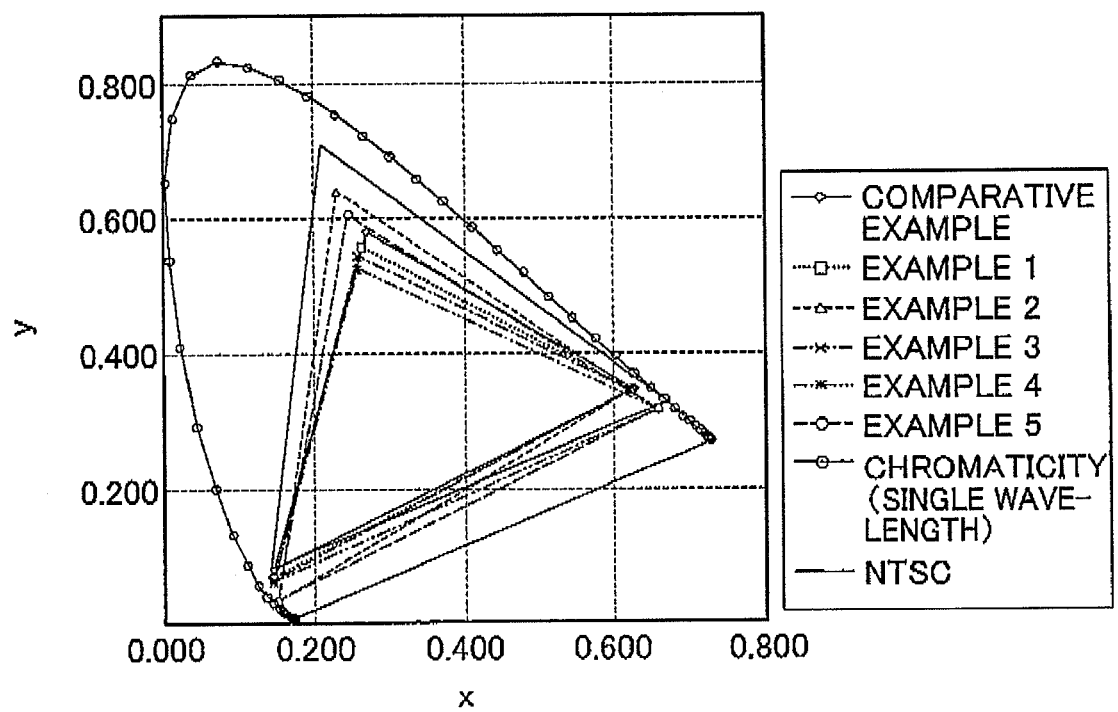
FIG. 21 is a graph illustrating the points of the three primary colors of light emitted through the light exit plane of the planar lighting device in a chromaticity diagram according to the CIEXYZ calorimetric system.

FIGS. 19A and 19B illustrates individual spectral transmittances of the filters for different colors forming the color filter used in the embodiment under discussion. FIG. 19A illustrates transmittance distributions where a filter R0 is used as the red filter 82R, a filter G0 as the green filter 82G, and a filter B0 as the blue filter 82B in the color filter 80. FIG. 19B illustrates transmittance distributions where a filter R0 is used as the red filter 82R of the color filter, a filter G5 as the green filter 82G, and a filter B6 as the blue filter 82B. FIGS. 19A and 19B indicate transmittance [%] on the vertical axis and wavelength [nm] on the horizontal axis.

tal display device shown in Table 2 in a chromaticity diagram with a viewing angle of 2° according to the CIEXYZ colorimetric system. In FIG. 21, the vertical axis is the y axis according to the CIEXYZ calorimetric system and the horizontal axis is the x axis according to the CIEXYZ calorimetric system. FIG. 21 also shows the points of the three primary colors according to the NTSC system for comparison.

TABLE 2

|  | Sap/Sa | Auxiliary light source | Color filter conditions | R x | R y | G x | G y | B x | B y |
|---|---|---|---|---|---|---|---|---|---|
| Example 1 | 0.2 | None | R0/G0/B0 | 0.624 | 0.348 | 0.262 | 0.599 | 0.144 | 0.069 |
| Example 2 | 0.2 | None | R0/G5/B6 | 0.624 | 0.348 | 0.229 | 0.64 | 0.151 | 0.033 |
| Example 3 | 0.3 | None | R0/G0/B0 | 0.621 | 0.346 | 0.257 | 0.544 | 0.144 | 0.064 |
| Example 4 | 0.4 | Red (650 nm) | R0/G0/B0 | 0.659 | 0.318 | 0.257 | 0.525 | 0.144 | 0.061 |
| Example 5 | 0.4 | Red (650 nm) | R0/G5/B6 | 0.659 | 0.318 | 0.245 | 0.607 | 0.151 | 0.032 |
| Comparative example | 0 | None | R0/G0/B0 | 0.628 | 0.35 | 0.269 | 0.582 | 0.144 | 0.079 |

In the color filter using the filters R0, G0 and B0, $P_{BG}=0.65$, $P_{GR}=0.27$, $W_B=75$, and $W_G=65$ as illustrated in FIG. 19A. In the color filter using the filters R0, G5 and B6, on the other hand, $P_{BG}=0.23$, $P_{GR}=0.07$, $W_B=105$, and $W_G=100$ as illustrated in FIG. 19B.

Expressed otherwise, the color filter of which the measurements are illustrated in FIG. 19A is outside the above preferable ranges for the color filter, whereas the color filter of which the measurements are illustrated in FIG. 19B satisfies the above preferable ranges for the color filter.

Figure 20A:
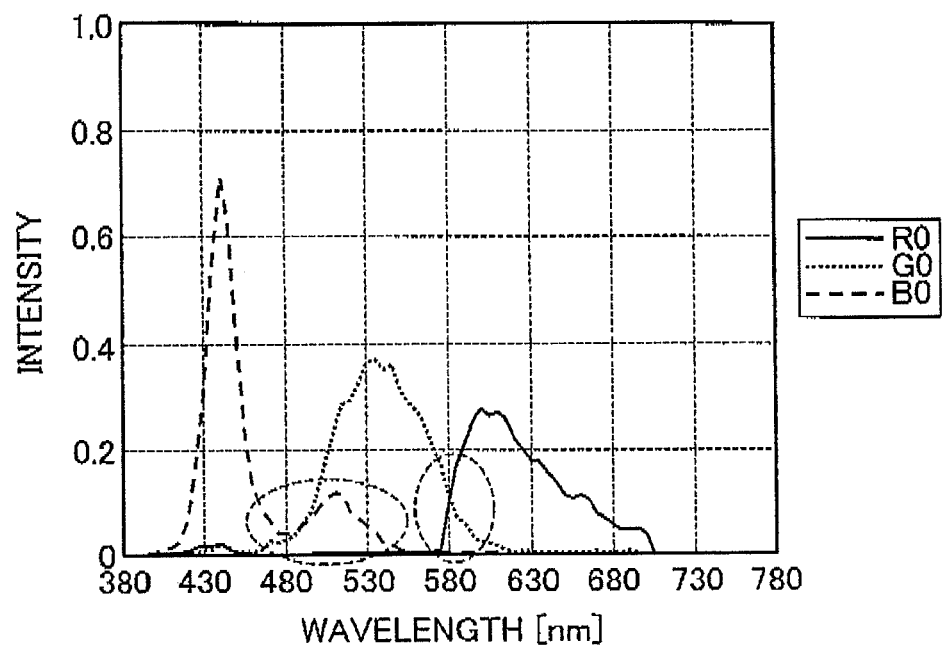
FIGS. 20A and 20B are graphs illustrating wavelength dependences of Light transmitted through the color filters of FIGS. 19A and 19B.
Figure 20B:
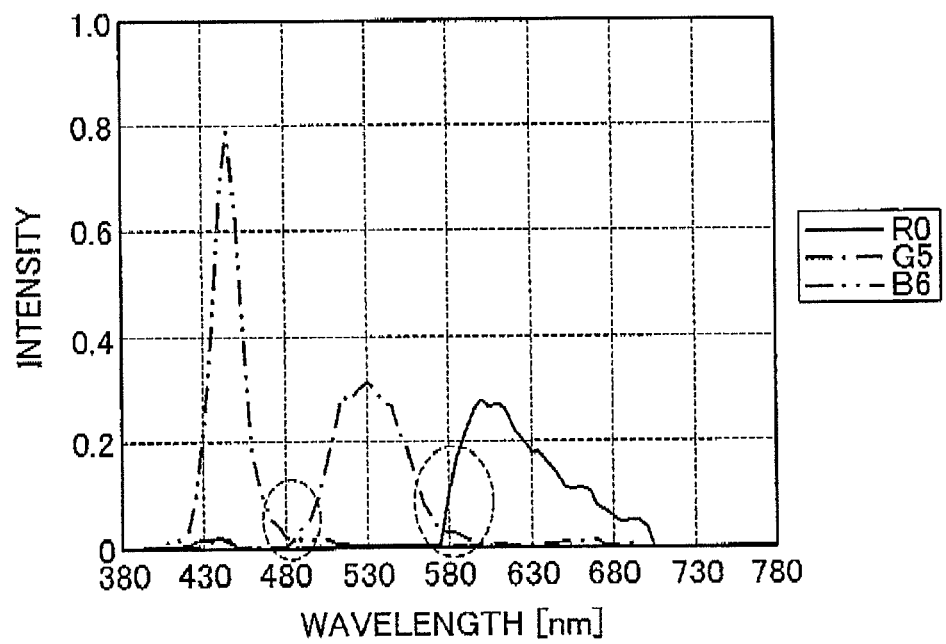

FIGS. 20A and 20B are graphs illustrating the wavelength dependences of light transmitted through the color filters of FIGS. 19A and 19B. FIGS. 20A and 20B indicate relative intensity of the transmitted light on the vertical axis and wavelength [nm] on the horizontal axis.

As illustrated in FIG. 20A, light transmitted through the color filter failing to satisfy the above preferred ranges is transmitted over a wide wavelength range through both the blue filter and the green filter and also through both the green filter and the red filter and, in addition, light transmitted through both filters has an increased or high intensity in these wavelength ranges where light is each transmitted through both color filters, thus lowering the color saturation of light emitted through the light exit plane. In contrast, light transmitted through the filters satisfying the above preferred ranges is transmitted, as illustrated in FIG. 20B, through more than one filter within a narrow wavelength range and, moreover, light transmitted through one of the two filters relatively has a low intensity in a wavelength range where both filters transmit light. This, as will be understood, prevents all of two or more kinds of filters from emitting light with a high intensity in a given wavelength range and, instead, light with a high color saturation can be emitted.

Now, Tables 2 and 3 show conditions, measurements, and calculations obtained from the measurements. Also shown as a comparative example are conditions, measurements, and calculations obtained from the measurements with a liquid crystal display device having no apertures in the fluorescent member and no auxiliary light source and provided with a color filter failing to satisfy the above preferred ranges for the color filters.

FIG. 21 is a graph illustrating the points of the three primary colors of light emitted through the light exit plane of the embodiments and the comparative example of the liquid crys-

TABLE 3

|  | Color temperature [K] | $P_{BG}$ | $W_B$ | $P_{GR}$ | $W_G$ | Area | NTSC rate | Judgment |
|---|---|---|---|---|---|---|---|---|
| Example 1 | 9906 | 0.65 | 105 | 0.27 | 100 | 0.101 | 64% | Passable |
| Example 2 | 9906 | 0.65 | 105 | 0.27 | 100 | 0.131 | 83% | Excellent |
| Example 3 | 14144 | 0.23 | 75 | 0.07 | 65 | 0.099 | 62% | Passable |
| Example 4 | 9974 | 0.65 | 105 | 0.27 | 100 | 0.105 | 66% | Good |
| Example 5 | 9974 | 0.23 | 75 | 0.07 | 65 | 0.133 | 84% | Excellent |
| Comparative example | 6973 | 0.65 | 100 | 0.27 | 100 | 0.105 | 66% | Bad |

As is apparent from FIG. 21 and Tables 2 and 3, the color temperature can be greatly increased in Examples 1 and 3 by forming the apertures in the fluorescent member, although the NTSC rate slightly decreases as compared with the comparative examples, where no apertures are formed. It will also be understood that the color temperature can be increased to a still greater extent in Example 3 by adjusting Sap/Sa as compared with Example 1.

Further, a great increase in NTSC rate is achieved in Example 2 by adjusting the color filter such that $P_{BG}$, $P_{GR}$, $W_S$, and $W_G$ fall within the above preferred ranges as compared with Examples 1 and 3 and the comparative examples, where such color filter adjustments are not made. Briefly, it will be seen that Example 2 achieves an increased color temperature and an increased color reproducibility over the comparative examples.

Further, it is also apparent that in Example 4, the color temperature can be increased a great deal over the comparative examples without reducing the NTSC rate by forming apertures in the fluorescent member and providing the auxiliary light source.

In Example 5, both the color temperature and the NTSC rate can be increased a great deal over the comparative examples by forming the apertures in the fluorescent member, adjusting the color filter such that $P_{BG}$, $P_{GR}$, $W_B$, and $W_G$ fall within the above preferred ranges and providing the auxiliary light source.

The foregoing clearly shows the effects achieved by the present invention.

Now, referring to FIGS. 2 and 5, the LED chips 40 and the array bases 42 of the light sources 12 of the planar lighting device 10 of the liquid crystal display device 2 according to the embodiment under discussion are tilted a given angle θ with respect to a plane S (hereinafter referred to also as "reference plane S") that is perpendicular to the light exit plane 18a of the light guide plate 18 and parallel to the longer sides of the first light entrance plane 18d or the second light entrance plane 18e. Specifically, the light emission faces 40a of the LED chips 40 are tilted by the angle θ with respect to the reference plane S. Expressed otherwise, the light emission faces 40a are disposed in a position reached by rotating the light emission faces 40a toward the light exit plane 18a by the angle θ from the reference plane S.

The light sources 12 thus tilted allow the light emitted by light sources having large light emission faces to be efficiently admitted into the light guide plate. Use of light sources having large light emission faces in turn enables an increased amount of light to be emitted by the light sources. Thus, high-brightness light can be emitted through the light exit plane of the light guide plate by efficiently admitting light emitted by the light sources having large light emission faces into the light guide plate.

Further, even where the light emission faces are tilted a given angle, the upper light guide reflection plates and the lower light guide reflection plates, which reflect light emitted by the light sources, prevent light emitted by the light sources from being emitted and not entering the light guide plate, and thus efficiently direct light emitted by the light sources to the first light entrance plane and the second light entrance plane of the light guide plate.

Each LED chip 40 of the light sources 12 is preferably shaped such that its length in the direction in which the light emission face 40a is tilted, which, in the embodiment under discussion, is the length "a" (see FIG. 6) of the light emission face 40a of the LED chips 40 perpendicular to the direction in which the LED chips 40 are arrayed, is longer than the length in cross section of the first light entrance plane 18d perpendicular to the light exit plane 18a, which, in the embodiment under discussion, is the length d1 of the first light entrance plane 18d or the second light entrance plane 18e of the light guide plate 18 in the direction perpendicular to the light exit plane 18a of the light guide plate 18 (the length d1 being hereinafter referred to as "length d1 of the light entrance plane in effective cross section"), or yet otherwise expressed, the length of the first light entrance plane 18d or the second light entrance plane 18e in the direction of the thickness of the light guide plate.

The light emission face 40a having the length "a" longer than the length d1 of the light entrance plane in effective cross section allows more light than otherwise to be emitted through the light emission face.

Further, also where the light emission face 40a has the length "a" longer than the length d1 of the light entrance plane in effective cross section, the light emission face 40a disposed at a given angle θ with respect to the reference plane S causes light to enter the light guide plate efficiently and, as earlier described, high-brightness light to be efficiently emitted through the light exit plane of the light guide plate.

The inclination angle θ by which the light emission face 40a is tilted with respect to the reference plane S is preferably not less than 15° and not greater than 90°, thus $15° \leq \theta \leq 90°$ and, more preferably, not less than 15° and not greater than 75°, thus $15° \leq \theta \leq 75°$. The inclination angle θ is the angle by which the light emission face 40a is tilted from the reference plane S toward the light exit plane 18a. When θ=90°, the light emission face 40a is parallel to the light exit plane 18a and, therefore, light is emitted through the light emission face 40a in the same direction in which light is emitted through the light exit plane 18a of the light guide plate 18.

The inclination angle θ of the light emission face 40a set anywhere in the range of $15° \leq \theta \leq 90°$ enables a higher light use efficiency to be achieved and ensures uniformity of the light emitted through the light exit plane. The inclination angle θ in the range of 15°≦θ≦75° enables a still higher light use efficiency to be achieved and ensures a still higher uniformity.

While the light source 12 is preferably disposed such that the light emission faces 40*a* are directed toward the light exit plane as in the embodiment under discussion, the present invention is not limited to such configuration. The light emission faces 40*a* of the light source 12 may be directed toward the first inclined plane 18*b* or the second inclined plane 18*c*.

Now, the planar lighting device 10 will be described in greater detail below by referring to specific examples thereof. Because the examples of the planar lighting device now to be described are symmetrical with respect to the bisector α mentioned above, description that follows will be made solely on the side of the planar lighting device comprising the first light entrance plane as a representative. Note that, in the embodiments now to be described, light emitted through the light exit plane of the planar lighting device was measured without a liquid crystal display panel, i.e., color filters. Thus, measurement was made of light that was emitted through the light exit plane of the planar lighting device, not the light exit plane of the liquid crystal display device.

In the examples of the planar lighting device now to be described, each light emission face 40*a* of the LED chips 40 measured 2.5 mm in the direction perpendicular to the direction in which the LED chips 40 are arrayed, the LED chips 40 measured 0.5 mm in thickness w1, the array base 42 measured 3.0 mm in length d2 in the direction perpendicular to the direction in which the LED chips 40 are arrayed and 0.5 mm in thickness w2, the first light entrance plane 18*d* of the light guide plate 18 measured 2.0 mm in length d1 in effective cross section, and the length in which the upper light guide reflection plate 34 and the light guide plate 18 overlap, i.e., the distance L between the light entrance plane 18*d* and the end of the upper light guide reflection plate 34 closer to the center of the light guide plate 18, measured 5 mm. A reflection film measuring 0.1 mm in thickness and having a reflectance of 98% was used to form the reflection plate 24 and the lower light guide reflection plate 36; a reflection film measuring 0.1 mm in thickness and having a reflectance of 90% was used to form the upper light guide reflection plate 34. Note that the reflection plate 24 and the lower light guide reflection plate 36 are formed of a one-piece reflection film, which is bent at their joint, where the first light guide entrance plane 18*d* is located at the end of the light guide plate 18.

The light use efficiency of the light sources of the planar lighting device was measured by varying the inclination angle θ of the light emission faces 40*a* of the LED chips 40 of the light sources 12 of the planar lighting device having the configuration as described above among 15°, 30°, 45°, 60°, and 75°.

Figure 22A:
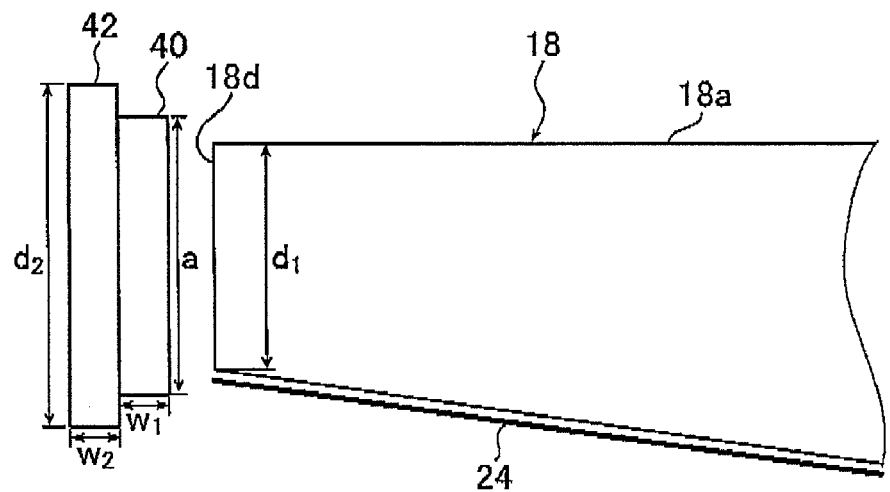
FIGS. 22A and 22B are enlarged sectional views schematically illustrating configurations of examples of planar lighting devices used for comparison with the planar lighting device used in the present invention.
Figure 22B:
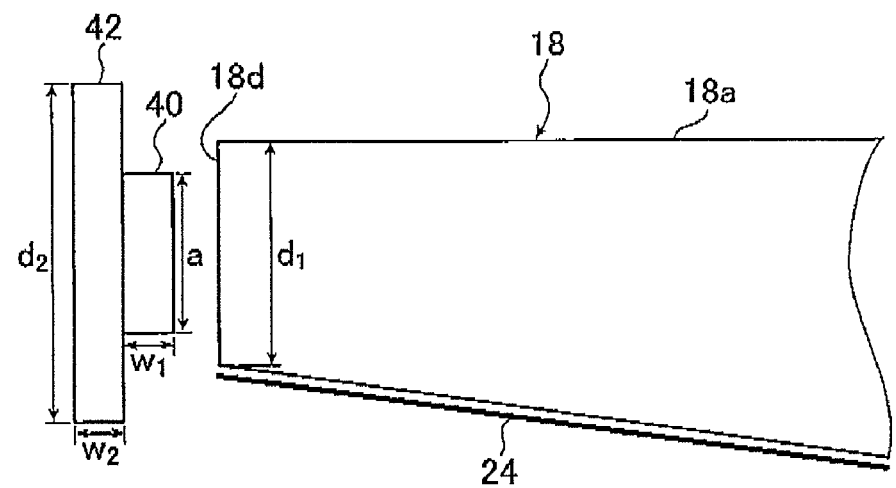

The light use efficiency of the light source of a planar lighting device as illustrated in FIG. 22A was also measured, where θ=0°, that is, the light emission faces 40*a* were disposed in a position or at an angle such that the light emission faces 40*a* were parallel to the reference plane S. Also measured was the light use efficiency of the light source of a planar lighting device as illustrated in FIG. 22B, where the length "a" of the light emission faces 40*a* of the LED chips 40 in the direction perpendicular to the direction in which the LED chips 40 are arrayed measured 1.45 mm, and θ=0°. Note that although the fluorescent member 17 is not shown in FIGS. 22A and 22B to clearly indicate the dimension line, the fluorescent member 17 is disposed in contact with the light emission faces 40*a* of the LED chips 40 as illustrated in FIG. 5.

The measurements obtained are shown in Table 4 below and in FIG. 23.

TABLE 4

| | | | | | | | |
|---|---|---|---|---|---|---|---|
| a | 2.5 | 2.5 | 2.5 | 2.5 | 2.5 | 2.5 | 1.45 |
| θ | 15 | 30 | 45 | 60 | 75 | 0 | 0 |
| Light use efficiency | 57% | 54% | 51% | 49% | 48% | % | 51% |

Figure 23:
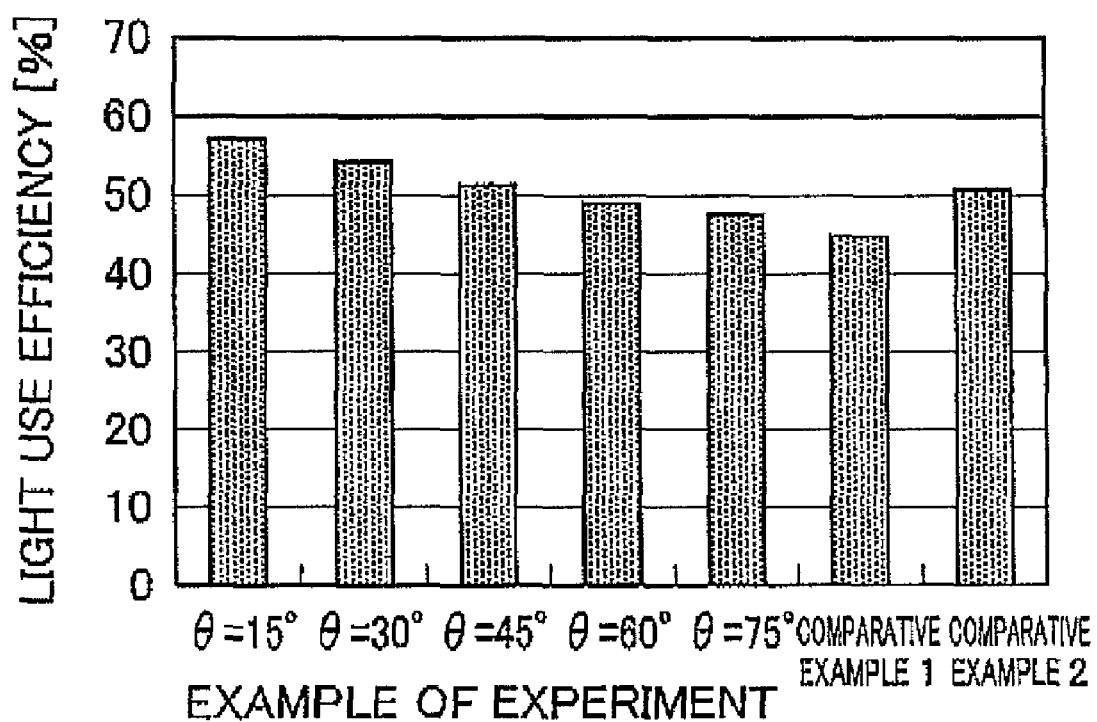
FIG. 23 is a graph illustrating measurements of light use efficiency achieved by the inventive planar lighting device as an inclination angle θ of the light emission face was varied.

Table 4 and FIG. 23 show that higher light use efficiency is achieved by tilting the light emission faces of the light source by a given angle than where the light emission faces 40*a* are disposed in a position or at an angle such that the light emission faces 40*a* are parallel to the reference plane S. Thus, more light can be admitted into the light guide plate and the brightness or illuminance of light emitted through the light exit plane of the light guide plate can be increased.

Further, the measurements show that the examples wherein the light emission faces 40*a* are tilted to an inclination angle θ of 15°≦θ≦45° achieve higher light use efficiencies than where the LED chips 40 are each provided with the light emission faces 40*a* of which the length "a" in the direction perpendicular to the direction in which the LED chips 40 are arrayed is shorter than the length of the light entrance plane in effective cross section.

Thus, light emitted by the light source can be admitted more efficiently into the light guide plated and light having a higher brightness and a higher illuminance can be emitted through the light exit plane by adjusting the inclination angle θ of the light emission faces.

In the above examples, a liquid crystal display panel or a color filter was not provided, and light as emitted through the light exit plane of the planar lighting device was measured. Where the color filter is provided, that is, where light emitted through the liquid crystal display panel is measured, adjustment of the inclination angle θ of the light emission faces likewise ensures that light emitted by the light source is more efficiently directed to the light guide plate and that light can be emitted through the light exit plane with a higher brightness and a higher illuminance. In brief, the above effects are achieved regardless of whether the color filter is provided.

Next, another embodiment of the planar lighting device will be described.

Figure 24:
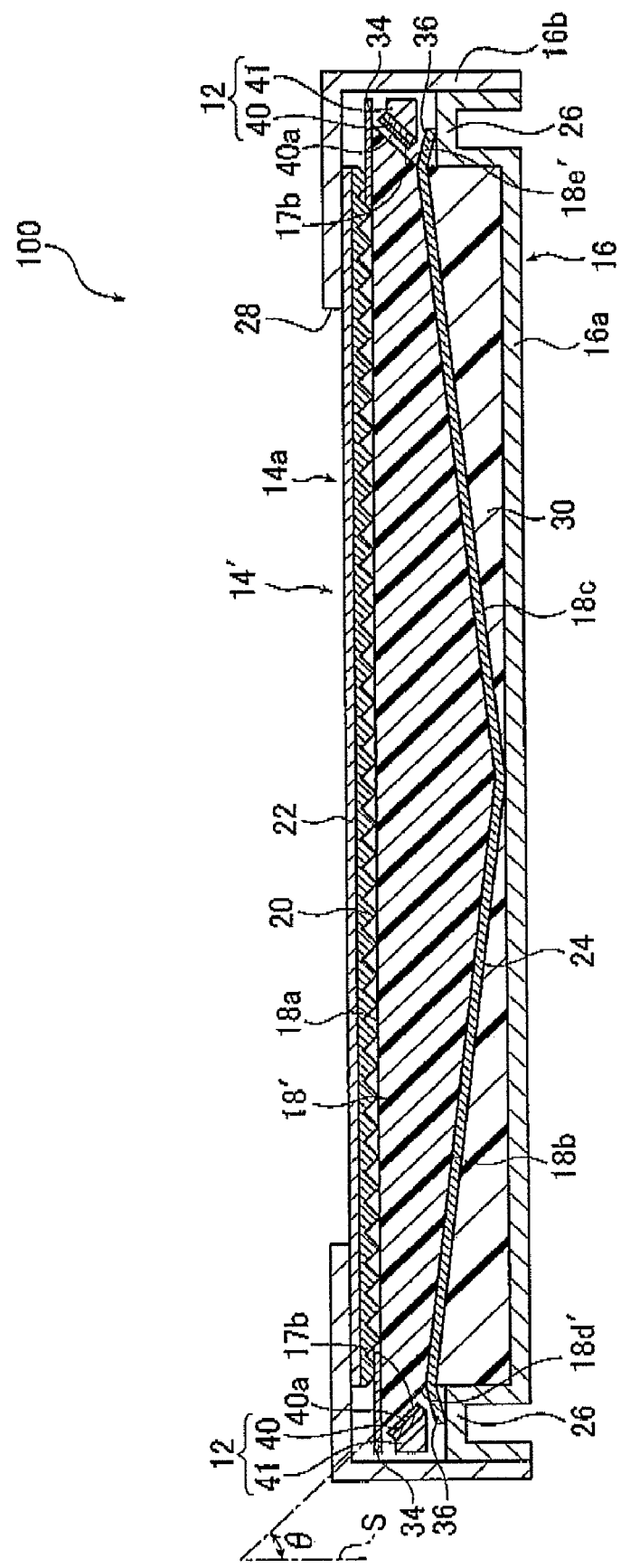
FIG. 24 is a sectional view schematically illustrating a configuration of another embodiment of the planar lighting device used in the present invention.
Figure 25:
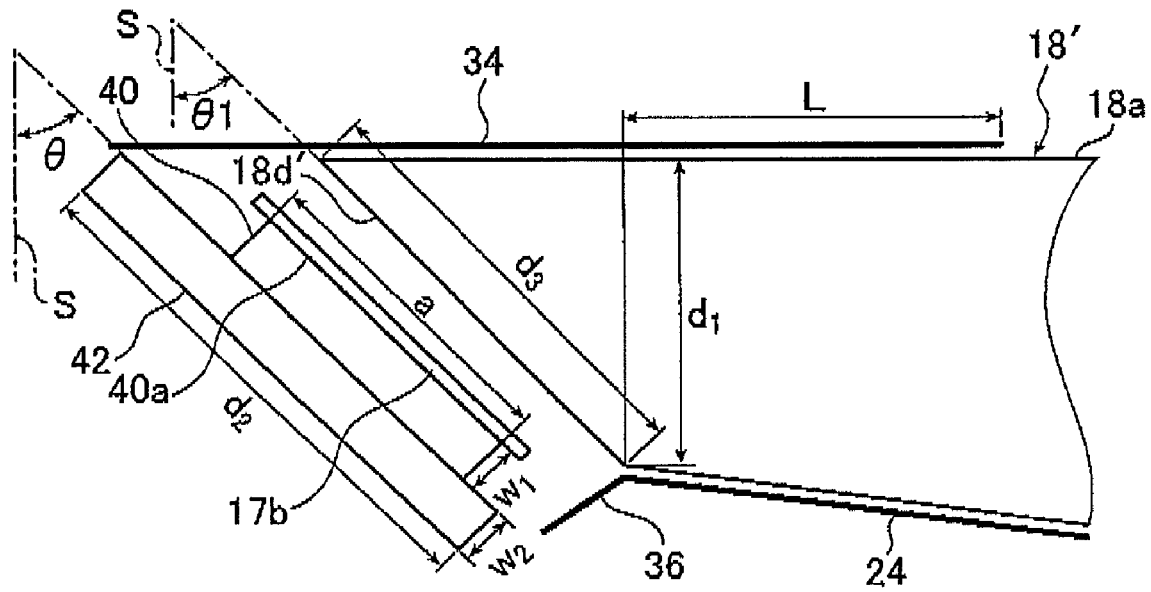
FIG. 25 is an enlarged sectional view illustrating part of the planar lighting device of FIG. 24 enlarged.

FIG. 24 is a sectional view schematically illustrating another embodiment of the planar lighting device used in the present invention; FIG. 25 is an enlarged sectional view illustrating part of the planar lighting device of FIG. 24 enlarged.

A planar lighting device 100 illustrated in FIGS. 24 and 25 has the same configuration as the planar lighting device 10 of FIGS. 1, 2, and 5 except for the configuration of a first light entrance plane 18*d'* and a second light entrance plane 18*e'* of a light guide plate 18'. Therefore, the same components shared by both are given like reference characters, omitting detailed description thereof. Thus, description that follows will be focused on features unique to the planar lighting device 100.

The planar lighting device 100 comprises the light sources 12, a main body 14' of the lighting device that emits uniform light through the rectangular light emission plane 14*a*, fluorescent members 17*b* provided between the light sources 12 and the main body 14' of the lighting device, and the housing 16 accommodating the light sources 12, the main body 14' of the lighting device, and the fluorescent members 17*b*. The main body 14' of the lighting device comprises a light guide plate 18', the prism sheet 20, the diffusion film 22, the reflection plate 24, the upper light guide reflection plates 34, and the lower light guide reflection plates 36. Since the light sources 12, the housing 16, the prism sheet 20, the diffusion film 22, the reflection plate 24, the upper light guide reflection plates 34, and the lower light guide reflection plates 36 have the same configuration as in the planar lighting device 10 described above, these components will not be described in detail here.

As illustrated in FIGS. 24 and 25, the light guide plate 18' comprises the light exit plane 18a, which is flat and substantially rectangular; two light entrance planes, i.e., the first light entrance plane 18d' and the second light entrance plane 18e', provided on both sides of the light exit plane 18a tilted a given angle θ1 with respect to the reference plane S; the two inclined planes, i.e., the first inclined plane 18b and the second inclined plane 18c located on the opposite side from the light exit plane 18a and inclined a given angle with respect to the light exit plane 18a so as to be symmetrical to each other with respect to the bisector α (see FIG. 1) parallel to the first light entrance plane 18d' and the second the light entrance plane 18e' and bisecting the light exit plane 18a. The first inclined plane 18b and the second inclined plane 18c are so inclined as to be farther distanced from the light exit plane 18a with the increasing distance from the first light entrance plane 18d' or the second light entrance plane 18e'. Expressed otherwise, the first inclined plane 18b and the second inclined plane 18c are inclined such that the thickness of the light guide plate in the direction perpendicular to the light exit plane of the light guide plate increases from the first light entrance plane 18d' or the second light entrance plane 18e' toward the center of the light guide plate 18'. Thus, the light guide plate 181 is thinnest at both ends, i.e., the first light entrance plane 18d' and the second light entrance plane 18e', and thickest at the center or on the bisector α where the first inclined plane 18b and the second inclined plane 18b meet. The inclination angle by which the first inclined plane 18b and the second inclined plane 18c are inclined with respect to the light exit plane 18a is not limited specifically.

The light sources 12 are disposed opposite the first light entrance plane 18d' and the second light entrance plane 18e'. Thus, the planar lighting device 100 is configured such that the two light sources 12 are disposed on both sides of the light guide plate 18'. Expressed otherwise, the light guide plate 18' is placed between the two light sources 12 spaced apart from each other by a given distance.

The planar lighting device 100 is also symmetrical with respect to the bisector α as is the planar lighting device 10 described above. Therefore, solely the side of the planar lighting device comprising the first light entrance plane will be described as a representative.

In the planar lighting device 100 according to the embodiment under discussion, the inclination angle θ1 of the first light entrance plane 18d' with respect to the reference plane S is, as illustrated in FIG. 25, the same as the inclination angle θ of the light emission faces 40a of the LED chips 40 of the light source 12 disposed opposite the first light entrance plane 18d' with respect to the reference plane S. Thus, the first light entrance plane 18d' and the light emission faces 40a are parallel.

Also where the first light entrance plane 18d' is tilted a given angle with respect to the reference plane S, as with the embodiment under discussion, light having an increased color temperature can be emitted through the light emission plane 14a by providing the fluorescent member 17b on the light emission faces 40a of the LED chips 40 of the light source 12, whereas, furthermore, light having a desired color temperature can be emitted through the light emission plane 14a by adjusting the shape of the blue color passing areas, i.e., the apertures or the transparent areas.

Note that also in the embodiment under discussion, the fluorescent member 17b may be located in any position between the light emission faces of the LED chips and the light entrance plane of the light guide plate. For example, the fluorescent member 17b may be disposed in contact or in close contact with the light entrance plane.

With the first light entrance plane 18d' of the light guide plate 18 tilted a given angle θ1 with respect to the reference plane S, the first light entrance plane 18d' acquires a larger surface area than the area of the effective cross section of the first light entrance plane 18d'. Thus, light emitted through the light emission faces 40a of the light source 12 can be efficiently admitted into the light guide plate 18'.

Where the first light entrance plane 18d' is tilted as in the embodiment under discussion, the effective cross section of the light entrance plane is the cross section perpendicular to the light exit plane 18a and containing the side of the first light entrance plane 18d' closer to the light exit plane 18a, i.e., the line or the joint where the first light entrance plane 18d' and the light exit plane 18a meet.

Further, where, as with the embodiment under discussion, the first light entrance plane 18d' of the light guide plate 18 is positioned parallel to the light emission faces 40a of the light source 12 or where, expressed otherwise, the first light entrance plane is tilted with respect to the reference plane S by an inclination angle identical to that of the light emission faces of the light source provided opposite the first light entrance plane, light emitted from the light emission faces 40a is allowed to strike the first light entrance plane 18d' efficiently.

While the inclination angle θ1 of the first light entrance plane 18d' is preferably identical to the inclination angle θ of the light emission faces 40a of the light source 12, the present invention is not limited to such configuration. The inclination angle θ1 may be different from the inclination angle θ. Briefly, the light emission faces 40a may be positioned at a given angle with respect to the first light entrance plane 18d'.

Now, the planar lighting device 100 will be described in greater detail by referring to specific examples.

In the examples of the planar lighting device 100 now to be described, each light emission face 40a of the LED chips 40 measured 2.5 mm in the direction perpendicular to the direction in which the LED chips 40 are arrayed, the LED chips 40 measured 0.5 mm in thickness w1, the array base 42 measured 3.0 mm in length d2 perpendicular to the direction in which the LED chips 40 are arrayed and 0.5 mm in thickness w2, the first light entrance plane 18d' of the light guide plate 18' measured 2.0 mm in length d1 thereof in effective cross section, the length of the first light entrance plane 18d', i.e., the length d3 of the light entrance plane 18d' connecting the light exit plane 18a and the first inclined plane 18b measured (2.0/cos θ1), and the length in which the upper light guide reflection plate 34 and the light exit plane 18a of the light guide plate 18' overlap, i.e., the distance L between the first light entrance plane 18d' and the end of the upper light guide reflection plate 34 closer to the center of the light guide plate 18', measured 5 mm. A reflection film measuring 0.1 mm in thickness and having a reflectance of 98% was used to provide the reflection plate 24 and the lower light guide reflection plate 36; a reflection film measuring 0.1 mm in thickness and having a reflectance of 90% was used to provide the upper light guide reflection plate 34. Note that the reflection plate 24 and the lower light guide reflection plate 36 are formed of a one-piece reflection film, which is bent at their joint, where the first light guide entrance plane 18d of the light guide plate 18' is located.

The light emission faces 40a of the light source 12 were positioned parallel to the first light entrance plane 18d' of the light guide plate 18' or, expressed otherwise, the inclination angle θ of the light emission faces 40a was the same as the inclination angle θ1 of the first light entrance plane 18d'. Note that, gain in these examples, it was light emitted through the light exit plane of the planar lighting device that was measured.

The light use efficiency of the light sources of the planar lighting device thus configured was measured with the inclination angle θ of the light emission faces 40a and the inclination angle θ1 of the first light entrance plane set to the same angle, thus θ=θ1, varying θ among 15°, 30°, 45°, 60°, and 75%.

As in the preceding examples, light use efficiency observed in the light source of the planar lighting device was measured, where θ=0°, that is, the light emission faces 40a were disposed in a position or at an angle such that the light emission faces 40a were parallel to the reference plane S, as illustrated in FIG. 22A. Also measured was light use efficiency observed in a planar lighting device as illustrated in FIG. 22B, where the length "a" of the light emission faces 40a of the LED chips 40 in the direction perpendicular to the direction in which the LED chips 40 are arrayed measured 1.45 mm, and θ=0°.

Figure 26:
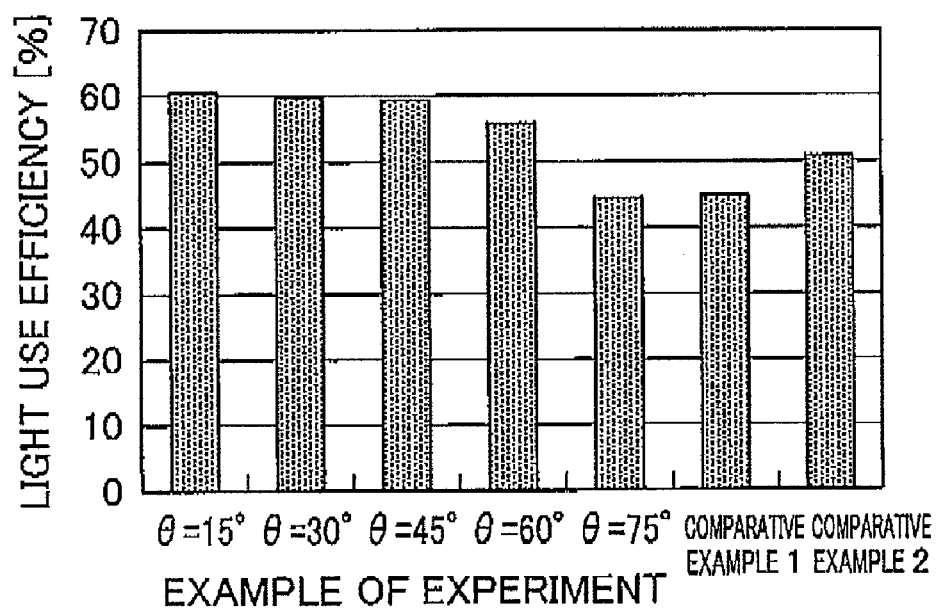
FIG. 26 is a graph illustrating measurements of light use efficiency achieved by the inventive planar lighting device as the inclination angle θ of the light emission face was varied.

Table 5 and FIG. 26 show the measurements obtained as follows.

TABLE 5

| a | 2.5 | 2.5 | 2.5 | 2.5 | 2.5 | 2.5 | 1.45 |
|---|---|---|---|---|---|---|---|
| θ | 15 | 30 | 45 | 60 | 75 | 0 | 0 |
| θ1 | 15 | 30 | 45 | 60 | 75 | 0 | 0 |
| Light use efficiency | 60% | 60% | 59% | 55% | 44% | 45% | 51% |

Table 5 and FIG. 26 show that where the light emission faces of the light source and the light entrance plane of the light guide plate are tilted a given angle, substantially the same light use efficiency is achieved as where the light emission faces 40a are disposed in a position or at an angle such that the light emission faces 40a are parallel to the reference plane S, or a higher light use efficiency is achieved than where the light emission faces 40a are disposed in a position such that the light emission faces 40a are parallel to the reference plane S. Further, where the light source is disposed with an inclination, a larger light source can be provided, although the light sources having the same dimensions were used in the above examples. Thus, more light can be admitted into the light guide plate and the brightness or illuminance of light emitted through the light exit plane can be increased.

Further, the measurements show that the examples, wherein the inclination angle θ of the light emission faces 40a and the inclination angle θ1 of the first light entrance plane are such that θ=θ1 and 15°≦θ≦60°, achieve higher light use efficiencies than where the LED chips 40 are provided with the light emission faces 40a of which the length "a" in the direction perpendicular to the direction in which the LED chips 40 are arrayed is shorter than the length of the light entrance plane in effective cross section.

Thus, light emitted by the light source can be admitted more efficiently into the light guide plate and light having a higher brightness and a higher illuminance can be emitted through the light exit plane by adjusting the inclination angle θ of the light emission faces and the inclination angle θ1 of the first light entrance plane.

Next, some other specific examples will be described.

In the examples to follow, brightness (cd/m²), illuminance (1x), light use efficiency (%), and average brightness (cd/m²) of light emitted through the light exit plane were measured at individual positions in each of the planar lighting devices that had substantially the same configuration as the examples of the planar lighting device 10 earlier described, where θ=45° and the distance L between the first light entrance plane 18d and the end of the upper light guide reflection plate 34 closer to the center of the light guide plate 18 measured 5 mm. Again in these examples, measured was light emitted through the light exit plane of the planar lighting device.

Further, brightness (cd/m²), illuminance (1x), light use efficiency (%), and average brightness (cd/m²) of light emitted through the light exit plane were measured at individual positions in each of the planar lighting devices that had substantially the same configuration as the examples of the planar lighting device 100 described above, except that θ=θ1=45° and the distance L between the first light entrance plane 18d' and the end of the upper light guide reflection plate 34 closer to the center of the light guide plate 18 respectively measured 5 µm and 10 mm. Also measured were brightness (cd/m²), illuminance (1x), light use efficiency (%), and average brightness (cd/m²) of light emitted through the light exit plane of a planar lighting device, at individual positions thereof, where the light reflection plate was not provided and the light entrance plane of the light guide plate and the light emission faces of the light sources were parallel to the reference plane.

Figure 27:
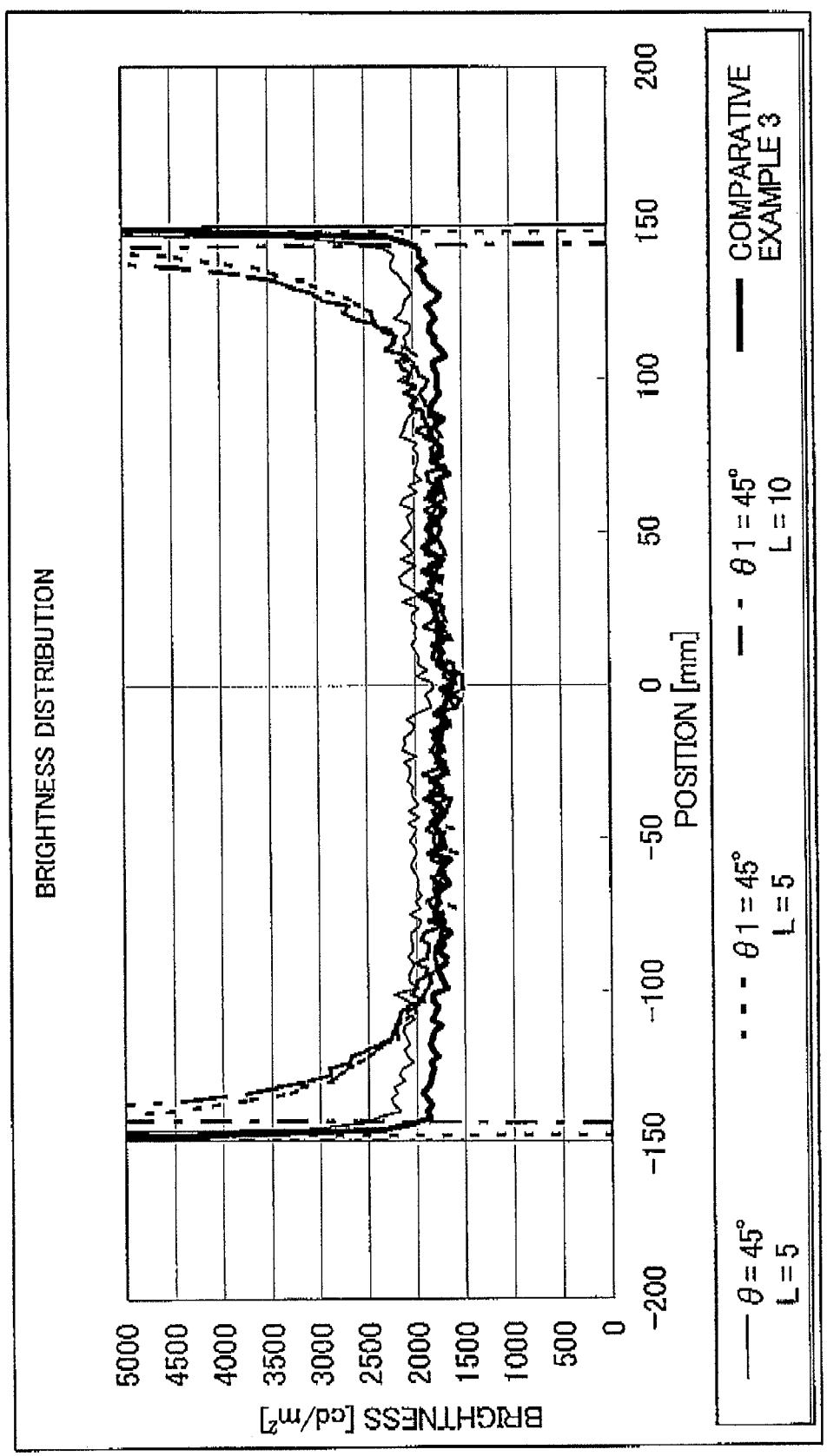
FIG. 27 is a graph illustrating brightness distributions of light emitted through the light exit plane of the inventive planar lighting device as the inclination angle of the light emission face and the light entrance plane and a mounting length of upper light guide reflection plates were varied.
Figure 28:
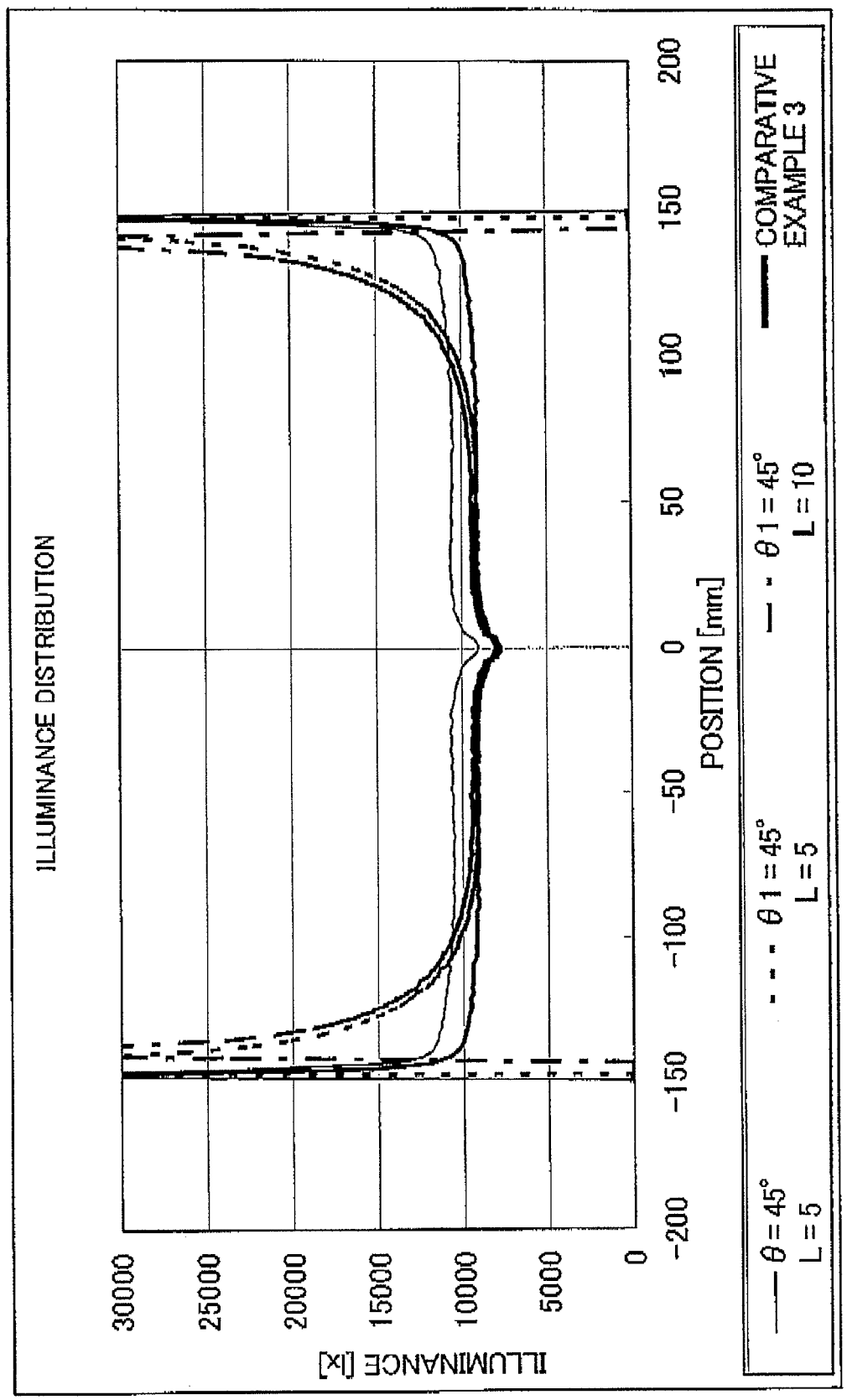
FIG. 28 is a graph illustrating illuminance distributions of light emitted through the light exit plane of the inventive planar lighting device as the inclination angle of the light emission face and the light entrance plane and the mounting length of the upper light guide reflection plates were varied.

FIG. 27 shows measured brightness distributions, and FIG. 28 shows measured illuminance distributions. FIG. 27 shows brightness (cd/m²) on the vertical axis and the distance (mm) from the center of the light guide plate on the horizontal axis. FIG. 28 shows illuminance (1x) on the vertical axis and the distance (mm) from the center of the light guide plate on the horizontal axis.

Table 6 shows the light use efficiency (%) and average brightness (cd/m²).

TABLE 6

| θ | 45 | 45 | 45 | 0 |
|---|---|---|---|---|
| θ1 | 0 | 45 | 45 | 0 |
| L | 5 | 5 | 10 | 0 |
| Light use efficiency | 50.70% | 50.70% | 52.00% | 48.70% |
| Average brightness | 2160 | 2418 | 2332 | 2073 |

Table 6 shows that a higher average brightness and a higher light use efficiency are achieved where the light entrance plane is tilted and the upper light guide reflection plate is provided.

It is also shown that a higher average brightness is achieved where the upper light guide reflection plate is given a length L of 5 mm.

The foregoing clearly shows the effects achieved by the present invention.

Now, still other embodiments of the planar lighting device used in the present invention will be described below.

Figure 29A:
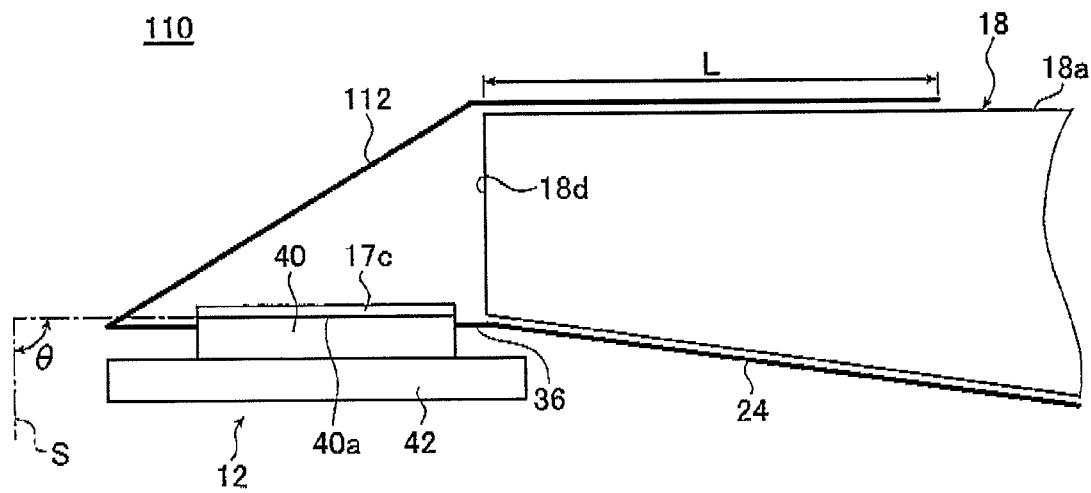
FIGS. 29A and 29B are enlarged sectional views schematically illustrating configurations of other examples of the planar lighting device used in the present invention.
Figure 29B:
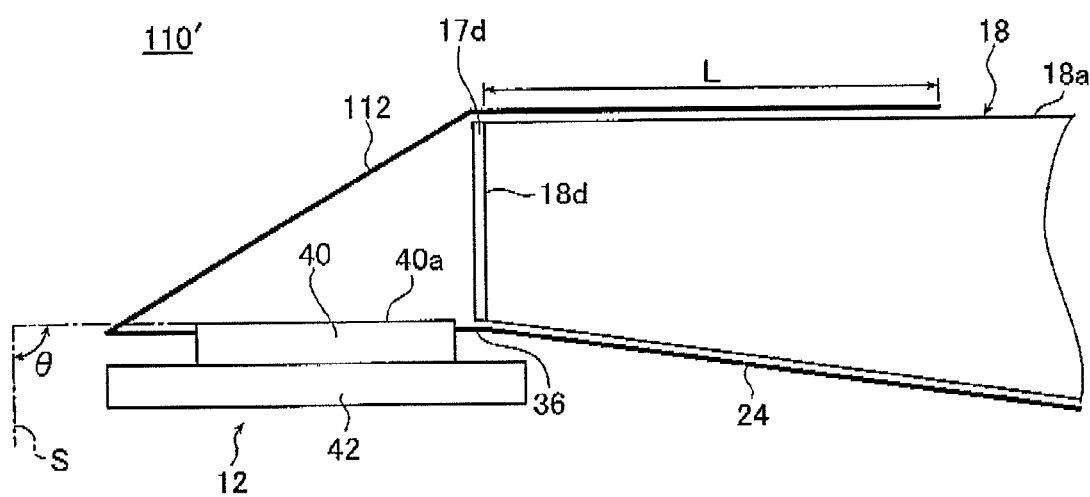
Figure 30:
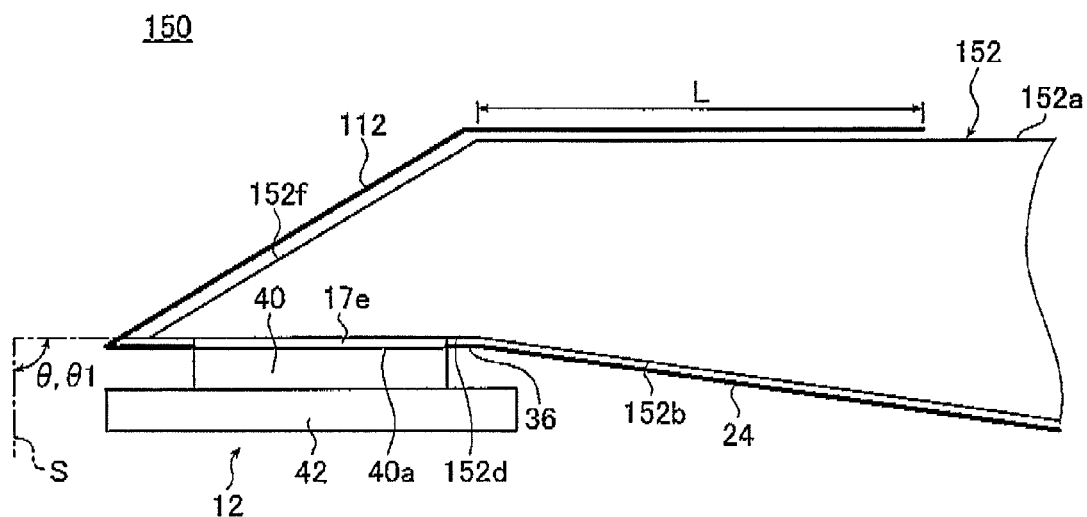
FIG. 30 is an enlarged sectional view schematically illustrating a configuration of another example of the planar lighting device used in the present invention.

FIGS. 29A, 29B, and 30 are enlarged sectional views illustrating other embodiments of the planar lighting device used in the present invention. A planar lighting device 110 of FIG. 29A, a planar lighting device 110' of FIG. 29B, and a planar lighting device 150 of FIG. 30 are also bilaterally symmetrical as are the planar lighting device 10 and the planar lighting device 100. Description will therefore be given referring solely to one side thereof.

The planar lighting device 110 illustrated in FIG. 29A has basically the same configuration as the planar lighting device 10 except that the light emission faces 40a are tilted an inclination angle θ of 90° with respect to the reference plane S.

The light source 12 of the planar lighting device 110 is disposed such that the light emission faces 40a of the LED chips 40 are positioned at an inclination angle θ of 90° or, otherwise expressed, the light emission faces 40a are disposed perpendicular to the first light entrance plane 18d. The LED chips 40 are provided on the side of the first light entrance plane 18d closer to the first inclined plane 18b.

A fluorescent member 17c is disposed in contact with the light emission faces 40a of the LED chips 40. The shape of the fluorescent member 17c is the same as the fluorescent member 17 already described above and, hence, is not described here.

An upper light guide reflection plate 112 is a sheet member bent at the end of the light exit plane 18a of the light guide plate 18 and covers an area from part of the light exit plane 18 of the light guide plate 18 as far as the end of the light emission faces 40a of the LED chips 40 farther from the first light entrance plane 18d. Note that the upper light guide reflection plate 112 may be formed of the same material as the upper light guide reflection plate 34 earlier described.

In the planar lighting device 110, light is emitted by the light source 12, then transmitted through the fluorescent member 17c, and, either directly or after being reflected by the upper light guide reflection plate 112, enters the light guide plate 18 through the first light entrance plane 18d. Light thus admitted into the light guide plate 18 is emitted through the light exit plane as with the planar lighting device 10.

The color temperature of light emitted through the light emission plane 14a can be increased also with the embodiment under discussion by providing a fluorescent member 17c on the light emission faces 40a of the LED chips 40 of the light source 12. Further, light emitted through the light emission plane 14a can be adjusted to a desired color temperature by modifying the shape of the blue light passing areas, i.e., the apertures or the transparent areas.

Thus, also where the light emission faces 40a are disposed at an inclination angle θ of 90°, light emitted by a light source having large light emission faces, for example, light emission faces each measuring longer than the length of the light entrance plane in effective cross section, can be caused to efficiently strike the light entrance plane, thus improving the light use efficiency. Further, where the light emission faces are disposed at an inclination angle θ of 90°, each light emission face can be given a larger area, which in turn helps increase the brightness or illuminance of light emitted through the light exit plane.

Again with the embodiment under discussion, the position in which the fluorescent member is provided is not limited specifically: a fluorescent member 17d may for example be located in such a position as to be in contact with the first light entrance plane 18d of the light guide plate 18 of a planar lighting device 110' as illustrated in FIG. 29B.

A planar lighting device 150 of FIG. 30 has the same configuration as the planar lighting device 110 of FIG. 29A except for the shape of a light guide plate 152.

The light guide plate 152 comprises a flat, substantially rectangular light exit plane 152a; two lateral planes on both sides of a light exit plane 152a, i.e., a first lateral plane 152f and a second lateral plane 152g, formed at a given inclination angle with respect to the light exit plane 152a; two inclined planes, i.e., a first inclined plane 152b and a second inclined plane 152c, symmetrical with respect to the bisector α (see FIG. 1) bisecting the light exit plane 152a; two light entrance planes, i.e., a first light entrance plane 152d and a second light entrance plane 152e, formed between one end of the respective inclined planes and one end of the respective lateral planes. In the light guide plate 152, the light exit plane 152a and the first lateral plane 152d form an angle greater than 90° whereas the first light entrance plane 152d and the first lateral plane 152f form an angle that is smaller than 90°. The first light entrance plane 152d is disposed at an inclination angle θ1 of 90° with respect to the reference plane S.

The effective cross section of the light entrance plane in the embodiment under discussion is the cross section containing the side of the first light entrance plane 152d closer to the first inclined plane 152b and substantially perpendicular to the light exit plane 152a of the light guide plate 152.

Note that, because the planar lighting device 150 is bilaterally symmetrical, FIG. 30 only illustrates an end portion thereof closer to the first lateral plane 152f.

The light source 12 comprises LED chips 40 and the light source mount 41 and is disposed opposite the first light entrance plane 152d formed between the first inclined plane 152b and the first lateral plane 152f of the light guide plate 152.

The light source 12 is located in a position such that the light emission faces 40a have an inclination angle θ of 90° with respect to the reference plane S. Thus, the light emission faces 40a and the first light entrance plane 152d are parallel to each other.

The upper light guide reflection plate 112 is so disposed as to partially cover the light guide plate 152 by contouring part of the light exit plane 152a bordering on the first lateral plane 152f and the first lateral plane 152f. The end of the upper light guide reflection plate 112 closer to the first lateral plane 152f of the light guide plate 152 connects with the light source 12.

The light guide plate 152 is provided with the lower light guide reflection plate 36 and the reflection plate 24 on the side thereof closer to the first inclined plane 152b.

Thus, part of the light exit plane 152a bordering on the first lateral plane 152f, the first lateral plane 152f, the first light entrance plane 152d, and the first inclined plane 152b of the light guide plate 152 are covered all the way through with the upper light guide reflection plate 112, the light source 12, the lower light guide reflection plate 36, and the reflection plate 24. In the embodiment under discussion, the reflection plate 24 and the lower light guide reflection plate 36 are formed integrally.

A fluorescent member 17e is disposed between the light entrance plane 152d and the light emission faces 40a of the LED chips.

The fluorescent member 17e has the same configuration as the fluorescent member 17 already mentioned and, therefore, is not described in detail below.

Light emitted through the light emission faces 40a of the light source 12 is transmitted through the fluorescent member 17e, and enters the light guide plate 152 through the first light entrance plane 152d of the light guide plate 152. Light thus admitted then travels toward the center of the light guide plate 152 either directly or after being reflected by the upper light guide reflection plate 112.

As with the light guide plate 18 described earlier, light traveling toward the center of the light guide plate 152 is scattered by the scatterers contained inside the light guide plate 152 as it passes through the inside of the light guide plate 152 and, directly or after being reflected by the first inclined plane 152b and the second inclined plane 152c, exits through the light exit plane 152a. The scatterers will be described later in detail.

The color temperature of light emitted through the light emission plane 14a can be increased also with the embodiment under discussion by providing a fluorescent member 17e on the light emission faces 40a of the LED chips 40 of the light source 12. Further, light can be emitted through the light emission plane 14a with a desired color temperature by adjusting the shape of the blue light passing areas, i.e., the apertures or the transparent areas.

Further, light emitted by the light source can be also efficiently admitted into the light guide plate and light use efficiency can be increased by tilting both the light emission faces of the light source and the light entrance plane of the light guide plate by a given angle with respect to the reference plane and providing the lateral plane between the light entrance plane and the light exit plane of the light guide plate.

Further, light emission faces can be each given a larger area and light with a high brightness or a high illuminance can be emitted through the light exit plane by providing the lateral plane and locating the light entrance plane on the side closer to the inclined plane. Furthermore, light free from unevenness can be emitted through the light exit plane also where light is admitted through the light entrance plane located on the side closer to the inclined plane by reflecting light admitted through the light entrance plane with the lateral plane titled a given angle.

Further, where the lateral plane is provided, light admitted through the light entrance plane can be reflected by the lateral plane. Thus, also where the light entrance plane is provided at a great inclination angle with respect to the reference plane, light admitted through the light entrance plane can be readily guided toward the center of the light guide plate.

Further, the light emission faces of the light source each acquire an increased area where the first light entrance plane 152d is disposed at an inclination angle θ1 of 90° with respect to the reference plane S, i.e., parallel to the light exit plane.

Again, with the planar lighting device as described above that admits light through an end portion of the inclined plane of the light guide plate, the value $\Omega \cdot N_p \cdot L_G \cdot K_C$ is preferably in the range of not less than 1.1 and not greater than 8.2, and $K_C$ is preferably in the range of not less than 0.005 and not greater than 0.1, where Φ is the scattering cross section of the scattering particles contained in the light guide plate 152; $L_G$ the distance in the direction parallel to the light exit plane 152a and perpendicular to the line where the light exit plane 152a crosses the lateral plane, i.e., the first lateral plane 152f or the second lateral plane 152g, from the point where the lateral plane and the light entrance plane of the light guide plate 152 meet, i.e., the end of the light guide plate, to a position where the light guide plate 152 is thickest or smallest in the direction perpendicular to the light exit plane; $N_p$ the density of the scattering particles contained in the light guide plate 152, i.e., the number of particles in unit volume; and $K_C$ the compensation coefficient. The light guide plate 152, containing scattering particles satisfying the above relation, is capable of emitting uniform illuminating light with a greatly reduced level of brightness unevenness through the light exit plane 152a.

The same preferred configurations, shapes, and the like of the embodiments earlier described also apply where the lateral planes are provided. For example, the inclination angle θ=θ1 is preferably in the range of 15°≦θ≦90°.

Now, the planar lighting device used in the present invention will be described in detail referring to specific examples.

The examples to follow have substantially the same dimensions and configuration as the planar lighting device 10 described above except that θ=90°, that is, the light emission faces 40a of the LED chips of the light source have such an inclination angle and the upper light guide reflection plate has such a shape as illustrated in the planar lighting device 110 and that the upper light guide reflection plate has a length L of 10 mm. Illuminance (1x) and light use efficiency (%) of light emitted through the light exit plane of the planar lighting device 110 having such configuration were measured. Again, in these examples, it was light emitted through the light exit plane of the planar lighting device that was measured.

Also measured for comparison were illuminance (1x) and light use efficiency (%) emitted through the light exit plane of a planar lighting device where θ=45°, the upper light guide reflection plate has a length L of 10 mm, and where the light entrance plane of the light guide plate is parallel to the reference plane.

Figure 31:
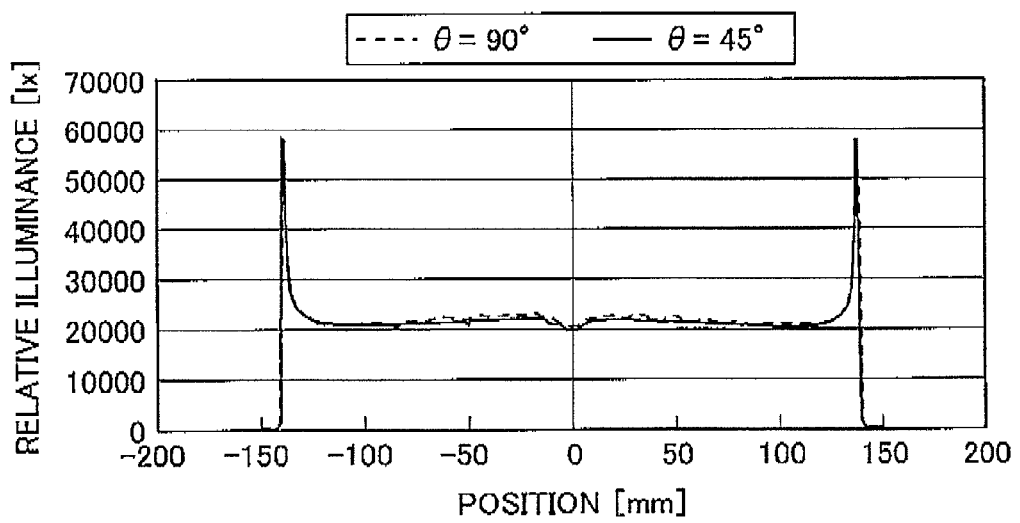
FIG. 31 is a graph illustrating the illuminance distribution of light emitted through the light exit plane of the planar lighting device of FIG. 29A.

FIG. 31 and Table 7 show the measurements obtained. FIG. 31 shows illuminance (1x) on the vertical axis and the distance (mm) from the center of the light guide plate on the horizontal axis.

TABLE 7

| θ | 45 | 90 |
|---|---|---|
| Light use efficiency | 48.30% | 49.50% |

FIG. 31 and Table 7 show that high light use efficiency is also achieved when θ=90° just as when θ=45°. FIG. 31 also shows that uniform light can be emitted from an area closer to the center of the light guide plate.

While the liquid crystal display device according to the invention is described in detail above, the present invention is not limited to the above embodiments, and various improvements and modifications may be made without departing from the spirit of the present invention.

All of the embodiments described above have the light guide plate support members 30 formed of, for example, a resin between the housing member 16a and the reflection plate 24 as illustrated in FIG. 2 so as to support the reflection plate 24 from the side thereof away from the first inclined plane 18b and the second inclined plane 18c of the light guide plate 18 to secure close contact between the light guide plate 18 and the reflection plate 24. The present invention is, however, not limited thereto.

There are preferably provided cushioning members on the side of the reflection plate 24 opposite from the light guide plate 18, i.e., between the housing body 16a and the reflection plate 24 in the embodiment under discussion. The cushioning members are a material having a lower rigidity than the light guide plate to deform according to the contour of the light guide plate. The cushioning members may be formed of a sponge, for example.

The cushioning members places the reflection plate 24 into close contact with the light guide plate 18, and prevent the reflection plate 24 from bending by supporting the reflection plate 24 and the light guide plate 18 on the side thereof defined by the first inclined plane 18b and the second inclined plane 18c. Further, where the light guide plate support members are formed with the cushioning members, the light guide plate and the reflection plate can be brought into contact with each other evenly overall, which prevents diffuse reflection of light that would otherwise occur if only part of the reflection plate were in contact with the light guide plate and could be recognized as bright light as it is emitted through the light exit plane but instead makes it possible to emit uniform light through the light exit plane.

FIGS. 32A to 32D are exploded sectional views illustrating examples of schematic configuration of the cushioning members supporting the light guide plate and the reflection plate.

Figure 32:
FIGS. 32A to 32D are exploded views illustrating examples of cushioning members for supporting the light guide plate and the reflection plate.
Figure 32:
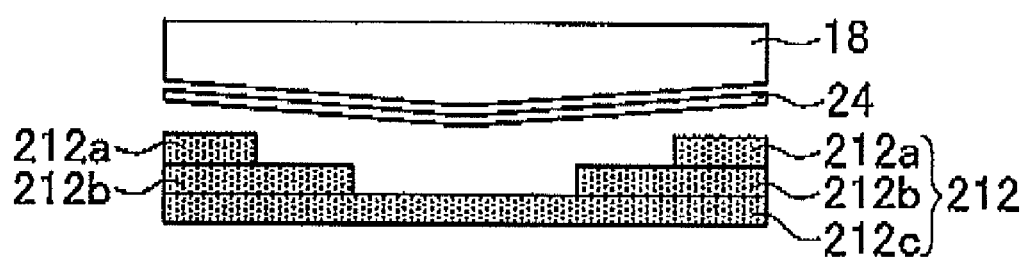
Figure 32:
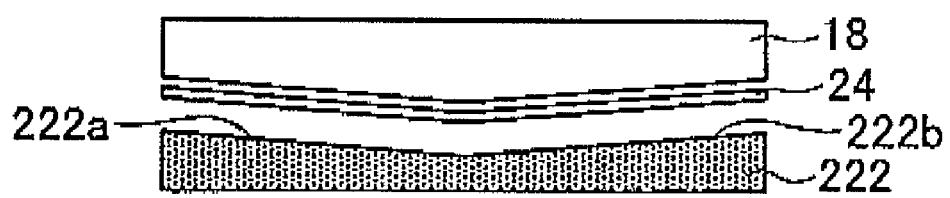
Figure 32:
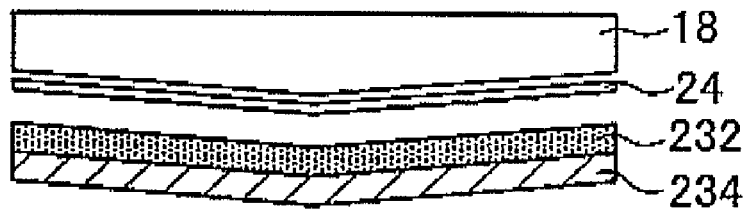

As illustrated in FIG. 32A, a rectangular cushioning member 202 may for example be provided on the side of the reflection plate 24 opposite from the light guide plate 18. The cushioning member 202 is preferably formed of a material having a maximum stress of 5 [N/cm²] or less. The maximum stress here is a maximum of the stress that acts from the cushioning member 202 onto the light guide plate 18 in the planar lighting device as assembled. In the embodiment under discussion, it is the stress acting on the joint between the first inclined plane and the second inclined plane.

As illustrated in FIG. 32B, a multilayer cushioning member 212 consisting of cushioning pieces 212a, 212b, and 212c, and varying in thickness according to the shape of the light guide plate 18 may be provided on the side of the reflection plate 24 opposite from the light guide plate 18. Providing the cushioning member 212 varying in thickness according to the contour of the light guide plate 18 serves to reduce the compressibility of the cushioning member and reduce the maximum stress that acts on the light guide plate. Thus, the force acts on the light guide plate evenly overall, bringing the light guide plate and the reflection plate into close contact evenly overall.

Alternatively, a cushioning member 222 may have a shape contouring the inclined planes of the light guide plate 18, as illustrated in FIG. 32C. That is, the cushioning member 222 then has a shape formed of a first inclined plane 222a and a second inclined plane 222b with the same inclination angle as the first inclined plane and the second inclined plane of the light guide plate 18 on the side closer to the light guide plate 18.

Thus, the light guide plate and the reflection plate can be placed in close contact with each other evenly overall by forming the cushioning member so as to contour the inclined planes of the light guide plate.

Alternatively, a cushioning member 232 having a shape contouring the inclined planes of the light guide plate 18 may be provided together with a sheet metal 234, as illustrated in FIG. 32D, contouring the inclined planes of the light guide plate 18 on the side of the cushioning member 232 opposite from the light guide plate 18.

Providing the sheet metal 234 contouring the inclined planes of the light guide plate 18 on the side of the cushioning member 232 opposite from the light guide plate 18 gives a uniform compressibility to the cushioning member overall. Further, supporting the reflection plate via the cushioning member brings the light guide plate and the reflection plate into close contact.

While, in all the embodiments described above, the light source is formed by arranging the LED chips in a single row in one direction, the present invention is not limited to such configuration: the LED chips may be arranged in two or more rows or, in other words, the LED chips may be arranged in the form of a matrix.

While, in the embodiment under discussion, two or more LED chips are arranged in a row, the present invention is also not limited to such configuration; only one LED chip may be provided. For example, the light exit plane may be formed by cutting out one of the four corners of the rectangular light guide plate to make a light entrance plane out of the cut-out corner such that a single LED chip may be disposed opposite the light entrance plane thus provided. This helps reduce the dimensions of the planar lighting device.

While, in the embodiment of the planar lighting device under discussion, the light emission faces of the light sources are tilted a given angle with respect to the direction perpendicular to the light exit plane of the light guide plate for efficient use of light emitted by the light sources, the present invention is not limited to such configuration; the light emission faces of the light sources may be positioned perpendicular to the light exit plane of the light guide plate.

While the light guide plate preferably is shaped such that it grows thicker with the increasing distance from the light entrance planes because such configuration allows light to travel a longer distance and a larger planar lighting device to be designed, the present invention is not limited to such configuration; the light guide plate may, for example, be shaped like a flat plate or may have a shape growing thinner with the increasing distance from the light entrance plane.

The light guide plate may be fabricated by mixing a plasticizer into a transparent resin.

Fabricating the light guide plate from a material thus prepared by mixing a transparent material and a plasticizer provides a flexible light guide plate, allowing the light guide plate to be deformed into various shapes. Thus, the surface of the light guide plate can be formed into various curved surfaces.

What is claimed is:

1. A liquid crystal display device comprising:
   a planar lighting device comprising:
      at least one light source having one or more LED chips emitting blue light through a light emission face;
      a transparent light guide plate comprising at least one light entrance plane for admitting light emitted by said light source and a light exit plane for emitting light admitted from said light entrance plane as planar light;
      a fluorescent member disposed between said light emission face of said at least one light source and said light entrance plane of said transparent light guide plate and comprising one or more fluorescent substance coated areas for emitting white light by converting the blue light emitted through said light emission face into the white light and one or more blue light passing areas for emitting the blue light emitted through said light emission face as the blue light;
      wherein said planar lighting device emits light through a light emission plane on said light exit plane of said light guide plate; and
   a liquid crystal display panel disposed on said light emission plane of said planar lighting device and including a color filter comprising at least a red filter with a red color component, a green filter with a green color component, and a blue filter with a blue color component,
   wherein said one or more blue light passing areas are formed of a transparent film or one or more apertures.

2. The liquid crystal display device of claim 1, wherein said color filter satisfies conditions that a difference between a wavelength at which a spectral transmittance of said blue filter peaks and a wavelength at which an intensity of the light emitted by said light source peaks is 20 nm or less, and that either $0 \leq P_{BG} \leq 0.5$ and $60 \leq W_B \leq 100$ or $0 \leq P_{BG} \leq 0.2$ and $60 \leq W_G \leq 100$ or both hold, where $P_{BG}$ denotes a spectral transmittance at a wavelength at which said spectral transmittance of said blue filter and a spectral transmittance of said green filter are identical, $P_{GR}$ denotes a spectral transmittance at a wavelength at which said spectral transmittance of said green filter and a spectral transmittance of said red filter are identical, $W_B$ denotes a full-width at half-maximum of said spectral transmittance of said blue filter, and $W_G$ denotes a full-width at half-maximum of said spectral transmittance of said green filter.

3. The liquid crystal display device of claim 1, further comprising an auxiliary light source including at least one auxiliary LED chip disposed adjacent said one or more LED chips of said at least one light source and emitting light having a wavelength different from a wavelength of each LED chip of said at least one light source.

4. The liquid crystal display device of claim 3, wherein each LED chip of said at least one light source and each auxiliary LED chip of said auxiliary light source are disposed in a repeated pattern.

5. The liquid crystal display device of claim 3, wherein each auxiliary LED chip of said auxiliary light source is formed of an LED chip emitting light having a peak wavelength of 380 nm inclusive to 780 nm inclusive and a full-width at half-maximum of 5 nm inclusive to 20 nm inclusive.

6. The liquid crystal display device of claim 3, wherein $0.05 \leq ls \leq lm \leq 0.5$ holds where lm denotes an amount of the light emitted by each LED chip of said at least one light source and ls denotes an amount of the light emitted by each auxiliary LED chip of said auxiliary light source.

7. The liquid crystal display device of claim 1,
wherein each of said at least one light source comprises a plurality of LED chips and a base for supporting said plurality of LED chips, and
wherein said plurality of LED chips are disposed in a row on a surface of said base facing said light entrance plane of said transparent light guide plate.

8. The liquid crystal display device of claim 1, wherein said fluorescent member has two or more of said blue light passing areas formed for said light emission face of each LED chip.

9. The liquid crystal display device of claim 1, wherein each light source has LED chips, and said fluorescent member is a sheet member common to said LED chips.

10. The liquid crystal display device of claim 1, wherein said fluorescent member satisfies $0.05 \leq Sap/Sa \leq 0.40$, where Sa is a whole area of said fluorescent member and Sap is a sum of all of said one or more blue light passing areas.

11. The liquid crystal display device of claim 1, wherein said transparent light guide plate has said at least one light entrance plane formed at one or more ends of said transparent light guide plate neighboring said light exit plane and has a shape growing in thickness vertical to said light exit plane as a distance from said at least one light entrance plane increases.

12. The liquid crystal display device of claim 11, wherein said light guide plate contains numerous scattering particles therein and satisfies following inequalities:

$$1.1 \leq \Phi \cdot N_p \cdot L_G K_C \leq 8.2$$

$$0.005 \leq K_C \leq 0.1$$

where $\Phi$ denotes a scattering cross section of said scattering particles, $N_p$ denotes a density of said scattering particles, $K_C$ denotes a compensation coefficient, and $L_G$ denotes a length in an incident direction of the light from said at least one light entrance plane to a position where a thickness of said transparent light guide plate is greatest.

13. The liquid crystal display device of claim 11, wherein said one or more LED chips have a light emission face longer than a length of an effective cross section of said light entrance plane passing through an end of said light exit plane at which said light entrance plane is formed and lying in a direction substantially perpendicular to said light exit plane, and wherein said LED chips are disposed such that said light emission face is opposite said light entrance plane of said transparent light guide plate and tilted a given angle with respect to a direction substantially perpendicular to said light exit plane.

14. The liquid crystal display device of claim 13, wherein said light entrance plane of said transparent light guide plate is a plane substantially perpendicular to said light exit plane and said effective cross section of said light entrance plane is that substantially perpendicular plane.

15. The liquid crystal display device of claim 13, wherein said light entrance plane of said light guide plate is a plane inclined with respect to a direction substantially perpendicular to said light exit plane such that said light entrance plane faces and is parallel to said light emission face of said light source and wherein an effective cross section of said light entrance plane is a cross section lying in a plane passing through a center of said light entrance plane and substantially perpendicular to said light exit plane.

16. The liquid crystal display device of claim 13, wherein an inclination angle of said light emission face of each light source with respect to a direction substantially perpendicular to said light exit plane is 15° to 90°.

17. The liquid crystal display device of any one of claims 13 to 16, further comprising light guide reflection plates for guiding light emitted by said light source to said light entrance plane, disposed on a side of said light entrance plane of said transparent light guide plate closer to said light exit plane and on a side of said light entrance plane opposite from said light exit plane.

18. The liquid crystal display device of claim 17, wherein said light guide reflection plates comprise a first light guide reflection plate attached to an end of said light exit plane of said transparent light guide plate and a second light guide reflection plate attached to an end of a plane of said light guide plate opposite from said light exit plane and comprising an extension extending farther outward from an end of said plane of said transparent light guide plate opposite from said light exit plane.

19. The liquid crystal display device of claim 1,
wherein said transparent light guide plate has a configuration such that said light exit plane is rectangular and said at least one light entrance plane of said transparent light guide plate comprises a first light entrance plane and a second light entrance plane each formed on two opposite sides of said light exit plane, and
wherein said transparent light guide plate is thinnest at said first light entrance plane and said second light entrance plane and thickest at a midpoint of a line connecting said first light entrance plane and said second light entrance plane.

20. The liquid crystal display device of claim 9, wherein said blue light emitted through said light emission face of each LED chip is admitted to one surface of said sheet member, a part of said emitted blue light is converted to said white light through each light fluorescent substance coated area, and the remainder of said emitted blue light is passed through each blue light passing area, and the remainder of said emitted blue light is passed through each blue light passing areas as the blue light, thereby, said converted white light and said passed blue light are emitted together from another surface of said sheet member.

* * * * *